(12) United States Patent
Gala et al.

(10) Patent No.: US 8,719,086 B1
(45) Date of Patent: May 6, 2014

(54) INTERACTIVE ELECTRONIC GAME SYSTEMS, METHODS, AND DEVICES

(71) Applicant: Mitesh Gala, Costa Mesa, CA (US)

(72) Inventors: Mitesh Gala, Santa Ana, CA (US); Tejal Mitesh Gala, Santa Ana, CA (US); Avinash Mitesh Gala, Santa Ana, CA (US); Veer Mitesh Gala, Santa Ana, CA (US)

(73) Assignee: Mitesh Gala, Santa Ana, CA (US)

( * ) Notice: Subject to any disclaimer, the term of this patent is extended or adjusted under 35 U.S.C. 154(b) by 0 days.

(21) Appl. No.: 13/933,039

(22) Filed: Jul. 1, 2013

Related U.S. Application Data

(63) Continuation-in-part of application No. 13/924,432, filed on Jun. 21, 2013.

(60) Provisional application No. 61/838,262, filed on Jun. 22, 2013.

(51) Int. Cl.
*G06Q 30/00* (2012.01)
*G06Q 50/00* (2012.01)
*A63F 9/24* (2006.01)

(52) U.S. Cl.
USPC .......... 705/14.25; 463/17; 463/42; 705/14.52

(58) Field of Classification Search
USPC ............... 463/42, 17; 705/14.1, 14.25, 14.52; 340/539.13
See application file for complete search history.

(56) References Cited

U.S. PATENT DOCUMENTS

| | | | |
|---|---|---|---|
| 5,226,822 A | 7/1993 | Morris | |
| 5,498,002 A | 3/1996 | Gechter | |
| 6,089,975 A | 7/2000 | Dunn | |
| 6,210,272 B1 | 4/2001 | Brown | |
| 6,602,133 B2 | 8/2003 | Chan | |
| 6,743,102 B1 | 6/2004 | Fiechter et al. | |
| 7,384,340 B2 | 6/2008 | Eguchi et al. | |
| 8,360,881 B2 | 1/2013 | Login et al. | |
| 8,376,826 B2 | 2/2013 | Katz et al. | |
| 2004/0150520 A1* | 8/2004 | Barrie | 340/539.13 |
| 2008/0254886 A1* | 10/2008 | Kelly | 463/42 |
| 2009/0054139 A1* | 2/2009 | Anderson | 463/31 |
| 2010/0211462 A1* | 8/2010 | Nowacek | 705/14.52 |
| 2011/0009177 A1* | 1/2011 | Katz et al. | 463/17 |
| 2011/0264502 A1* | 10/2011 | Taylor et al. | 705/14.25 |
| 2012/0015735 A1* | 1/2012 | Abouchar et al. | 463/42 |
| 2012/0122553 A1* | 5/2012 | Bunch et al. | 463/23 |
| 2012/0150592 A1* | 6/2012 | Govrik et al. | 705/14.1 |
| 2013/0072303 A1 | 3/2013 | Mineur et al. | |
| 2013/0113161 A1* | 5/2013 | Guarnieri | 273/121 R |
| 2013/0165223 A1 | 6/2013 | Leyland et al. | |

OTHER PUBLICATIONS

U.S. Appl. No. 13/924,432 including its prosecution history, the cited references, and the Office Actions therein, Not yet published, Gala.

* cited by examiner

*Primary Examiner* — Dmitry Suhol
*Assistant Examiner* — Jason Yen
(74) *Attorney, Agent, or Firm* — Knobbe Martens Olson & Bear LLP

(57) ABSTRACT

The disclosure herein provides interactive electronic game systems, methods, and devices. An interactive electronic game system comprises a user information database, an ordering engine, a prize engine, a game engine, and one or more computers, wherein the ordering engine comprises an identification receiver and an order processor, and the one or more computers comprises a computer processor and an electronic storage medium.

18 Claims, 31 Drawing Sheets

INTERACTIVE ELECTRONIC GAME SYSTEMS, METHODS, AND DEVICES

CROSS-REFERENCE TO RELATED APPLICATIONS

This application claims the benefit of U.S. Provisional Application No. 61/838,262, titled INTERACTIVE ELECTRONIC GAME SYSTEMS, METHODS, AND DEVICES, filed on Jun. 22, 2013. This application is a continuation-in-part of U.S. patent application Ser. No. 13/924,432, titled INTERACTIVE ELECTRONIC GAME SYSTEMS, METHODS, AND DEVICES, filed on Jun. 21, 2013. The foregoing applications are hereby incorporated herein by reference in their entirety.

BACKGROUND

1. Field

The disclosure relates generally to the field of electronic games, and more specifically to systems, methods, and devices for generating interactive electronic games and prizes and presenting the interactive electronic games and prizes to users.

2. Description

Businesses often look for ways to retain customers and/or attract new customers. Particularly, in businesses that desire repeat customers, businesses have attempted various ways to obtain customer loyalty and repeat business. For example, some businesses, such as airlines, use loyalty programs that involve a user acquiring a certain number of miles for each trip they take. A user can later redeem these miles for rewards such as free or reduced price flights. In the restaurant business, businesses sometimes attempt to acquire new customers and/or retain existing customers by, for example, mailing them coupons for reduced price meals. In another example, credit card companies may attempt to retain customers and/or gain new customers by offering interest rate discounts, reward systems, and/or a percentage of purchases back as cash.

In the restaurant business, particularly, businesses may have a difficult time retaining customers and gaining repeat business. For example, a customer may find a restaurant the customer likes, and may frequent that restaurant two or three times a week for a certain period of time. However, in many cases, the customer will eventually tire of going to the restaurant so frequently and his or her number of visits to the restaurant will drop off and potentially eventually cease. In some cases, a customer may eventually come back to the restaurant. However, it is unlikely that a customer will return to the frequency of visits that took place when the customer first began going to the restaurant. Accordingly it can be advantageous to have systems, methods, and devices to help engage customers and keep them loyal to a business. Such a system could, for example, help a restaurant to gain the loyalty of its customers and to sustain repeat business.

SUMMARY

The disclosure herein provides systems, methods, and devices for generating interactive electronic games and determining prizes or other items to award to users of the games.

In some embodiments, an interactive electronic game system for determining prizes to award to users comprises: a user information database configured to store data relating to users of the interactive electronic game system; an ordering engine configured to process orders, the ordering engine comprising: an identification receiver configured to receive identifying information, wherein the identifying information enables identification of a user and enables access to data relating to that user stored in the user information database; and an order processor configured to receive an order from the user; a prize engine configured to determine a prize to award to the user, wherein determining a prize to award to the user takes into account at least a portion of the data relating to that user stored in the user information database; a game engine configured to generate an interactive electronic game, wherein the interactive electronic game is configured to be playable by the user in association with the receipt of the user's order, and the interactive electronic game is configured to indicate to the user the determined prize; and one or more computers configured to operate the ordering engine, prize engine, and game engine, wherein the one or more computers comprises a computer processor and an electronic storage medium.

In certain embodiments, a computer-implemented method for determining prizes to award to users comprises: receiving electronic data comprising identifying information, the identifying information enabling identification of a user of a computer system and enabling access by the computer system to data relating to that user stored in an electronic database; receiving electronic data comprising an order by the user; determining, using the computer system, a prize to award to the user, wherein determining the prize takes into account at least a portion of the data relating to that user stored in the electronic database; and electronically presenting to the user, using the computer system, in association with receiving the order by the user, an interactive electronic game, wherein the interactive electronic game is configured to be playable by the user and to indicate to the user the determined prize.

In some embodiments, a computer-readable, non-transitory storage medium having a computer program stored thereon for causing a suitably programmed computer system to process by one or more processors computer-program code by performing a method for determining prizes to award to users when the computer program is executed on the suitably programmed computer system comprises: receiving electronic data comprising identifying information, the identifying information enabling identification of a user of a computer system and enabling access by the computer system to data relating to that user stored in an electronic database; receiving electronic data comprising an order by the user; determining, using the computer system, a prize to award to the user, wherein determining the prize takes into account at least a portion of the data relating to that user stored in the electronic database; and electronically presenting to the user, using the computer system, in association with receiving the order by the user, an interactive electronic game, wherein the interactive electronic game is configured to be playable by the user and to indicate to the user the determined prize.

In certain embodiments, an interactive electronic game system for determining prizes to award to users and managing redemption of the prizes comprises a user information database configured to store data relating to users of the interactive electronic game system; a prize engine configured to determine a prize to award to a user of the interactive electronic game system, wherein determining a prize to award to the user takes into account at least a portion of data relating to that user stored in the user information database; a game engine configured to generate at least one configuration parameter for an interactive electronic game and to electronically communicate with an electronic user access point system to communicate the at least one configuration parameter to the user access point system, wherein the interactive electronic game is configured to be playable by a user of the electronic user access point system, and the interactive electronic game is configured to indicate to the user using the electronic user access point system the determined prize; wherein the prize engine is further configured to electronically communicate with an ordering system configured to process an order from the user, wherein the prize engine is configured to indicate to the ordering system that the determined prize may be redeemed for the user; and one or more computers configured to operate the prize engine and game engine, wherein the one or more computers comprises a computer processor and an electronic storage medium.

In some embodiments, the at least one configuration parameter comprises information relating to the determined prize. In some embodiments, the prize engine is further configured to electronically communicate with the user access point system to receive a request from the user access point system to redeem the determined prize. In some embodiments, the request from the user access point system to redeem the prize comprises information enabling an identification of the ordering system. In some embodiments, the information enabling the identification of the ordering system comprises information received by the user access point system by scanning a code associated with or displayed by the ordering system. In some embodiments, the prize engine is further configured to receive a request from the ordering system to redeem the determined prize prior to indicating to the ordering system that the determined prize may be redeemed for the user. In some embodiments, the request from the ordering system to redeem the determined prize comprises information enabling an identification of the user access point system. In some embodiments, the information enabling the identification of the user access point system comprises information received by the ordering system by scanning a code associated with or displayed by the user access point system. In some embodiments, the prize engine is configured to electronically communicate with an ordering system and a user access point system located at the same business location, wherein a request by either the ordering system or the user access point system to redeem the determined prize must be confirmed by the prize engine prior to enabling the ordering engine to process a redemption of the determined prize.

In certain embodiments, a computer-implemented method for determining prizes to award to users and managing redemption of the prizes comprises receiving electronic data comprising identifying information, the identifying information enabling identification of a user of a computer system and enabling access by the computer system to data relating to that user stored in an electronic database; determining, using the computer system, a prize to award to the user, wherein determining the prize takes into account at least a portion of the data relating to that user stored in the electronic database; generating at least one configuration parameter for an interactive electronic game, wherein the at least one configuration parameter comprises information relating to the determined prize; sending configuration data to a user access point system, the configuration data comprising the at least one configuration parameter, to enable the user access point system to electronically present to the user an interactive electronic game, wherein the interactive electronic game is configured to be playable by the user and to indicate to the user the determined prize; and sending confirmation data to an ordering system, the confirmation data comprising information indicating the determined prize may be redeemed by the user.

In some embodiments, the computer-implemented method further comprises receiving redemption data from the user access point system, wherein the redemption data comprises information indicating a request by the user to redeem the determined prize. In some embodiments, the redemption data comprises information enabling an identification of the ordering system. In some embodiments, the information enabling the identification of the ordering system comprises information received by the user access point system by scanning a code associated with or displayed by the ordering system. In some embodiments, the computer-implemented method further comprises receiving a request from the ordering system to redeem the determined prize prior to sending the confirmation data to the ordering system. In some embodiments, the request from the ordering system to redeem the determined prize comprises information enabling an identification of the user access point system. In some embodiments, the information enabling the identification of the user access point system comprises information received by the ordering system by scanning a code associated with or displayed by the user access point system.

In certain embodiments, a computer-readable, non-transitory storage medium having a computer program stored thereon for causing a suitably programmed computer system to process by one or more processors computer-program code by performing a method for determining prizes to award to users and managing redemption of the prizes when the computer program is executed on the suitably programmed computer system comprises receiving electronic data comprising identifying information, the identifying information enabling identification of a user of a computer system and enabling access by the computer system to data relating to that user stored in an electronic database; determining, using the computer system, a prize to award to the user, wherein determining the prize takes into account at least a portion of the data relating to that user stored in the electronic database; generating at least one configuration parameter for an interactive electronic game, wherein the at least one configuration parameter comprises information relating to the determined prize; sending configuration data to a user access point system, the configuration data comprising the at least one configuration parameter, to enable the user access point system to electronically present to the user an interactive electronic game, wherein the interactive electronic game is configured to be playable by the user and to indicate to the user the determined prize; and sending confirmation data to an ordering system, the confirmation data comprising information indicating the determined prize may be redeemed by the user.

In some embodiments, the method further comprises receiving redemption data from the user access point system, wherein the redemption data comprises information indicating a request by the user to redeem the determined prize. In some embodiments, the redemption data comprises information enabling an identification of the ordering system. In some embodiments, the information enabling the identification of the ordering system comprises information received by the user access point system by scanning a code associated with or displayed by the ordering system. In some embodiments, the method further comprises receiving a request from the ordering system to redeem the determined prize prior to sending the confirmation data to the ordering system. In some embodiments, the request from the ordering system to redeem the determined prize comprises information enabling an identification of the user access point system. In some embodiments, the information enabling the identification of the user access point system comprises information received by the ordering system by scanning a code associated with or displayed by the user access point system.

In certain embodiments, an interactive electronic game system for determining prizes to award to users and managing redemption of the prizes comprises a user information database configured to store data relating to users of the interactive electronic game system; a prize engine configured to determine a prize to award to a user of the interactive electronic game system, wherein determining a prize to award to the user takes into account at least a portion of data relating to that user stored in the user information database; a game engine configured to generate at least one configuration parameter for an interactive electronic game and to electronically communicate with an electronic user access point system to communicate the at least one configuration parameter to the user access point system, wherein the interactive electronic game is configured to be playable by a user of the electronic user access point system, and the interactive electronic game is configured to indicate to the user using the electronic user access point system the determined prize; wherein the prize engine is further configured to process a check-in action of the user access point system and to automatically indicate to an ordering system that the user access point system has checked-in, enabling the ordering system to electronically display information related to the user; and one or more computers configured to operate the prize engine and game engine, wherein the one or more computers comprises a computer processor and an electronic storage medium.

In some embodiments, the at least one configuration parameter comprises information relating to the determined prize. In some embodiments, the check-in action comprises one or more of the following: the user access point system scanning a code related to the ordering system, the ordering system scanning a code related to the user access point system, the user access point system being positioned at a predefined location, the user access point system accepting user identifying information. In some embodiments, indicating to the ordering system that the user access point system has checked-in comprises sending data relating to the user of the user access point system to the ordering system. In some embodiments, the data relating to the user of the user access point system comprises one or more of the following: user identifying information, banked prize information, a prize redemption request, user behavior information, user preference information. In some embodiments, the check-in action comprises a request to redeem a prize. In some embodiments, the prize engine is configured to process the check-in action of the user access point system prior to the ordering system receiving an order from the user of the user access point system.

In certain embodiments, a computer-implemented method for determining prizes to award to users and managing redemption of the prizes comprises receiving electronic data comprising identifying information, the identifying information enabling identification of a user of a computer system and enabling access by the computer system to data relating to that user stored in an electronic database; determining, using the computer system, a prize to award to the user, wherein determining the prize takes into account at least a portion of the data relating to that user stored in the electronic database; generating at least one configuration parameter for an interactive electronic game, wherein the at least one configuration parameter comprises information relating to the determined prize; sending configuration data to a user access point system, the configuration data comprising the at least one configuration parameter, to enable the user access point system to electronically present to the user an interactive electronic game, wherein the interactive electronic game is configured to be playable by the user and to indicate to the user the determined prize; and processing a check-in action of the user access point system by indicating to an ordering system that the user access point system has checked-in, enabling the ordering system to electronically display information related to the user.

In some embodiments, the check-in action comprises one or more of the following: the user access point system scanning a code related to the ordering system, the ordering system scanning a code related to the user access point system, the user access point system being positioned at a predefined location, the user access point system accepting user identifying information. In some embodiments, indicating to the ordering system that the user access point system has checked-in comprises sending data relating to the user of the user access point system to the ordering system. In some embodiments, the data relating to the user of the user access point system comprises one or more of the following: user identifying information, banked prize information, a prize redemption request, user behavior information, user preference information. In some embodiments, the check-in action comprises a request to redeem a prize. In some embodiments, processing the check-in action of the user access point system occurs prior to the ordering system receiving an order from the user of the user access point system.

In certain embodiments, a computer-readable, non-transitory storage medium having a computer program stored thereon for causing a suitably programmed computer system to process by one or more processors computer-program code by performing a method for determining prizes to award to users and managing redemption of the prizes when the computer program is executed on the suitably programmed computer system comprises receiving electronic data comprising identifying information, the identifying information enabling identification of a user of a computer system and enabling access by the computer system to data relating to that user stored in an electronic database; determining, using the computer system, a prize to award to the user, wherein determining the prize takes into account at least a portion of the data relating to that user stored in the electronic database; generating at least one configuration parameter for an interactive electronic game, wherein the at least one configuration parameter comprises information relating to the determined prize; sending configuration data to a user access point system, the configuration data comprising the at least one configuration parameter, to enable the user access point system to electronically present to the user an interactive electronic game, wherein the interactive electronic game is configured to be playable by the user and to indicate to the user the determined prize; and processing a check-in action of the user access point system by indicating to an ordering system that the user access point system has checked-in, enabling the ordering system to electronically display information related to the user.

In some embodiments, the check-in action comprises one or more of the following: the user access point system scanning a code related to the ordering system, the ordering system scanning a code related to the user access point system, the user access point system being positioned at a predefined location, the user access point system accepting user identifying information. In some embodiments, indicating to the ordering system that the user access point system has checked-in comprises sending data relating to the user of the user access point system to the ordering system. In some embodiments, the data relating to the user of the user access point system comprises one or more of the following: user identifying information, banked prize information, a prize redemption request, user behavior information, user preference information. In some embodiments, the check-in action comprises a request to redeem a prize. In some embodiments, processing the check-in action of the user access point system occurs prior to the ordering system receiving an order from the user of the user access point system.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which.

DETAILED DESCRIPTION OF THE EMBODIMENTS

Figure 1A:
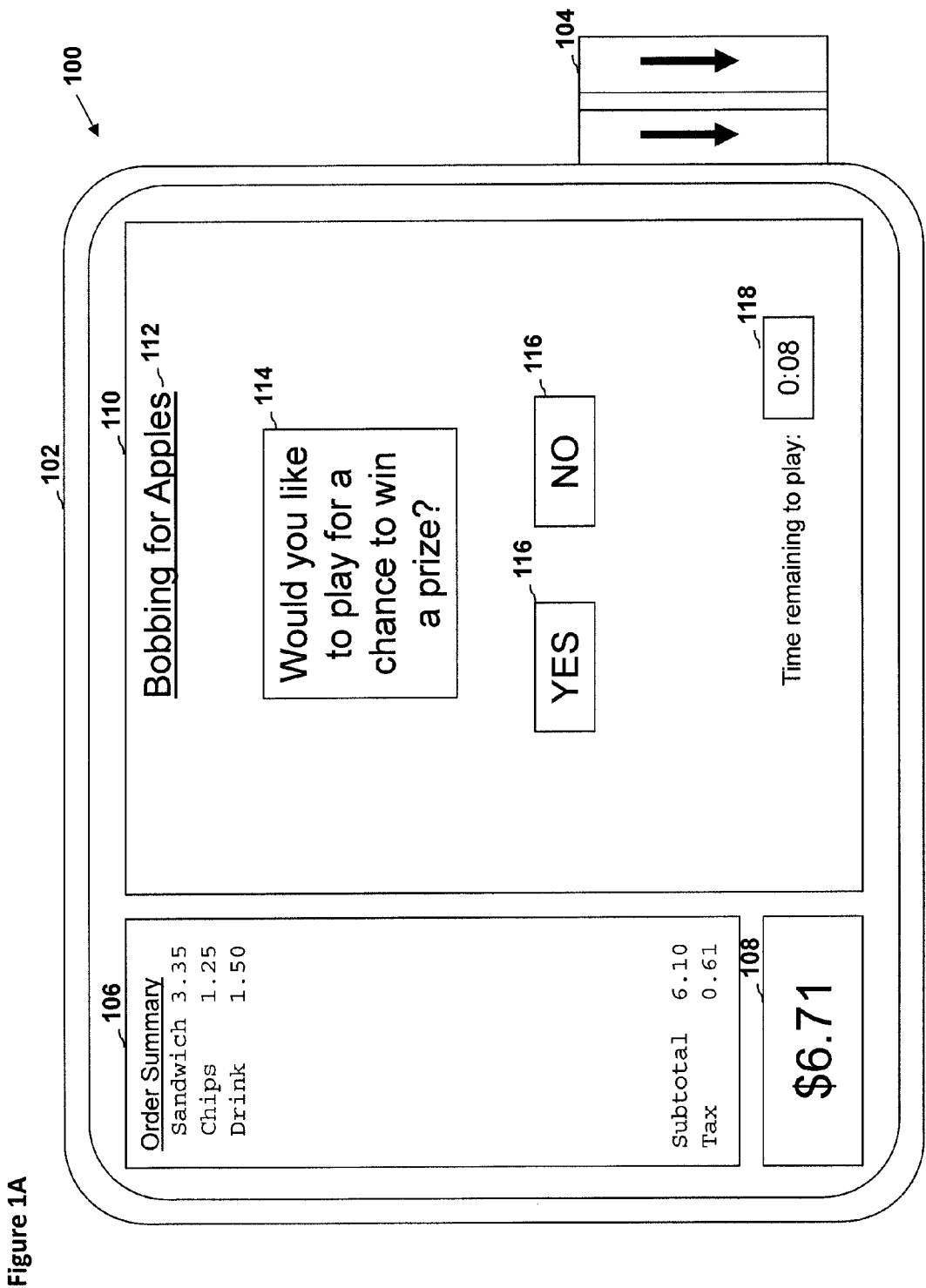
FIG. 1A is an embodiment of a schematic diagram illustrating a user access point system utilizing an electronic game system.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides systems, methods, and devices for generating interactive electronic games and for determining and awarding prizes to customers of a business in order to gain and retain customer loyalty. The systems, methods, and devices as disclosed herein may be used by a business to help keep that business' customers engaged and returning to the business as repeat customers. In some embodiments, an interactive electronic game system is configured to generate an interactive electronic game that a user can play before, during, or after the user places an order with the business. For example, the interactive electronic game system can be configured to generate an interactive electronic game for a customer to play while waiting in line at a restaurant or other establishment to place an order. For example, the interactive electronic game system can be configured to generate an interactive electronic game for a customer to play concurrent or just prior to completing an order at a restaurant or other establishment. For example, such a system may be used by a fast food restaurant while accepting an order from a customer. In one embodiment, after the customer has given an order to the restaurant, an electronic game system may be configured to offer the user an opportunity to play a small electronic game for a chance to win a prize. If the user plays the game, the system may be configured to offer a prize to the user. The prize may be, for example, a free extra item added onto the user's current order. In some embodiments, the system can be configured to allow the user to bank the prize for use with a later order upon a future visit to the restaurant.

In some embodiments, an electronic game system as described herein may be configured to enable a user to play an interactive electronic game using a point of sale system while ordering food at a restaurant. In other embodiments, an electronic game system can be configured to enable a user to play an electronic game using other devices, such as the user's smartphone or personal computer. In some embodiments, the electronic game is configured to be played in association with the receipt of an order from a user. In other embodiments, the electronic game is configured to be played at other times, such as whenever a user or a customer wishes to play a game.

In some embodiments, an electronic game system is configured to determine a prize to award to a user based on various factors. In other embodiments, an electronic game system is configured to randomly award a prize to a user. In further embodiments, an electronic game system is configured to determine a pool of prizes from which to award a prize to a user based on various pieces of information, but then to randomly award a prize from that pool. In some embodiments, the electronic game system is configured to sometimes not award a prize when a user plays the game. This may be advantageous, because some users may attempt to play numerous games to receive numerous prizes, potentially leading to excessive costs for the associated business. In embodiments that are configured to determine a prize to award to a user based on various factors, examples of some of these factors include user preferences, past user behavior information, information related to a current order from the user, past user order information, user health information, administrator settings, age, sex, marital status, other sociodemographic information, and/or various other types of factors.

In some embodiments an electronic game system is configured to have a prize bank that allows users of the system to bank any awarded prizes for later visits. This can be advantageous to the operator of the electronic game system, because it can incentivize a user of the system to return to the business to claim the prize. Therefore, for this and other reasons, the system can encourage repeat business.

In some embodiments, an electronic game system is configured to operate as a service communicating with both business point-of-sale systems and user access point devices, such as smart phones, tablet computers, etc. In some embodiments, an electronic game system may be configured to communicate with point-of-sale systems located at multiple businesses and/or business locations. The system may be configured to enable users to play an interactive electronic game at any time using their personal electronic devices. In some embodiments, the user can select which business or business location the user wants to attempt to win a prize for when the user requests to play an interactive electronic game. When a user has won a prize or award using his or her personal electronic device, the electronic game system can be configured to store information related to the prize and to communicate with a point-of-sale system at a business to enable redemption of that prize when the user presents his or her personal electronic device at the business. In some embodiments, presenting the personal electronic device at the business enables identification of the user and the specific location and/or point-of-sale system the user is at.

In some embodiments, an electronic game system can be configured to enable users to check in at a business. For example, a system may be configured to enable users of an electronic game system, such as customers of a business, to check in whenever they arrive at the business and/or at an ordering terminal of the business. The user may be able to check in with an electronic game system using various means. In some embodiments, a user actively checks in. In other embodiments, a user passively checks in. For example, a system may be configured to enable a user to check in with an electronic game system by inputting identifying information into a user access point system, such as a telephone number, username, and/or the like. As another example, a system can be configured to enable a user to actively check-in by, for example, scanning a code associated with a particular business or ordering location at a business using his or her personal user access point system. As another example, the system may be configured to enable a user to scan a code displayed by the user's personal user access point device using a scanner located at the business. In some embodiments, the check-in process can be configured to be passive. For example, a user or user access point system may cause the initiation of a check in process by arriving at a particular GPS location, arriving within range of a particular Wi-Fi network, and/or the like. In another example, a check-in process may be started through facial recognition, car license plate recognition, and/or the like.

An electronic game system that is configured to enable users to check-in at businesses may be advantageous in many ways. In some embodiments, a check-in process can be configured to automatically cause other actions to occur due to the check-in. For example, a system may be configured to add loyalty points to a user's loyalty account due to one or more check-ins. In some embodiments, a check-in can cause a customer relationship management (CRM) interface to automatically appear on an ordering system or other employee facing device. This may enable, for example, an employee of a business to learn about a user that just checked in to, for example, enable the employee to engage that user in conversation. This may be advantageous, because, one of the top reasons people stop going to a business, such as a restaurant, is employee indifference. By enabling an employee to personally greet the customer and/or engage in a conversation with the customer, a CRM interface may help customer retention. The CRM interface may additionally be configured to display account information and/or prize information for that user's account and enable an employee to ask the user if the user would like to redeem one of those prizes.

Some embodiments of electronic game systems as described herein can be configured to be part of a loyalty program for a business. Such a loyalty program may be configured to help engage customers and keep customers coming back to a business. Utilizing an electronic game system as described herein with a loyalty program solves multiple problems inherent in other loyalty programs. For example, some loyalty programs, such as airline miles programs, require a significant amount of effort and/or time and/or money spent to achieve an award. For example, a user of an airline flight miles loyalty program may need to spend thousands of dollars on a credit card and/or fly thousands of miles over a significant amount of time to be eventually awarded with a free or reduced price flight. A loyalty program implementing an electronic game system as described herein, on the other hand, can be configured to make it relatively quick and easy to be awarded prizes. For example, an electronic game system may be configured to award a prize every single time a user places an order with a business and/or checks in with the business. Additionally, an electronic game system can be configured to be low friction, because it may not require much information from a user to get started with the program. At a minimum, such an electronic game system in some embodiments may require just some piece of identifying information from a user. Such a piece of identifying information may comprise, for example, a telephone number, a credit card number, a loyalty program number assigned by the business, and/or the like. In a loyalty program implementing an electronic game system as described herein, the loyalty program may help keep customers coming back to a business, for example, because they win prizes all of the times or many of the times they visit the business. For loyalty programs not implementing such an electronic game system, users may experience burnout at a much higher rate, because there may be long intervals of time and/or effort between the awarding or redemption of any prizes or awards.

In some embodiments, an electronic game system can be configured to award random and/or promotional prizes in addition to or in lieu of prizes based at least partially on a user's information. For example, the electronic game system may be configured to primarily award prizes to users based on user specific information and/or information relating to the user's behavior. However, the system may also be configured to randomly award a large prize, such as a $10,000 prize, to a random user. Such a random prize may encourage increased participation in the loyalty program and/or electronic game system due to the increased aspect of gambling. In some embodiments, an electronic game system can be combined with promotions, such as promotions for new items the business is offering, new movies that are coming out, and/or the like. For example, the games presented by an electronic game system may be specialized games that include characters and/or other features of an upcoming movie. Electronic interactive games may additionally be configured to include elements of upcoming or promotional items being sold by the business.

In some embodiments, an electronic game system as described herein may be utilized with a business's loyalty program to help engage customers and retain customers. One advantage of utilizing an electronic game system with a loyalty program is to reduce an ability of users to equate any particular prize to a cash value. For example, in an airline loyalty program, airline miles can typically be equated to a cash value. For example, a user may get one mile for every dollar the user spends, so a user equates one mile to one dollar. However, in an electronic game system, one of the primary ways to get prizes or awards is through playing a game, which is hard to place a dollar value on. Additionally, as described further herein, prizes may be determined based on various factors, not just an amount of spending. Therefore, awards awarded by an electronic game system as described herein may be difficult to equate to a cash value, enabling a business to offer awards of relatively low cash value, but that may have a relatively high perceived value by the receiver.

In some embodiments, as described in greater detail below, a user access point system, such as a tablet computer, may be positioned at a point-of-sale system at a business. The user access point system may be configured to be operated by a customer of the business, such as before, during, or after an employee of the business takes the customer's order using a point-of-sale system or ordering system. In some embodiments, the user access point system can be positioned elsewhere in the business other than near a point-of-sale system. In some embodiments, such a user access point system may be configured to be used for other things when not being used as a user access point system to interact with an electronic game system. For example, a user access point system may be configured to enable users to apply for a job with the business, take orders from users, sign up for a loyalty program, and/or the like.

In some embodiments, a user access point system may be configured to gather information related to a user that is unrelated to an electronic game system or loyalty program, but may also be configured to combine that information with a loyalty system, such as a loyalty system implementing an electronic game system. For example, a user access point system may be configured to accept job applicant information. In one embodiment, the job application may be configured to ask the user at the end of the application whether the user would like to be signed up with the business's loyalty program. In some embodiments, if the user selects to be signed up with the loyalty program, the user's information from the employment application may be automatically transferred into the loyalty program to, for example, be utilized by an electronic game system in determining prizes to award to the user and/or promotions to target that user for. Such a system may be advantageous, because, for example, an employment application may comprise a multitude of details or information about a user that would be useful to the electronic game system in determining appropriate prizes to award to the user. In some embodiments, the system can be configured to redact or otherwise not utilize sensitive information. For example, the system may be configured to not transfer or copy the user's social security number into the loyalty program or electronic game system databases, but to copy all the rest of the information in the application, such as employment history, demographic information, income information, and/or the like.

Although several embodiments described herein relate to an electronic game system as implemented by a restaurant business, the concepts disclosed herein may be used in various types of businesses, not only the restaurant business. For example, a business that sells goods online may use a system as described herein to obtain repeat business. In another example, a car rental business may use a system as described herein to obtain repeat business. For example, a car rental business could offer a customer to play a game at the time the customer returns a vehicle. When the customer plays this game, the game may indicate that the customer has won a free upgrade on their next rental. This may encourage the user to utilize the same car rental company when they next need to rent a vehicle.

Although several embodiments described herein describe electronic game systems configured to award prizes to users, in various other embodiments, the same or similar concepts can be utilized to make various other offers to users that may or may not include the awarding of a prize. For example, an interactive electronic game system as described herein may be configured to determine that a gift card or payment card of a user, either for the electronic game system's business or an unrelated business, is running low on funds. The system may then determine to offer the user an opportunity to reload that card upon playing the interactive electronic game. In another example, an electronic game system being used by a non-restaurant business, such as a doctor's office, may be configured to offer to schedule a follow-up appointment after the user play an interactive electronic game. In such an embodiment, the offer to schedule a follow-up appointment may or may not also include a prize, such as a discount on the services for the follow-up appointment.

FIGS. 1A through 1D depict embodiments of schematic diagrams illustrating a user access point system utilizing an electronic game system. In the embodiments illustrated in FIGS. 1A through 1D, a user access point system 100, such as a point of sale system at a restaurant, is configured to display an order summary to a user and also to enable the user to play an interactive electronic game. In one example, the user access point system 100 illustrated in FIGS. 1A through 1D may be an interactive touch screen display facing a user placing an order in line at a fast food restaurant. In this embodiment, an employee of the fast food restaurant may be entering the user's order using a different display of the point of sale device, while the display shown in FIGS. 1A through 1D is simultaneously displayed to the customer. In other embodiments, the user access point system 100 may be, for example, an interactive touch screen self-service kiosk, such as a self-service order entry terminal at a restaurant, a self-service check-in kiosk at an airport, and/or various other types of kiosk systems. In some embodiments, a user access point system can be configured to enable a user to play an interactive electronic game while the user is waiting in a line to place an order with the business. The user access point system in these embodiments may be, for example, a kiosk at the business, or the user's own portable electronic device, such as a smartphone. In some embodiments, the electronic game system can be configured to detect when a user enters a business or is waiting in line and to alert the user to an opportunity to play a game while the user is, for example, waiting in line to order. Enabling a user to play an interactive electronic game while waiting in line to order at a restaurant can be advantageous to, for example, enhance the user or customer experience, in addition to any benefits derived from awarding prizes to the user. In some embodiments, the system can be configured to allow a user to have played a game and banked a prize by the time the user gets to the front of the line to order. That banked prize may then be added to the current order.

The user access point system 100 illustrated in FIGS. 1A through 1D comprises a user interface 102 and an identification provider 104. The identification provider 104 in this example is a magnetic card reader. However, in other embodiments, the identification provider 104 can be any device for determining information to identify a user of the device. In this example, the identification provider is a magnetic card reader to read, for example, a user's credit card, driver's license, loyalty card, or any other card with a magnetic stripe containing information that enables identification of the user. In other embodiments, the identification provider can be, for example, an RFID reader, a near field communication device (NFC), a biometric device, or various other types of identifying devices. In some embodiments, information received by the identification provider 104 may comprise details of the user's identity, such as the user's name, birthdate, social security number, email address, telephone number, and/or other information. In other embodiments, the identification provider 104 is configured to receive information that an electronic game system can then use to identify the user. For example, the identification provider 104 may be configured to receive a credit card number, which an electronic game system can then be configured to associate with an identification of a specific user or customer. In other embodiments, the identification provider 104 can be configured to receive a customer loyalty number, which an electronic game system can be configured to associate with a specific user or customer. The identifying information received by the identification provider 104 can be configured to be used with an electronic game system as further described below.

The user interface 102 comprises an order summary 106, a total price 108, and a game interface 110. The order summary 106 is configured to display a summary of the user's order. In this example, the order summary 106 shows that the user has requested to order a sandwich, chips, and a drink. The order summary 106 in this embodiment is also configured to display the price of each item, a subtotal for the order, and the tax for the order. The total price 108 is configured to display the total price of the order. For example, in this embodiment, the user's order has a total price of $6.71.

The game interface 110 is configured to enable a user to play a game for a chance to win a prize. In this example, the game interface 110 is part of an interactive electronic touch screen display of the user interface 102. The game interface 110 as shown in this embodiment comprises a heading 112, a dialogue box 114, buttons 116, and a timer 118. The heading 112 in this figure shows the title of the game the user is being offered to play. In this example, the title of the game is Bobbing for Apples. The dialogue box 114 is configured to ask the user a question. In this example, the dialogue box 114 is asking the user whether the user would like to play the Bobbing for Apples game for a chance to win a prize. Although in this embodiment the dialogue box 114 is asking the user if he or she wants to play the game after the user has already requested his or her order, the system can be configured to ask the user if he or she would like to play a game at any time. For example, the dialogue box 114 can be configured to ask the user if he or she would like to play a game before the user places an order, during the placing of the user's order, or after the user places an order. In other embodiments, the system can be configured to allow a user to play a game at a time unrelated to the taking of an order. In some embodiments, the system is configured to only ask a user if he or she would like to play a game if the user has identified himself or herself as a member of the business's loyalty program.

The buttons 116 in this embodiment comprise a yes button and a no button. If the user would like to play the Bobbing for Apples game, the user can press the yes button. If the user does not want to play the Bobbing for Apples game, the user can press the no button. In some embodiments, the game interface 110 can be configured to automatically decide for the user whether the user can play the game after a certain amount of time. For example, as shown in this embodiment, the timer 118 indicates a time remaining to play. In this embodiment, the timer shows eight seconds remaining. After eight seconds has elapsed and the user has not pressed the yes or no button, the system can be configured to remove the option for the user to play the game. Using a timer 118 may be advantageous, because delays in taking orders at restaurants, and particularly fast food restaurants, can lead to increased order time, less orders being taken, and/or frustrated customers. All of this can lead to, for example, reduced revenue or profit for the business. Although this embodiment shows the timer 118 as a countdown clock, various other embodiments may utilize other types of timers, such as a pictorial representation that changes shape as time runs out. In some embodiments, the system is configured to enable a user to play an interactive electronic game while placing an order without increasing or without substantially increasing an amount of time it takes to receive the user's order.

Figure 1B:
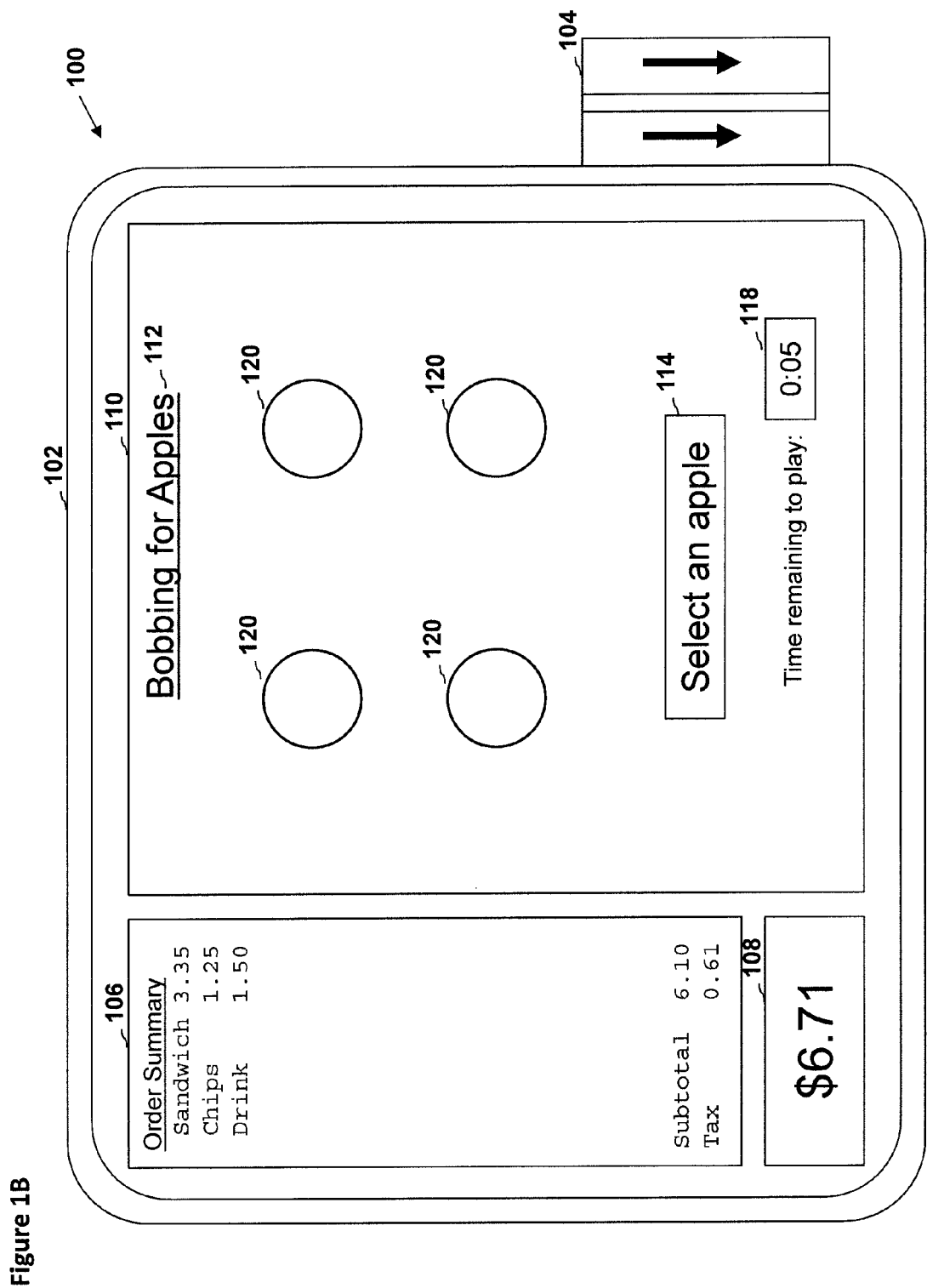
FIG. 1B is another embodiment of a schematic diagram illustrating the user access point system of FIG. 1A utilizing an electronic game system.

FIG. 1B illustrates the user access point system 100 of FIG. 1A after a user has clicked on the yes button shown in FIG. 1A. As shown in FIG. 1B, the Bobbing for Apples game is displayed using the game interface 110. The dialogue box 114 has changed to ask the user to select an apple. The game interface 110 includes representations of four apples 120 for the user to select. The user can select one of the apples 120 by, for example, clicking on, touching, or otherwise selecting one of the apples 120.

Figure 1C:
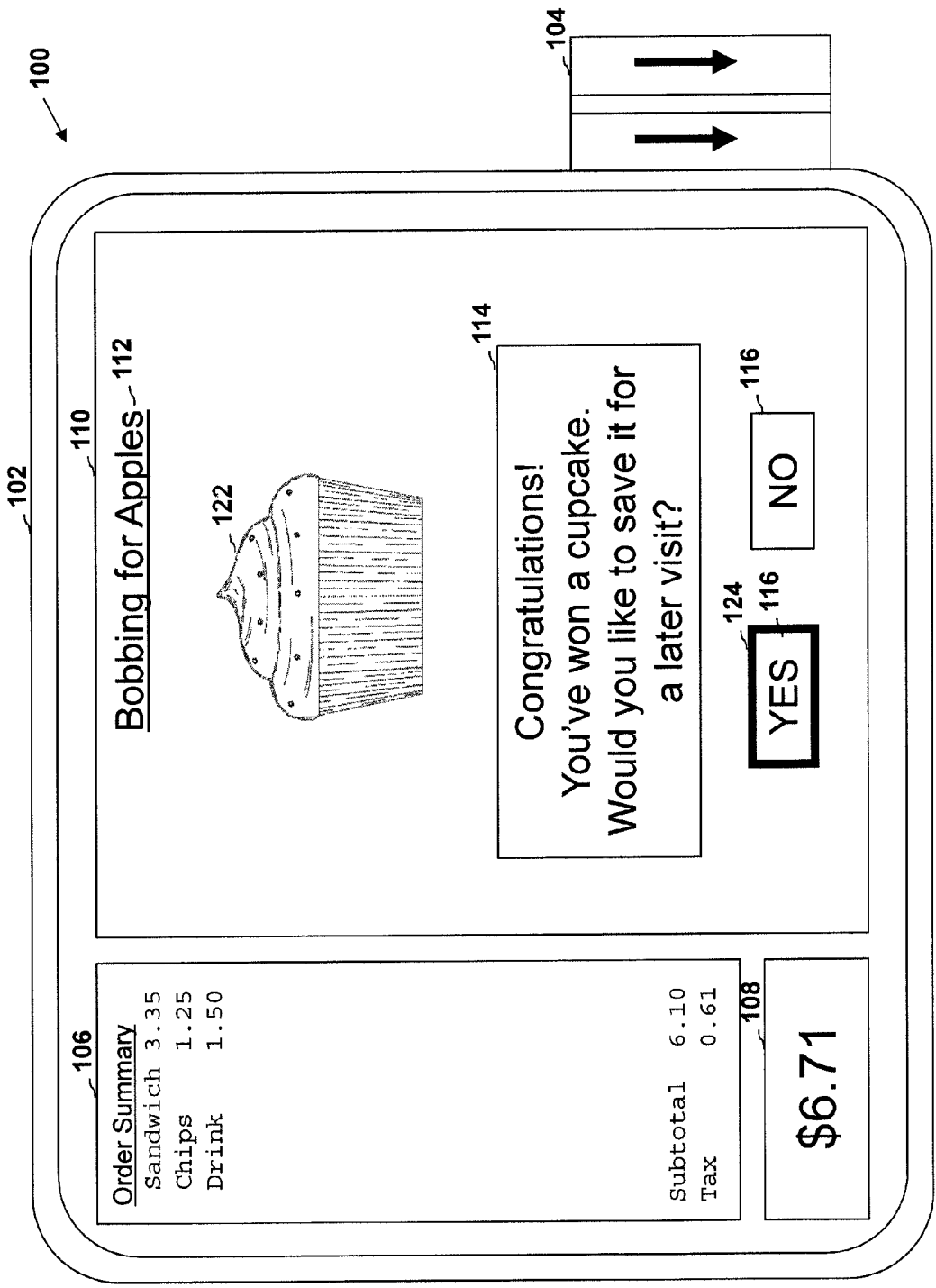
FIG. 1C is another embodiment of a schematic diagram illustrating the user access point system of FIG. 1A utilizing an electronic game system.

FIG. 1C illustrates the user access point system 100 after the user has selected one of the apples 120 shown in FIG. 1B. As shown in FIG. 1C, the game interface 110 and the dialogue box 114 has indicated that the user has won a cupcake. There is also a pictorial representation of a prize 122 shown on the game interface 110. In this embodiment, the dialogue box 114 additionally asks the user if the user would like to save the prize for a later visit. The system can be configured to add the prize 122 to the user's current order if the user clicks the no button 116. If the user clicks the yes button, the system can be configured to bank the prize 122 for use at a later visit to the restaurant.

In some embodiments, the system can be configured to include a suggestive indicator 124 to suggest which button 116 the user should select. In this embodiment, the suggestive indicator 124 comprises a darkened border around the yes button to suggest to the user that the user should select the yes button instead of the no button. This can be advantageous, because a restaurant may prefer that a user bank a prize than add the prize to the current order. This may be advantageous for multiple reasons. For example, adding the prize 122 to the user's prize bank encourages a repeat visit for the user to redeem the prize. In another example, prizes may be configured to expire after a certain amount of time, and users may eventually forget about a prize, so the restaurant may never have to actually redeem the prize. However, even if the prize expires, the customer may still get excited when the prize is won which may help with repeat business and/or customer loyalty.

Figure 1D:
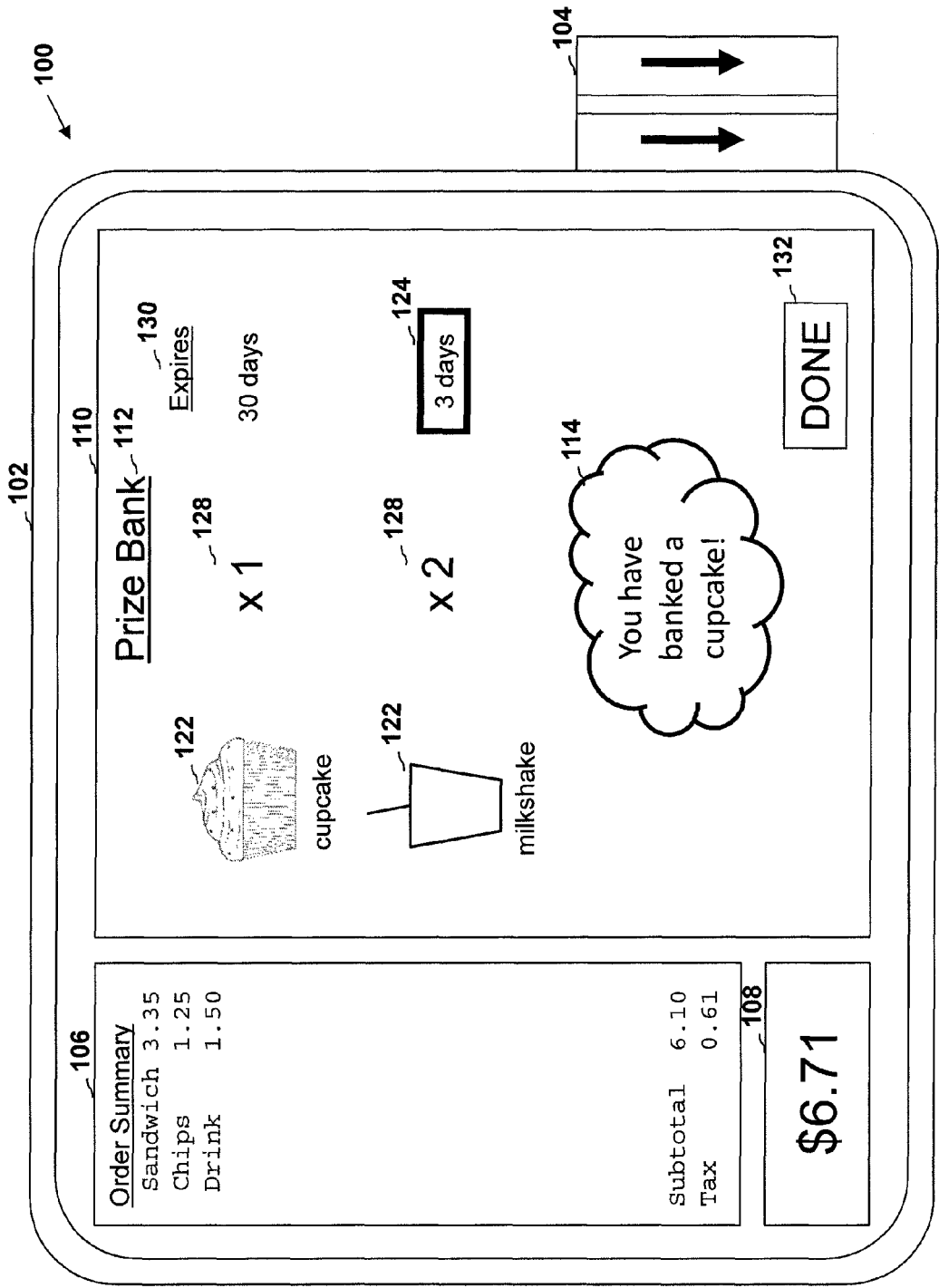
FIG. 1D is another embodiment of a schematic diagram illustrating the user access point system of FIG. 1A utilizing an electronic game system.

FIG. 1D illustrates the user access point system 100 after a user has selected the yes button shown in FIG. 1C. As shown in FIG. 1D, the game interface 110 is configured to display the user's prize bank and that the user has banked the prize. The heading 112 has changed to indicate the game interface 110 is displaying the user's prize bank. The dialogue box 114 has changed to indicate the user has banked a cupcake. The game interface 110 is configured to display multiple prizes 122 that exist in the user's prize bank. In this example, the user has banked one cupcake and two milkshakes. A quantity indicator 128 is configured to indicate how many of each prize the user has banked. An expiration indicator 130 is configured to indicate when the banked prizes will expire. In this case, the expiration indicators 130 indicate the banked cupcake will expire in 30 days and that a milkshake will expire in three days. In some embodiments, the system can be configured to include a suggestive indicator 124 when, for example, a prize is about to expire. In this example, a suggestive indicator 124 comprises a darkened border around the expiration indicator of the milkshake prize to draw the user's attention to the fact that the milkshake prize will be expiring in three days. This may enable the user to redeem the milkshake prior to the prize expiring. In some embodiments, a suggestive indicator 124 may not be utilized, because the business may prefer to allow the prizes to expire.

In some embodiments, in lieu of, or in addition to displaying the user's prize bank using the interface shown in FIG. 1D, the system can be configured to display the banked prize and/or the user's prize bank using a portable electronic device of the user, such as the user's smartphone. In one embodiment, the system is configured to ask the user to "bump" his or her smartphone incorporating near field communication technology against a particular area of the user access point system 100. When the user bumps his or her smartphone against the user access point system 100, the system can be configured to transfer information to the smartphone to enable the smartphone to display the user's prize bank to the user and/or to display to the user that the awarded prize has been added to the user's prize bank.

In some embodiments, an electronic game system can be configured to award multipart prizes to users. For example, a prize system may be configured to require more than one individual prize or token to be redeemed to win a different price. In one embodiment, a price system can be configured to award tokens to be placed around an electronic game board, and to allow a user or player to redeem a specific prize once a certain number of tokens and/or a specific subset of tokens have been won and banked by the user. In some embodiments, an individual prize token may have an option to be either banked or redeemed. For example, an individual token may be able to be redeemed towards, for example, a milkshake. That same token, however, may also be able to be banked towards a multipart prize and saved for potential later redemption of a prize of greater value by redeeming more than one token at a time. Such an electronic game system using multipart prizes may be advantageous, for example, because it may require multiple orders or visits by users to win a prize.

The game interface 110 further comprises a done button 132 that a user can click when the user is done. In some embodiments, the system can be configured to also utilize a timer that exits out of the prize bank if the user does not click on anything within a predetermined amount of time. In some embodiments, the game interface 110 can additionally be configured to allow the user to select one or more of the banked prizes shown in the prize bank to add them to the current order. For example, if the user were to click on the milkshake 122 shown in the game interface 110, that milkshake may be added to the order summary 106 to indicate to the user that a free milkshake will now be part of the current order.

Referring to FIG. 1B, the electronic game shown on the game interface 110 has the appearance of being random and basing the prize on which apple 120 the user selects. However, in some embodiments, the prize, if any, to be awarded to a user can be configured to be predetermined before the user selects an apple. In these embodiments, the interactive game may be used more as something to keep the user engaged and to make the user feel like they have won something, rather than a random selector of a prize. As further described below, an electronic game system can be configured to determine or predetermine a prize for a user based on various factors. For example, an electronic game system may analyze the contents of the current order and/or the total value of the current order in determining a prize to award to the user. For example, if the user's order currently includes a milkshake, the electronic game system may be configured to award something other than a milkshake, since the user likely does not want two milkshakes on the same order. In another embodiment, the system may be configured to, for example, award a milkshake to the user when a milkshake is part of the current order, with a goal of having the user bank the item for a return visit instead of redeeming the item now. In another example, the system may be configured to award a prize that has a value relative to the total value of the current order. For example, if the value of the current order is $2.00, the system can be configured to only award prizes valued at a certain amount, such as less than 50 cents. If the order has a total value much higher, then the system may be configured to award a prize of a higher value.

In some embodiments, the system can also be configured to determine a prize to award to a user based on the user's information and/or past behavior. For example, the system may be configured to utilize the user's identification as provided by the identification provider 104 to look up past user information or behavior information for use in determining a prize. For example, the system may take into account how often the user visits the business, an average order size, and/or any preferences or health issues of the user. For example, the system may determine that the user is diabetic, and therefore not offer a milkshake as a prize, but rather a salad. In another example, the system may determine, for example, through a social media post of the user, that the user is on a diet, and therefore offer an appropriate item for the user's diet.

Figure 1E:
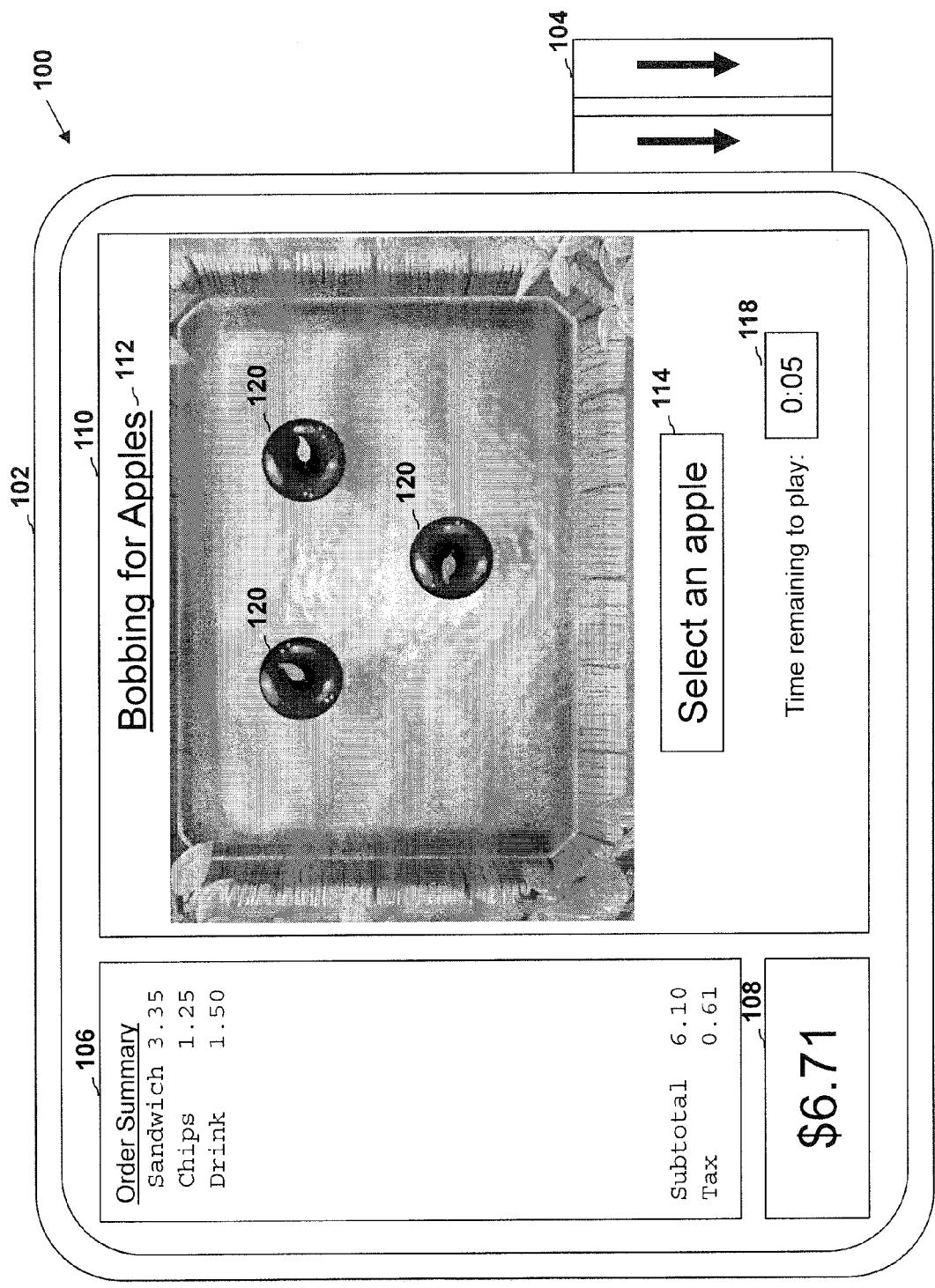
FIG. 1E is another embodiment of a schematic diagram illustrating the user access point system of FIG. 1A utilizing an electronic game system.

FIG. 1E is another embodiment of a schematic diagram illustrating the user access point system of FIG. 1A utilizing an electronic game system. The user access point system 102 illustrated in FIG. 1E is similar to the embodiment illustrated in FIG. 1B, except the game illustrated in FIG. 1E is different than the game illustrated in FIG. 1B. The game illustrated in FIG. 1E is also a Bobbing for Apples game and includes a pictorial representation of three apples 120 floating in water for a user to select. Upon selecting one of the apples 120, the system may be configured to display an interface similar to as is shown in FIG. 1C.

Figure 1F:
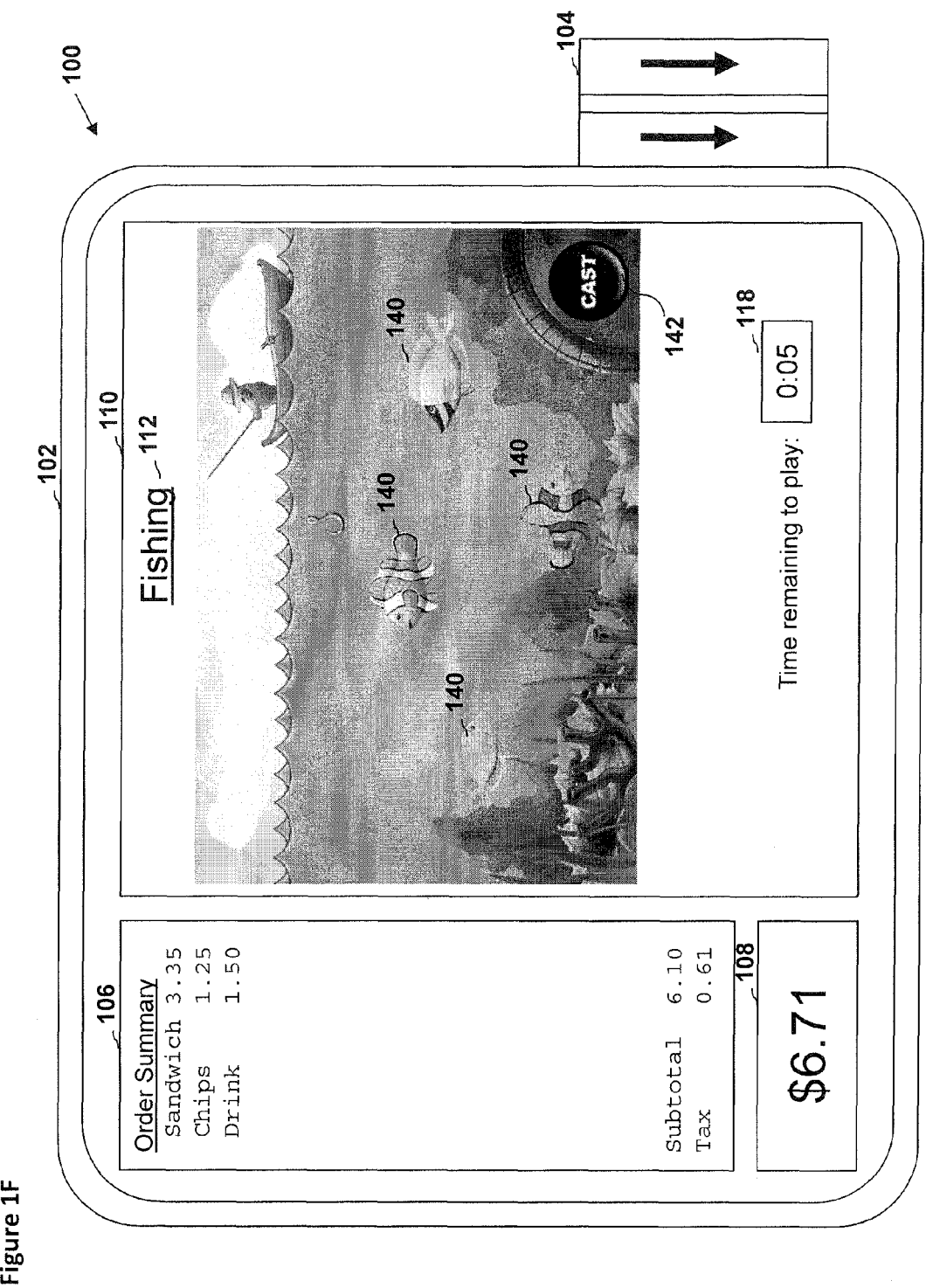
FIG. 1F is another embodiment of a schematic diagram illustrating the user access point system of FIG. 1A utilizing an electronic game system.

FIG. 1F is another embodiment of a schematic diagram illustrating the user access point system 102 of FIG. 1A utilizing an electronic game system. The embodiment shown in FIG. 1F is similar to the embodiment shown in FIG. 1B, but with a different game displayed on the game interface 110. In this embodiment, rather than a Bobbing for Apples game, the game interface 110 is presenting a fishing game. In this embodiment, the game comprises multiple fish 140 that may be caught by a player after the player presses the cast button 142. When a player presses the cast button 142, the hook shown on the game interface 110 may or may not catch one of the fish 140. If one of the fish 140 is caught, the user may win a prize as shown in FIG. 1G.

Figure 1G:
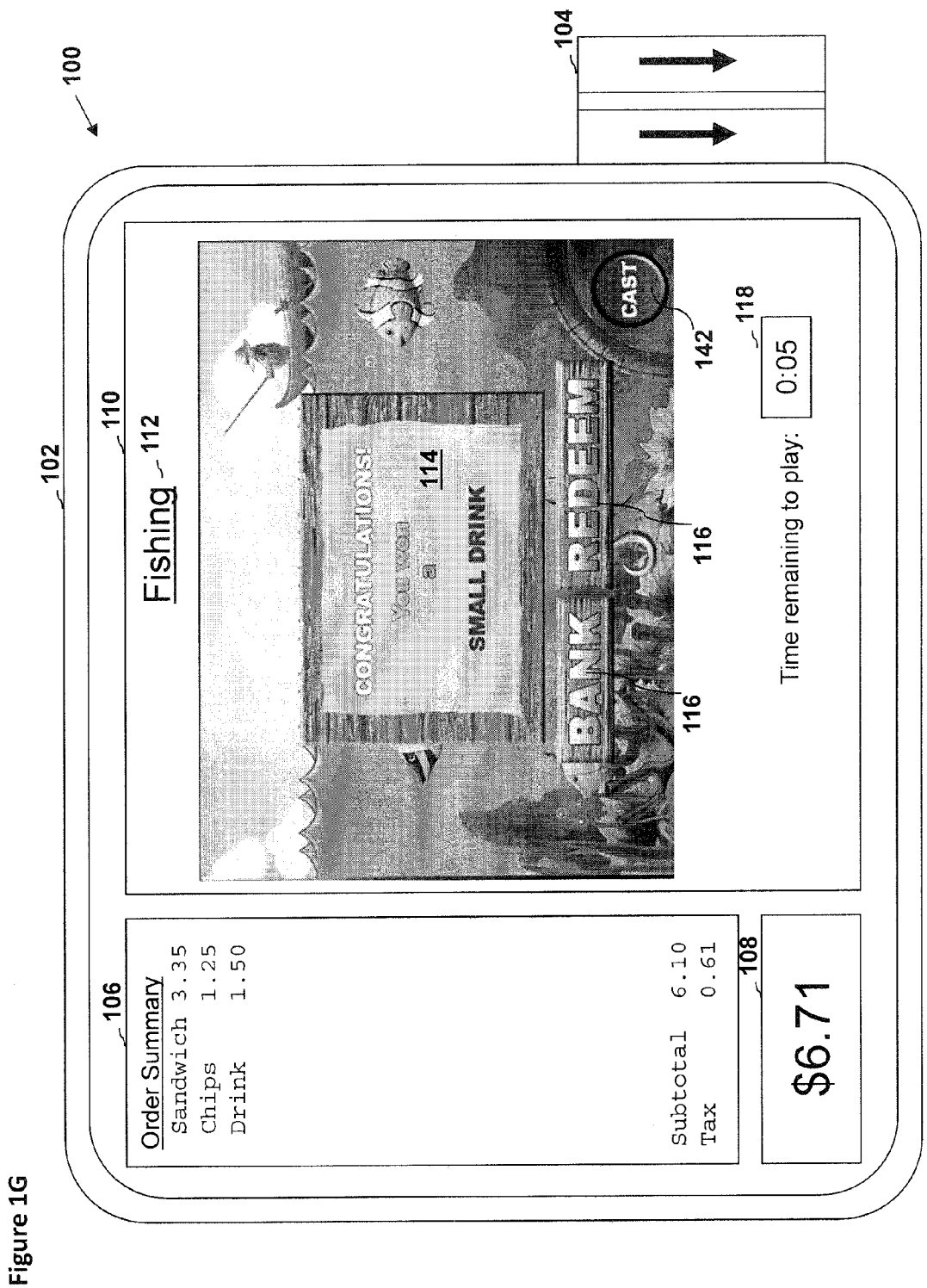
FIG. 1G is another embodiment of a schematic diagram illustrating the user access point system of FIG. 1A utilizing an electronic game system.

FIG. 1G is another embodiment of a schematic diagram illustrating the user access point system 102 of FIG. 1A utilizing an electronic game system. In this embodiment, the fishing game shown in FIG. 1F is illustrating to a user that the user has won a small drink. The game interface 110 includes a notification window 114 and two buttons 116. In this embodiment, the buttons 116 include a bank button and a redeem button. The bank button may be used by a user to bank the prize, and the redeem button may be used by a user to redeem the prize along with the user's current order.

Figure 1H:
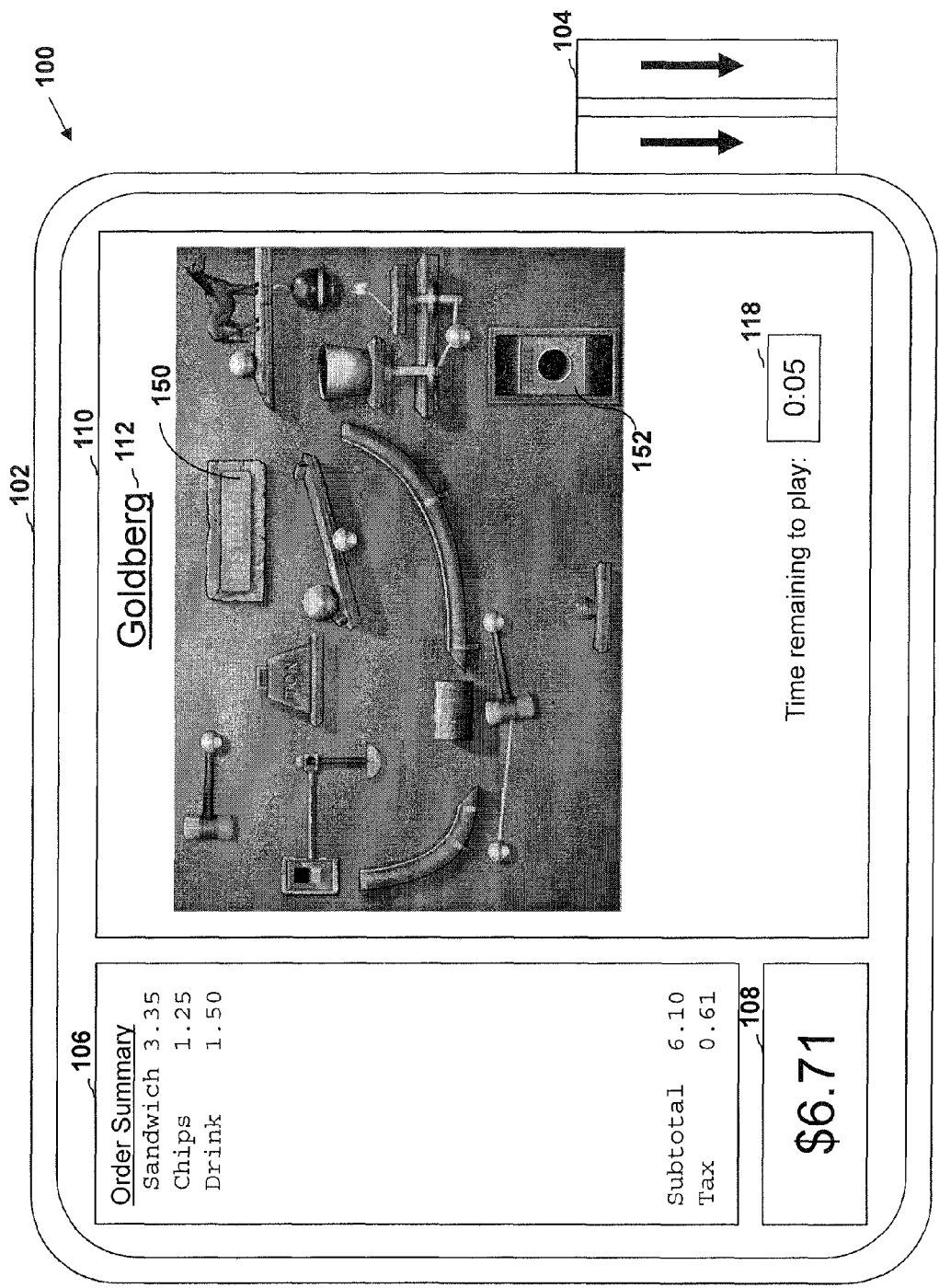
FIG. 1H is another embodiment of a schematic diagram illustrating the user access point system of FIG. 1A utilizing an electronic game system.

FIG. 1H is yet another embodiment of a schematic diagram illustrating the user access point system 102 of FIG. 1A utilizing an electronic game system. The embodiment shown in FIG. 1H is similar to the embodiment shown in FIG. 1B, but with a different interactive electronic game illustrated. In this embodiment, the game interface 110 is illustrating a game called Goldberg. In this game, the game is configured to enable a user to click on or otherwise select the start button 150, and the screen will illustrate an animated Rube Goldberg type machine with a ball ending in the prize area 152. Once the animation is completed, the user interface 102 can be configured to display a prize to the user.

Figure 2C:
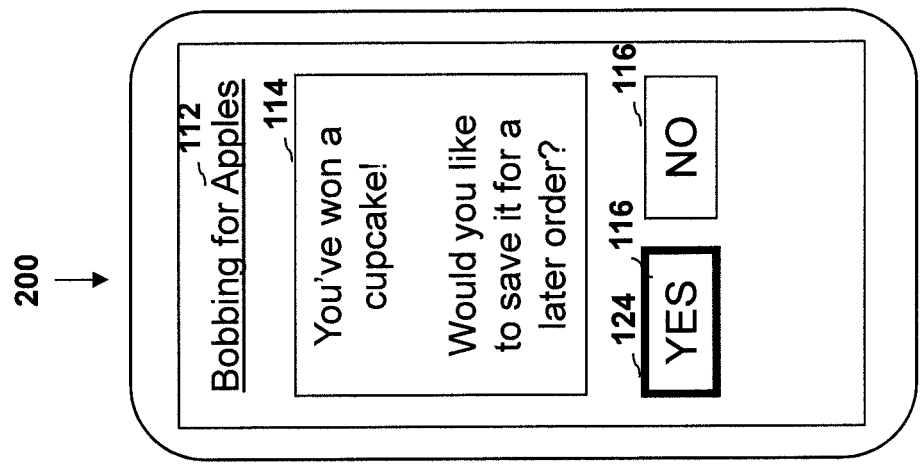
FIG. 2C is another embodiment of a schematic diagram illustrating the user access point system of FIG. 2A utilizing an electronic game system.
Figure 2B:
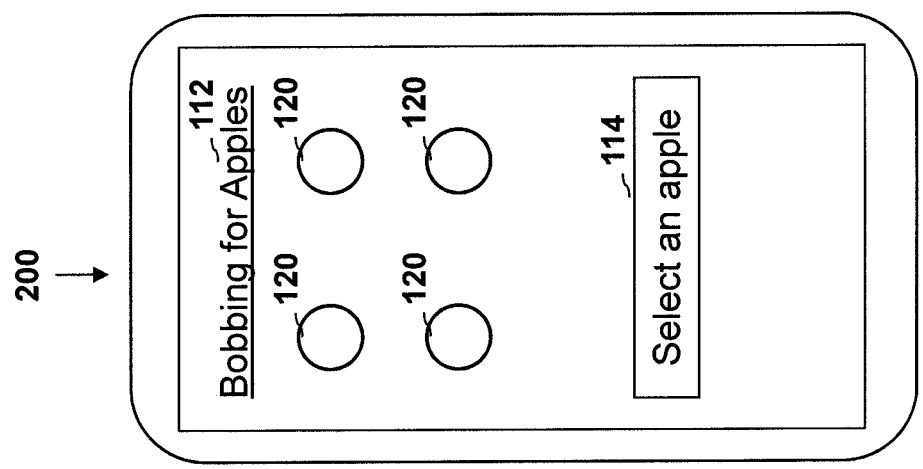
FIG. 2B is another embodiment of a schematic diagram illustrating the user access point system of FIG. 2A utilizing an electronic game system.
Figure 2A:
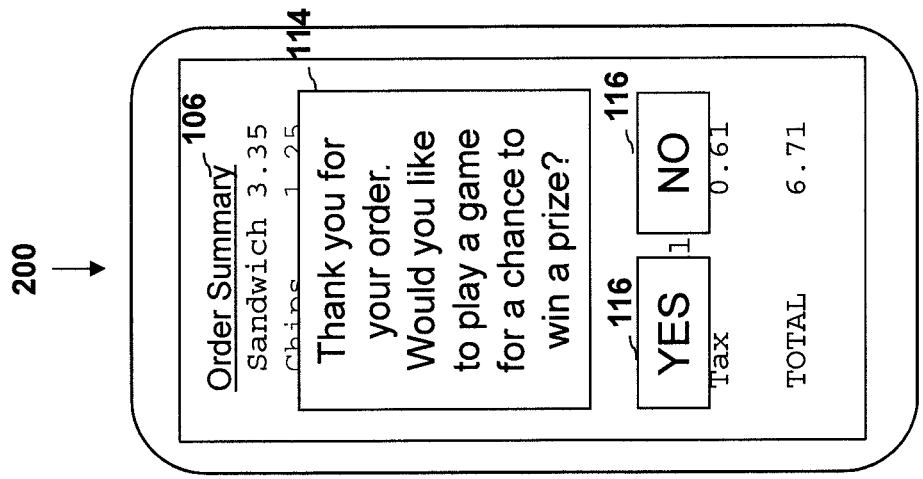
FIG. 2A is an embodiment of a schematic diagram illustrating a user access point system utilizing an electronic game system.

FIGS. 2A through 2C illustrate an embodiment of a schematic diagram illustrating a user access point system utilizing an electronic game system. The embodiment illustrated in FIGS. 2A through 2C illustrates a similar electronic game to the one illustrated in FIGS. 1A through 1D. However, FIGS. 2A through 2C illustrate the use of a user access point system 200, such as a user's smartphone. In this embodiment, rather than the user access point system 100 being part of a point of sale system in a fast food restaurant, the user access point system 200 is a computing device owned or being used by the user placing an order. In this example, the user may be placing an order with a restaurant through his or her smartphone while the user is either at the restaurant or away from the restaurant.

FIG. 2A illustrates the user access point system 200 showing an order summary 106 overlaid with a dialogue box 114 and buttons 116. In this embodiment, the user has finished entering an order and the dialogue box 114 is now asking the user whether the user would like to play a game for a chance to win a prize. If the user selects the yes button, the user access point system 200 can be configured to display the interface shown in FIG. 2B. The user access point system in FIG. 2B illustrates that a similar Bobbing for Apples game to the game illustrated in FIGS. 1B through 1C is offered for play to the user. A dialogue box 114 indicates that the user should select an apple from the four apples 120 illustrated by the user access point system 200. After the user has selected an apple 120, the interface shown in FIG. 2C can be displayed. The interface shown on the user access point system 200 in FIG. 2C indicates that the user has won a cupcake and asks if the user would like to save the cupcake for a later order. If the user indicates he or she would like to save the prize for a later order, the user access point system 200 can be configured to display the user's prize bank, similar to as illustrated in FIG. 1D.

Various embodiments of the user access point systems and electronic game systems described herein are described with reference to a user access point system at a fixed location inside a business, or a portable user access point system carried by a user. However, a user access point system does not have to be utilized inside a business. For example, in some embodiments, an electronic game system can be configured to interact with a user access point system while a user is in, for example, a drive-through of a fast food restaurant. A drive-through can be different than order taking locations inside of a business, because a drive-through at some businesses comprises a single file queue. On the other hand, the business may have multiple ordering locations taking orders and distributing orders simultaneously inside the business. An electronic game system may be implemented at a drive-through and may be able to enable users to check in and/or to identify users at practically any point in the drive-through, such as at the ordering location, between the ordering location and the order pickup location, or at the pickup location. In some embodiments, a fixed user access point system may be positioned to be accessible by a user sitting in a vehicle while the user is either in line at a fast food restaurant or at an ordering location or order pickup location. In other embodiments, for example, a code or other identification means is located at an ordering location and/or order pickup location of a drive-through of a fast food restaurant to enable, for example, a user to check in at the restaurant while in the fast food line. For example, a QR code may be positioned on a menu at a drive-through, on a wall of a restaurant viewable from the drive-through, or at an order pickup window. The QR code may be configured to be viewable by, for example, a smart phone carried by a user in the drive-through line. In some embodiments, the system may be configured to utilize, for example, a near field communication device configured to enable a user to bump his or her device against to check-in.

Figure 3A:
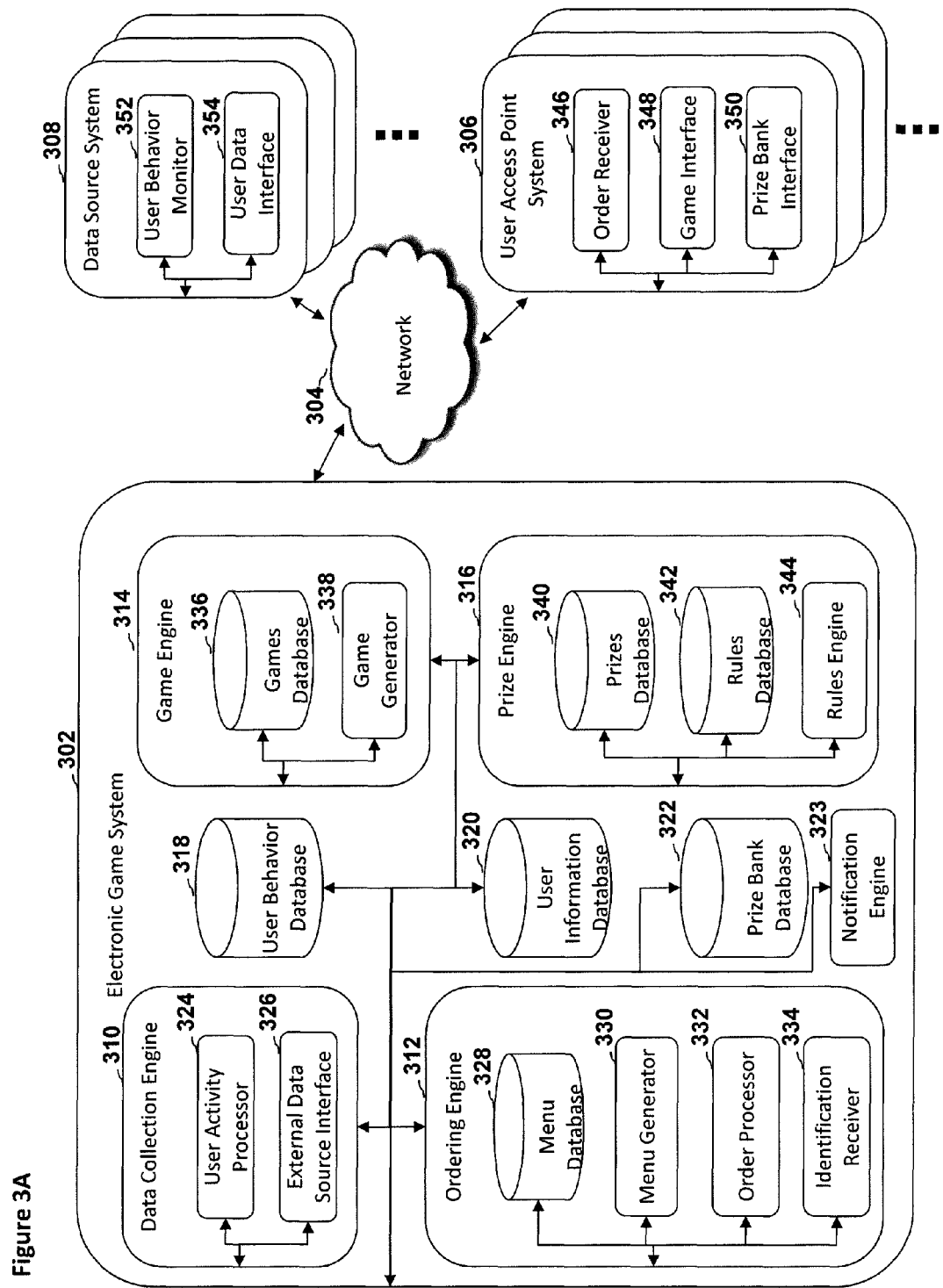
FIG. 3A is a block diagram depicting an embodiment of an electronic game system in communication with one or more other systems.

FIGS. 3A through 3D illustrate various embodiments of electronic game systems and data collection engines in communication with other systems in order to implement the concepts described herein. FIG. 3A is a block diagram depicting an embodiment of an electronic game system in communication with one or more other systems. In some embodiments, a fulfillment system for taking and processing orders and for managing awards or prizes comprises the electronic game system 302 combined with one or more of the other systems illustrated in FIG. 3A. In this embodiment, FIG. 3A illustrates an electronic game system 302, a network 304, one or more user access point systems 306, and one or more data source systems 308. The electronic game system 302 can be configured to generate interactive electronic games for use by a user access point system 306 to be played by a user. The electronic game system 302 can additionally be configured to receive and process orders from a user access point system 306, collect data relating to users, and/or determine prizes to be awarded in games. The electronic game system 302 can be configured to communicate with the data source systems 308 and user access point systems 306 through the network 304. The network 304 may be, for example, a local area network, the internet, a cellular network, a Bluetooth wireless network, or any other electronic network capable of allowing the electronic game system 302, data source systems 308, and/or user access point systems 306 to electronically communicate. In some embodiments, the functions of the data source systems 308 and/or the user access point systems 306 can be integrated into the electronic game system 302. In some embodiments, the functions of the electronic game system 302 can be integrated into the data source systems 308 and/or user access point systems 306.

The electronic game system 302 comprises a data collection engine 310, an ordering engine 312, a game engine 314, a prize engine 316, a user behavior database 318, a user information database 320, a prize bank database 322, and a notification engine 323. The data collection engine 310 can be configured to monitor and store user activity and behavior information. The data collection engine 310 comprises a user activity processor 324 and an external data source interface 326. In some embodiments, the user activity processor 324 can be configured to monitor activity of users, such as how often they place orders or visit a business, what an average order size is of the user's orders, what items a user orders, and/or various other types of user information. The user activity processor 324 can be configured to store this user information in, for example, the user information database 320 and/or the user behavior database 318. The data collection engine 310 can be configured to not only monitor and store user information relating to user interactions with the electronic game system 302, but to also retrieve user information and behavior information from external data sources. For example, the external data source interface 326 can be configured to interface with a data source system, such as one or more of the data source systems 308, to retrieve user information and behavior information related to users of the electronic game system 302.

The various data source systems 308 can be configured to monitor user behavior and/or other user information and to provide this information to electronic game systems. A data source system 308 comprises a user behavior monitor 352 and a user data interface 354. The user behavior monitor 352 can be configured to monitor, for example, user interactions with the data source system 308 and to store information relating to these interactions. The user behavior monitor 352 in some embodiments can be configured to monitor user behavior without the user having to necessarily interact with the data source system 308. The user data interface 354 can be configured to allow another system to access the user information and user behavior information monitored and stored by the data source system 308. In some embodiments, a data source system 308 may comprise, for example, a social networking system, a business monitoring system, a credit monitoring system, an electronic game system separate from the electronic game system 302, user monitoring systems at other businesses or restaurants, and/or the like.

Utilizing information from an external data source system 308 can be advantageous, because it can allow an electronic game system 302 to determine prizes for a specific user based on information the electronic game system 302 may not otherwise have access to. For example, a fast food restaurant may not want to offer fattening foods as prizes to a customer that is currently on a diet and/or trying to lose weight. In some embodiments, an electronic game system 302 at a restaurant may not have a method of determining that any of its customers are currently on a diet without collecting this data from an external source. However, an electronic game system 302 may be configured to obtain this information from one or more data source systems 308. In one example, a data source system 308 may comprise a social network where a user posts information indicating or implying that he or she is currently on a diet. The data collection engine 310 may be configured to retrieve this information from that data source system 308, which would then allow the electronic game system 302 to generate or determine prizes for that customer based on the indication that the customer is currently on a diet. In other embodiments, an external data source system 308 may comprise a medical health records database that enables the data collection engine 310 to access health information related to users of the electronic game system 302, enabling the electronic game system 302 to determine prizes appropriate to the user's current health.

The data collection engine 310 can be configured to store information related to users of the electronic game system 302, such as customers of a restaurant, in the user information database 320 and/or user behavior database 318. The information stored in these databases may include not only user information collected by the user activity processor 324, but also data collected by the external data source interface 326 from various data source systems 308. The data stored in the user behavior database 318 and user information database 320 can be configured to be used by other engines of the electronic game system 302 in generating games, determining appropriate prizes, and/or processing orders from users.

The ordering engine 312 of the electronic game system 302 comprises a menu database 328, a menu generator 330, an order processor 332, and an identification receiver 334. The menu database 328 can be configured to store information related to the menu of a specific restaurant. The menu generator 330 can be configured to communicate with the menu database 328 to generate menus for display to a user of the electronic game system 302. For example, the menu generator 330 may be configured to generate an interface for display to an employee of a restaurant in entering an order from a customer. In another embodiment, the menu generator 330 can be configured to create an order for display directly to the customer to allow the customer to enter his or her own order. The ordering engine 312 can be configured to transmit the generated menu to a user access point system 306 to enable receipt of an order by the user access point system 306.

The order processor 332 can be configured to receive an order from, for example, a user access point system 306, and to process that order. In some embodiments, processing the order may comprise printing an order ticket for handling by an employee of the business. In other embodiments, processing the order may comprise sending information to an order processing system to instruct that system to complete the order. For example, the order processor 332 may be configured to transmit information to a system that automatically fulfills orders.

The identification receiver 334 can be configured to receive identifying information from a customer. In one embodiment, the identification receiver 334 can be the identification provider 104 illustrated in FIGS. 1A through 1D. In other embodiments, the identification receiver 334 can be configured to receive various types of information from, for example, a user access point system 306 to be used in identifying a user or customer. For example, a user access point system 306 may comprise a smartphone or personal computer of a user that has a specific IP address, MAC address, Bluetooth ID, or other identifier. The identifying information received by the identification receiver 334 can be utilized by other portions of the electronic game system 302 in collecting user data, determining appropriate prizes for a user, and/or generating interactive electronic games for the user.

The game engine 314 comprises a games database 336 and a game generator 338. The games database 336 can be configured to store data related to various games the electronic game system can offer a user to play. For example, the games database 336 may contain information relating to the Bobbing for Apples game illustrated in FIGS. 1A through 1D and 2A through 2C. The games database 336 may contain information related to various other games, too. The game generator 338 can be configured to generate a game for a specific user by selecting a game from the games database 336 and communicating with the prize engine 316 to determine a prize or pool of prizes to be awarded upon playing the game generated by the game generator 338. In some embodiments, the game generator 338 is configured to generate a game with a single predetermined prize. In other embodiments, the game generator 338 is configured to generate a game with a pool of predetermined prizes, wherein upon playing the game, the game will randomly choose a prize from among the pool of predetermined prizes. The game engine 314 can be configured to transmit the game generated by the game generator 338 through the network 304 to one or more user access point systems 306.

The prize engine 316 comprises a prizes database 340, a rules database 342, and a rules engine 344. The prize engine 316 can be configured to determine from a larger pool of prizes what single individual prize or what smaller pool of prizes is appropriate or should be awarded to a specific user when the user plays a game generated by the game engine 314. The prizes database 340 can be configured to store data related to all prizes the electronic game system 302 can potentially award to users or customers. Examples of prizes an electronic game system 302 may be configured to award include food items, clothing, discounts on items or orders, and/or various other types of items, such as promotional items. The prizes database 340 may also be configured to store information related to each potential prize, such as a value of that prize, whether certain attributes of a user or order must exist for that prize to be awarded, a quantity of that prize available, and various other information specific to each prize.

The rules engine 344 can be configured to apply rules stored in the rules database 342 to determine a specific prize to be awarded to a user or customer and/or a specific pool of prizes from which a prize should be randomly chosen for a user or customer. The rules engine 344 in some embodiments can be configured to analyze information about the current order, user information, and/or user behavior information in determining a prize or prize pool for the user. For example, rules that are applied by the rules engine 344 could be based on how much money the user has spent in this order and/or previous orders, how many loyalty points the user has in a loyalty point account, how frequently the user or customer visits the business and/or places orders with the business, a length of time since the last time a user visited the business or placed an order with the business, and various other rules. For example, one rule may comprise that if a user is a frequent customer that a lower value prize should be awarded to reduce monetary loss to the business. However, a different rule may comprise offering higher value prizes to a frequent user or customer, to show the business' appreciation of that user. In some embodiments, rules may comprise or be based on the contents of an order, such as that an order includes a cheeseburger and a drink. A rule could be based on the number of items in an order, regardless of the contents of the order. In some embodiments, the rules engine 344 is configured to evaluate both a user or customer's past behavior along with what is transpiring in the current order to determine a prize to be awarded in association with the current order.

In some embodiments, the prize engine 316 can be configured to determine something other than a prize or in additional to a prize, such as an offer to do something for a user or customer. For example, the electronic game system 302 may be configured to monitor a gift card balance. The prize engine 316 may be configured to determine that the "prize" should be an offer to recharge the user's gift card if the gift card balance is below a threshold amount. In some embodiments, this offer may also include a "prize" that the electronic game system will provide some or all of the money to recharge the gift card. In other embodiments, the offer is merely a service allowing the user to use his or her own money to recharge the gift card. In other embodiments, the prize engine 316 may be configured to determine to offer the user to schedule a follow-up appointment, to post something to the user's social network account, to send an electronic message to a friend of the user, and/or various other things the system could offer to do for a user that, for example, may help to maintain that user's loyalty to the business operating the electronic game system.

The prize bank database 322 of the electronic game system 302 can be configured to store data relating to prizes that users have banked for later redemption. The notification engine 323 can be configured to generate notifications to send to, for example, a user access point system 306 to notify a user of various things. For example, the notification engine 323 may be configured to generate and send a notification to a user that a prize in that user's prize bank is about to expire to remind the user to return to the business to redeem the prize. In another example, the notification engine 323 may be configured to send a notification to a user access point system 306 to remind the user that the user has an opportunity to play a game to win a prize. In some embodiments, such as described in further detail below, an electronic game system can be configured to enable a user to play an interactive electronic game at any time, rather than being associated with the receipt of an order from the user.

The user access point system 306 comprises an order receiver 346, a game interface 348, and a prize bank interface 350. The order receiver 346 can be configured to receive an order from a user. For example, the order receiver 346 may comprise an order entry portion of a point of sale system at a restaurant. In another example, the order receiver 346 may comprise a user interface of a customer's smartphone to allow the user to enter an order himself or herself. The user access point system 306 can be configured to send orders received by the order receiver 346 through the network 304 to the ordering engine 312 of the electronic game system 302.

The game interface 348 can be configured to allow a user to play a game generated by the game engine 314 of the electronic game system 302. The game interface 348 may comprise, for example, the game interfaces 110 illustrated in FIGS. 1A through 2C. The prize bank interface 350 can be configured to, for example, display to a user prizes stored in the user's prize bank, for example, based on information received from the electronic game system 302. The prize bank interface 350 can be configured to enable a user to select one or more prizes to add to an order being received by the order receiver 346.

Figure 3B:
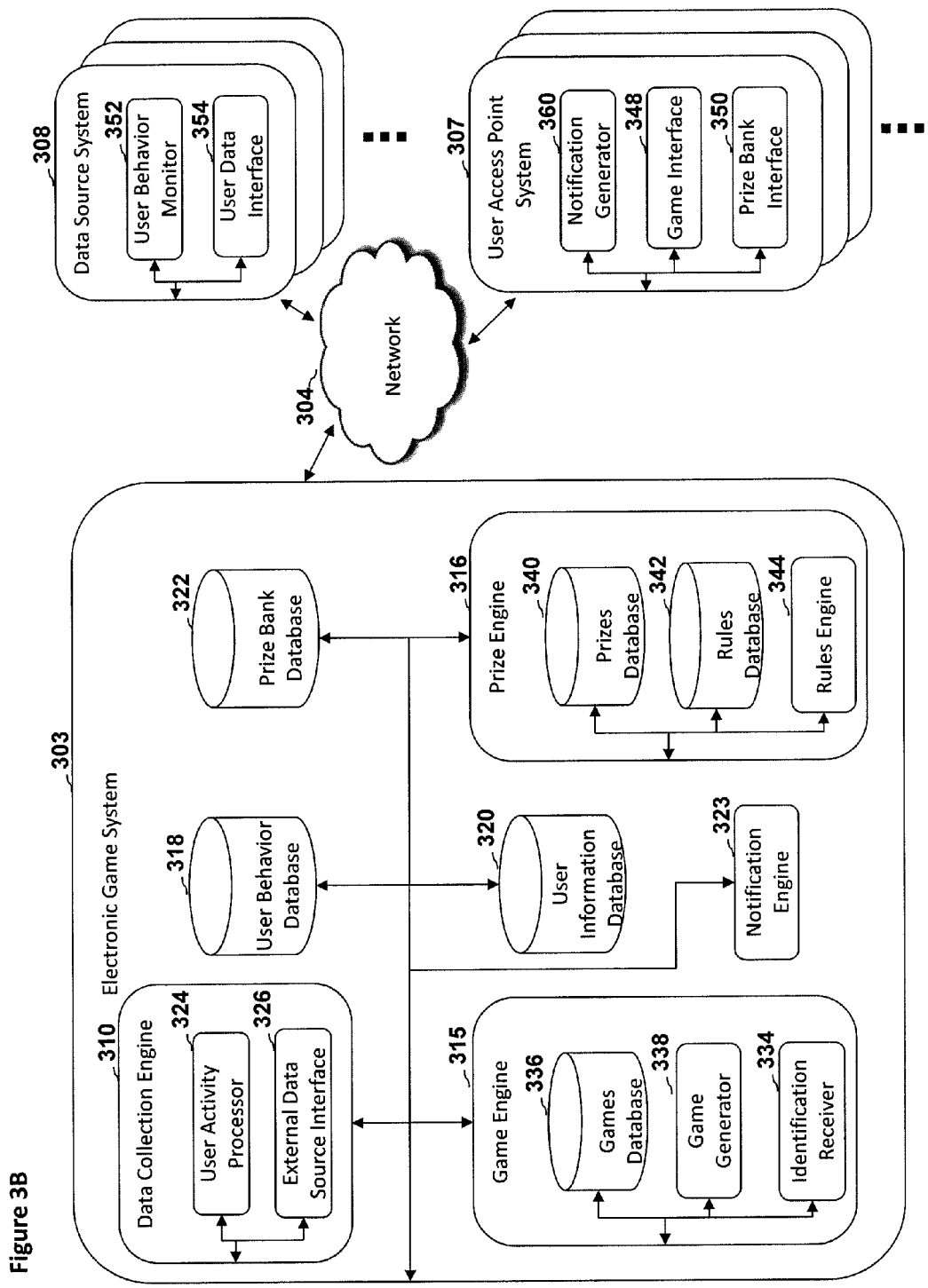
FIG. 3B is a block diagram depicting another embodiment of an electronic game system in communication with one or more other systems.

FIG. 3B is a block diagram depicting another embodiment of an electronic game system 303 in communication with one or more other systems through a network 304. The systems shown in FIG. 3B are similar to the systems shown in FIG. 3A, but illustrate that the functions of an electronic game system as disclosed herein do not have to be connected to or associated with an ordering system. Rather, interactive electronic games can be generated at arbitrary times and played by a user whenever the user wants to play the game. In some embodiments, a fulfillment system for managing awards or prizes comprises the electronic game system 303 combined with one or more of the other systems illustrated in FIG. 3B. In this embodiment, the electronic game system 303 comprises a data collection engine 310, a prize engine 316, a user behavior database 318, a user information database 320, a prize bank database 322, and a notification engine 323 as with the electronic game system 302 shown in FIG. 3A. However, the electronic game system 303 does not include an ordering engine configured to generate menus and/or process orders from users. Additionally, the game engine 315 of the electronic game system 303 differs from the game engine 314 of the electronic game system 302 shown in FIG. 3A by the addition of an identification receiver 334. The identification receiver 334 can be configured to operate similarly to the identification receiver 334 of the ordering engine 312 shown in FIG. 3A.

The user access point systems 307 shown in FIG. 3B comprise a notification generator 360, a game interface 348, and a prize bank interface 350. The game interface 348 and prize bank interface 350 can be configured to operate similarly to as described with reference to FIG. 3A above. The notification generator 360 can be configured to notify a user of the user access point system 307 when, for example, a new game is available to be played, a new prize may be available, there is an offer from the electronic game system 303 to play a game, and/or various other types of notifications.

In this embodiment, a user access point system 307 can be configured to enable a user to play interactive electronic games whenever the user wants to play a game and/or whenever the electronic game system 303 indicates to the user access point system 307 that a game is available to be played. The systems shown in FIG. 3B, along with various other systems described herein, may be configured to implement prize rules that enable users to play a game whenever they want but still enable the business to not lose money by awarding excessive prizes. For example, a rule stored in the rules database 342 may comprise that prizes can only be awarded to a user every predetermined number of days or hours or other timeframe. Another rule may comprise that a certain predetermined value of prizes can only be awarded to a user in a predetermined amount of time. Therefore, if a user plays games generated by the electronic game system 303 often, that user may experience more games that result in no prize awarded and/or lower-value prizes being awarded. In some embodiments, rather than awarding no prize, a system can be configured to award virtual prizes, such as an electronic sticker or badge, listing the user as a frequent user or a user of a certain level, etc. Virtual prizes may also be advantageous for an electronic game system to award as prizes, because some users may prefer virtual prizes. For example, a virtual prize may be relatively easy to post to a social networking account or similar to brag or boast to a user's friends about the prize the user was awarded. Virtual prizes may also cost less to award and/or redeem.

Figure 3C:
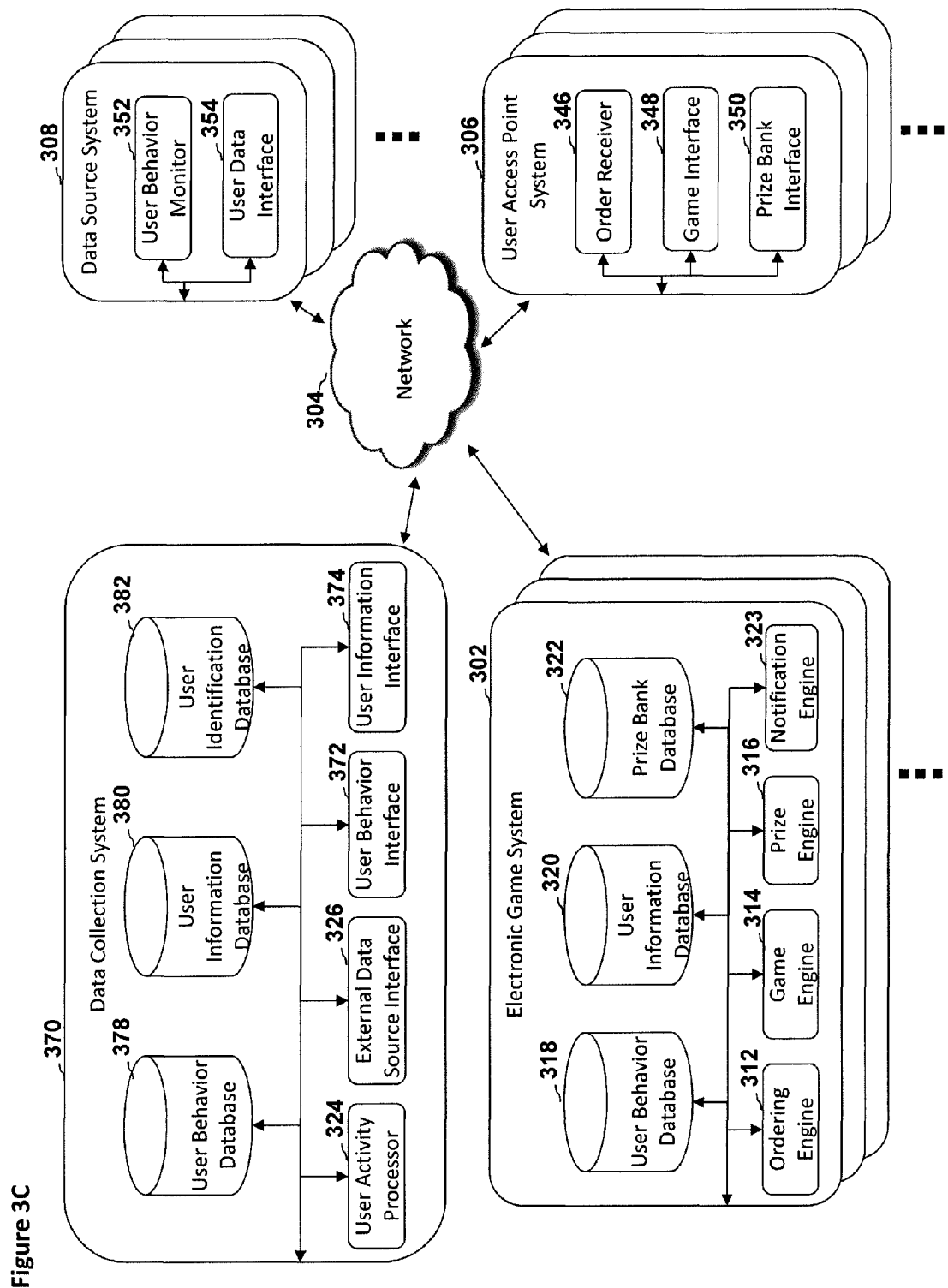
FIG. 3C is a block diagram depicting an embodiment of a data collection system in communication with one or more electronic game systems and/or other systems.

FIG. 3C is a block diagram depicting an embodiment of a data collection system 370 in communication with one or more electronic game systems 302 and/or other systems. The systems illustrated in FIG. 3C illustrate that the data collection functions performed by, for example, the data collection engine 310 shown in FIG. 3A may be included in a separate data collection system 370 that is configured to serve user information to one or more electronic game systems 302. A system such as shown in FIG. 3C may be advantageous, for example, to enable a data collection system to serve user information to electronic game systems of multiple businesses and/or business locations. In one embodiment, the data collection system 370 comprises a cloud-based system or remote system configured to communicate with electronic game systems 302 located at various individual business locations. In some embodiments, a fulfillment system for taking and processing orders and for managing awards or prizes comprises the data collection system 370 combined with one or more of the other systems illustrated in FIG. 3C.

The data collection system 370 comprises a user activity processor 324 and an external data source interface 326 similar to the user activity processor and external data source interface of the data collection engine 310 shown in FIG. 3A. The data collection system 370 further comprises a user behavior database 378 and a user information database 380.

The user information and behavior databases can be configured to store information similar to the information stored in the user information database 320 and user behavior database 318 of the electronic game systems 302 shown in both FIGS. 3A and 3C. The data collection system 370 further comprises a user behavior interface 372 and a user information interface 374. The user behavior and user information interfaces can be configured to enable electronic game systems 302 to communicate with the data collection system 370 through the network 304 to obtain user information and user behavior information from the data collection system 370 and/or to send information to the data collection system 370 relating to user of that specific electronic game system 302.

The data collection system 370 further comprises a user identification database 382. The user identification database 382 can be configured to store data enabling the identification of various users and to link the data relating to those users to user information of various specific electronic game systems 302. This may be advantageous, because the data collection system 370 may be configured to store and collect data related to a wide variety of people or users, and each electronic game system 302 may only require information on or related to a subset of those people or users. Additionally, in some embodiments, different electronic game systems 302 may use different identifiers or unique identifiers to identify their users. In one example, one electronic game system 302 may utilize an identifier of 1234 for user Joe Smith. Another electronic game system 302 may use an identifier of ABCD for the same user Joe Smith. The data collection system 370 can be configured to create a unique identifier for each user or person in its data collection system. For example the same person Joe Smith may have information stored in the data collection system 370, and the data collection system 370 may use a unique identifier of WXYZ for Joe Smith. The user identification database 382 may be configured to store data indicating that Joe Smith identified by unique identifier WXYZ is the same Joe Smith identified by one electronic game system's identifier of 1234 and another electronic game system's identifier of ABCD. This can be advantageous to allow the data collection system 370 to store data only one time for each unique user in its system, but to allow different electronic game systems to refer to their users using their own identifiers or identifying information.

Figure 3D:
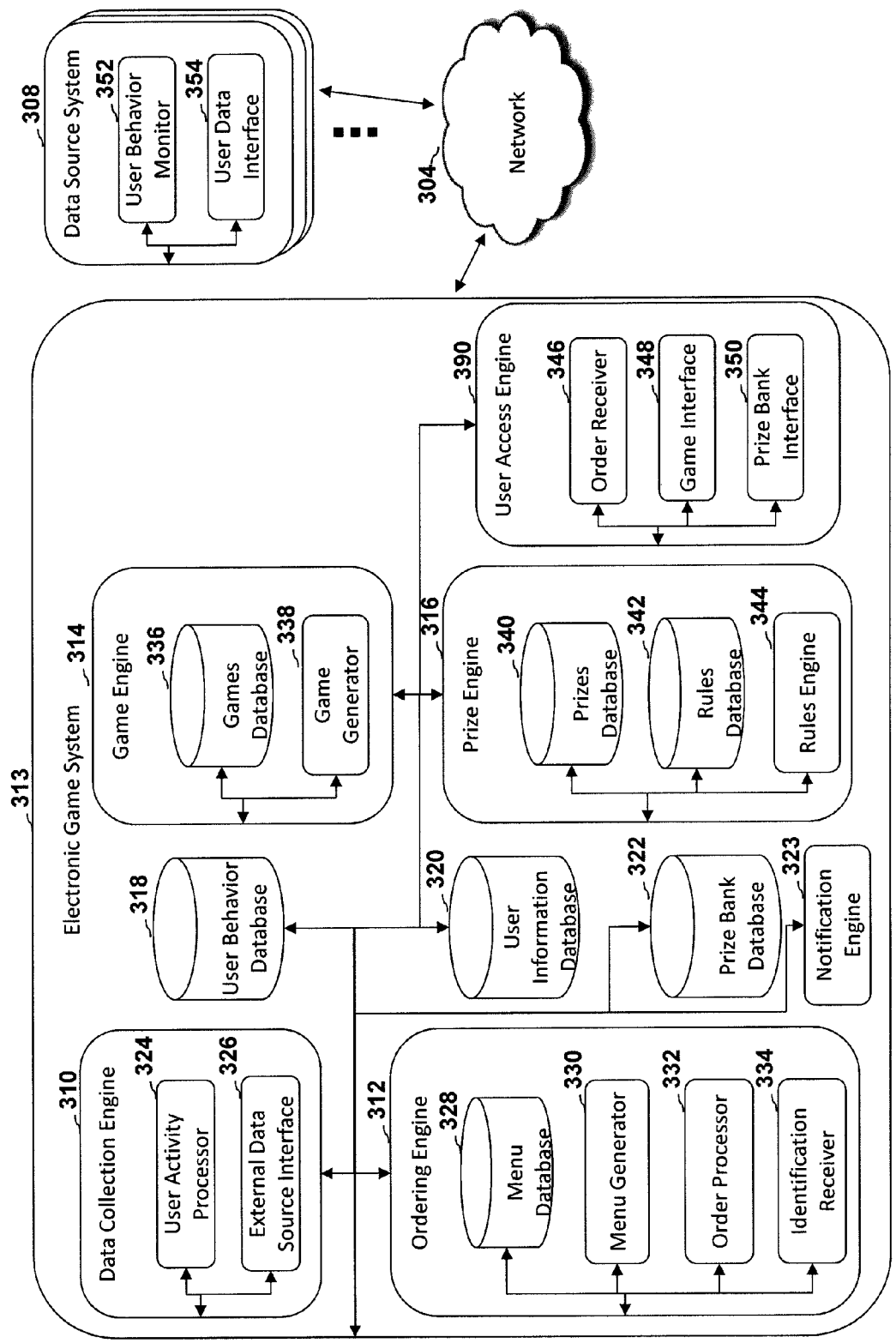
FIG. 3D is a block diagram depicting another embodiment of an electronic game system in communication with one or more other systems.

FIG. 3D is a block diagram depicting another embodiment of an electronic game system 313 in communication with one or more other systems. The systems shown in FIG. 3D illustrate that an electronic game system can be configured to allow a user to interact directly with the electronic game system to place orders and/or play interactive electronic games, rather than having to use a user access point system as illustrated in FIG. 3A. However, the electronic game system 313 may also in some embodiments communicate with user access point systems, such as the user access point systems 306 shown in FIG. 3A. In some embodiments, a fulfillment system for taking and processing orders and for managing awards or prizes comprises the electronic game system 313 combined with one or more of the other systems illustrated in FIG. 3D.

The electronic game system 313 is similar to the electronic game system 302 shown in FIG. 3A, except the electronic game system 313 further comprises a user access engine 390. The user access engine 390 comprises an order receiver 346, a game interface 348, and a prize bank interface 350, each of which are configured to operate similarly to the components of the user access point systems 306 shown in FIG. 3A, as described above.

Figure 4A:
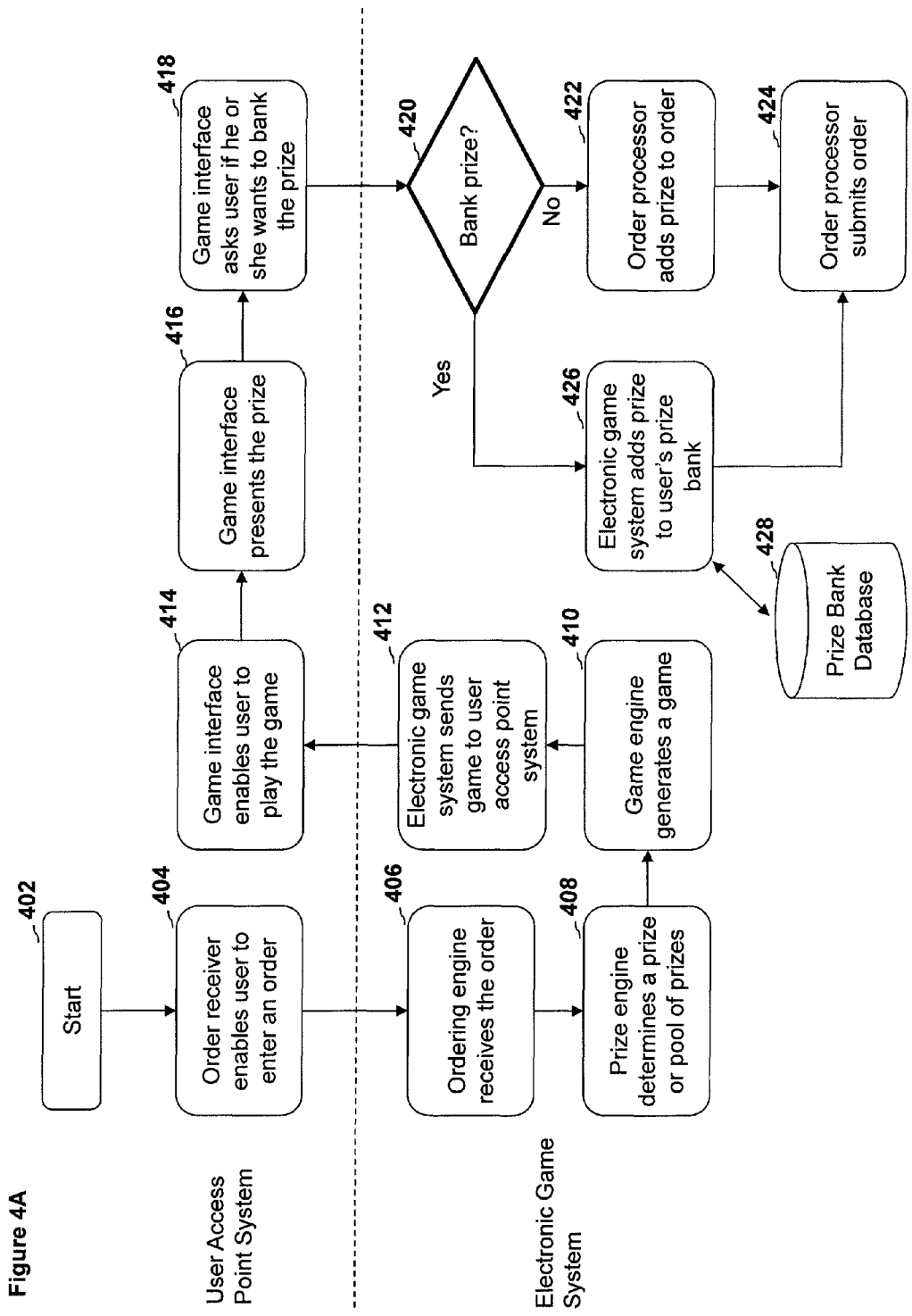
FIG. 4A depicts an embodiment of a process flow diagram illustrating an example of operating an electronic game system to determine and award a prize to a user.

FIG. 4A depicts an embodiment of a process flow diagram illustrating an example of operating an electronic game system to determine and award a prize to a user. The process flow illustrated in FIG. 4A may be performed by, for example, the systems depicted in FIG. 3A. The process flow illustrated in FIG. 4A depicts an embodiment of a user access point system receiving an order from a user and allowing the user to play a game that can present an awarded prize to the user.

At block 402 the process begins. At block 404, an order receiver enables a user to enter an order. For example, the order receiver 346 of the user access point system 306 shown in FIG. 3A can be configured to receive an order for food items from a user of the user access point system. At block 406, an ordering engine receives the order. For example, the ordering engine 312 of the electronic game system 302 can be configured to receive the order from the user access point system through a network.

At block 408, a prize engine determines a prize or pool of prizes for the user. For example, the prize engine 316 of the electronic game system 302 can be configured to apply rules to determine a single prize or a pool of prizes to potentially award to the user. At block 410, a game engine generates a game. For example, the game engine 314 of the electronic game system 302 can be configured to generate a game that includes the determined prize or pool of prizes from block 408.

At block 412, the electronic game system sends the game to the user access point system. For example, the electronic game system 302 can be configured to send the generated game through the network 304 to the user access point system 306. At block 414, a game interface enables the user to play the game. For example, the game interface 348 of the user access point system 306 can be configured to display the generated game to the user through an interactive interface, such as a touch screen interface. The game interface can be configured to allow the user to interact with the game using the interactive interface to play the game.

At block 416, the game interface presents the determined prize. In some embodiments, the game interface is configured to merely present the single determined prize that was determined at block 408. In other embodiments, the game interface is configured to randomly select a prize from a pool of prizes determined at block 408. At block 418, the game interface asks the user if he or she would like to bank the prize. For example, the game interface can be configured to ask the user if the prize should be added to the current order or if it should be added to the user's prize bank.

At block 420 the electronic game system determines whether the user requested to bank the prize. If the user did not request to bank the prize, the process flow moves to block 422 and an order processor adds the prize to the current order. For example, the order processor 332 of the ordering engine 312 shown in FIG. 3A can be configured to edit the order received at block 406 to add the determined prize to that order. At block 424, the order processor submits the order. For example, the order processor 332 can be configured to submit the final order to another order processing system, to print out a summary of the order for processing by an employee, or to otherwise process the order, such as by submitting the order to a fulfillment system.

Returning to block 420, if the user indicated he or she wanted to bank the prize, the process flow moves to block 426. At block 426, the electronic game system adds the prize to the user's prize bank. For example, the electronic game system can be configured to add the prize to data in a prize bank database shown at block 428 indicating that the awarded prize is now in the user's prize bank. The prize bank database shown at block 428 can be, for example, the prize bank database 322 shown in FIG. 3A. After the electronic game system adds the prize to the user's prize bank, the process flow moves to block 424 and the order processor submits the order, as described above.

Figure 4B:
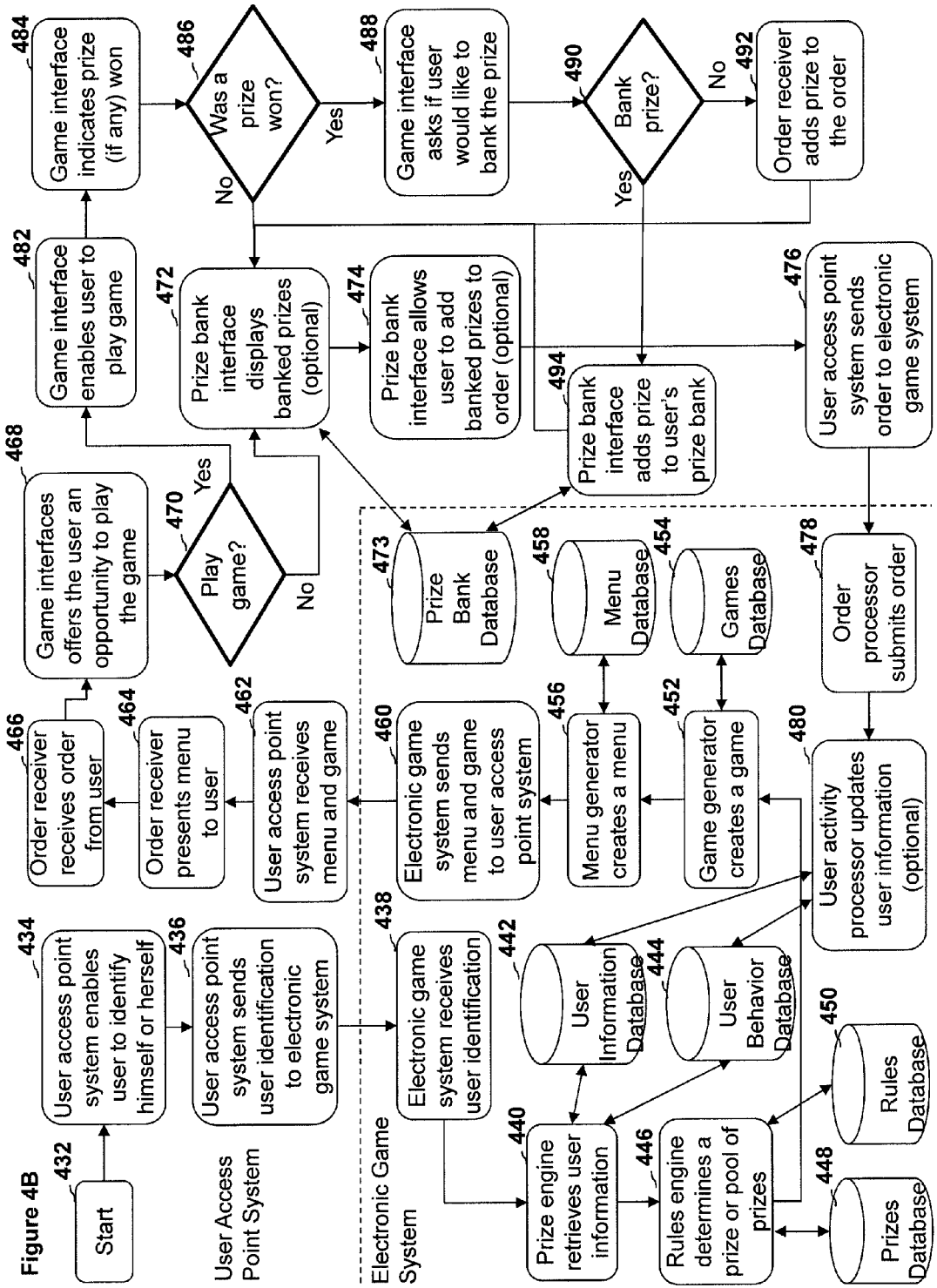
FIG. 4B depicts another embodiment of a process flow diagram illustrating an example of operating an electronic game system to determine and award a prize to a user.

FIG. 4B depicts another embodiment of a process flow diagram illustrating an example of operating an electronic game system to determine and award a prize to a user. The process flow shown in FIG. B can also be performed by, for example, the systems shown in FIG. 3A. At block 432 the process flow begins. At block 434, a user access point system enables a user to identify himself or herself. For example, the user access point system 306 shown in FIG. 3A can be configured to receive identifying information from the user. In some embodiments, the user access point system can be configured to ask the user to identify himself or herself, such as by asking the user to slide an identification card, credit card, loyalty card, etc. through an identification receiver. In other embodiments, the user access point system may be configured to enable the user to manually identify himself or herself by, for example, entering identifying information through an interface, such as a touch screen interface.

In some embodiments, the user access point system is configured to enable the user to identify himself or herself at the point of taking an order from the user. In other embodiments, the user access point system identifies the user prior to the user entering an order. For example, when the user access point system is a portable device, such as a user's smartphone, the user access point system may receive identifying information of the user well in advance of when the user places an order with an electronic game system. For example, the user access point system may have a predetermined IP address, MAC address, Bluetooth address, and/or the like that can be used to identify a user but is not linked to any order taking process.

At block 436, the user access point system sends the user identification to an electronic game system. For example, the user access point system can be configured to send identifying information through the network 304 to the electronic game system 302. At block 438, the electronic game system receives the user identification information. For example, the identification receiver 334 of the ordering engine 312 can be configured to receive the identifying information from the user access point system.

At block 440 a prize engine retrieves user information. For example, the prize engine 316 of the electronic game system 302 can be configured to utilize the user identification information received at block 438 to query a user information database and/or a user behavior database to retrieve information related to that user. The prize engine can be configured to retrieve this information from, for example, the user information database shown at block 442 and/or the user behavior database shown at block 444. These databases can be, for example, the user behavior database 318 and/or the user information database 320 shown in FIG. 3A. The prize engine can be configured to retrieve various information related to the identified user, such as, but not limited to, the user's name, address information, age, when the last time is the user visited the business or ordered from the business, an average order value by the user, preferences of the user, past behavior of the user, medical history and/or other health related information, balances of gift cards of the user, an amount of loyalty points of the user, and/or any other information to be utilized in the prize determination process.

Figure 7:
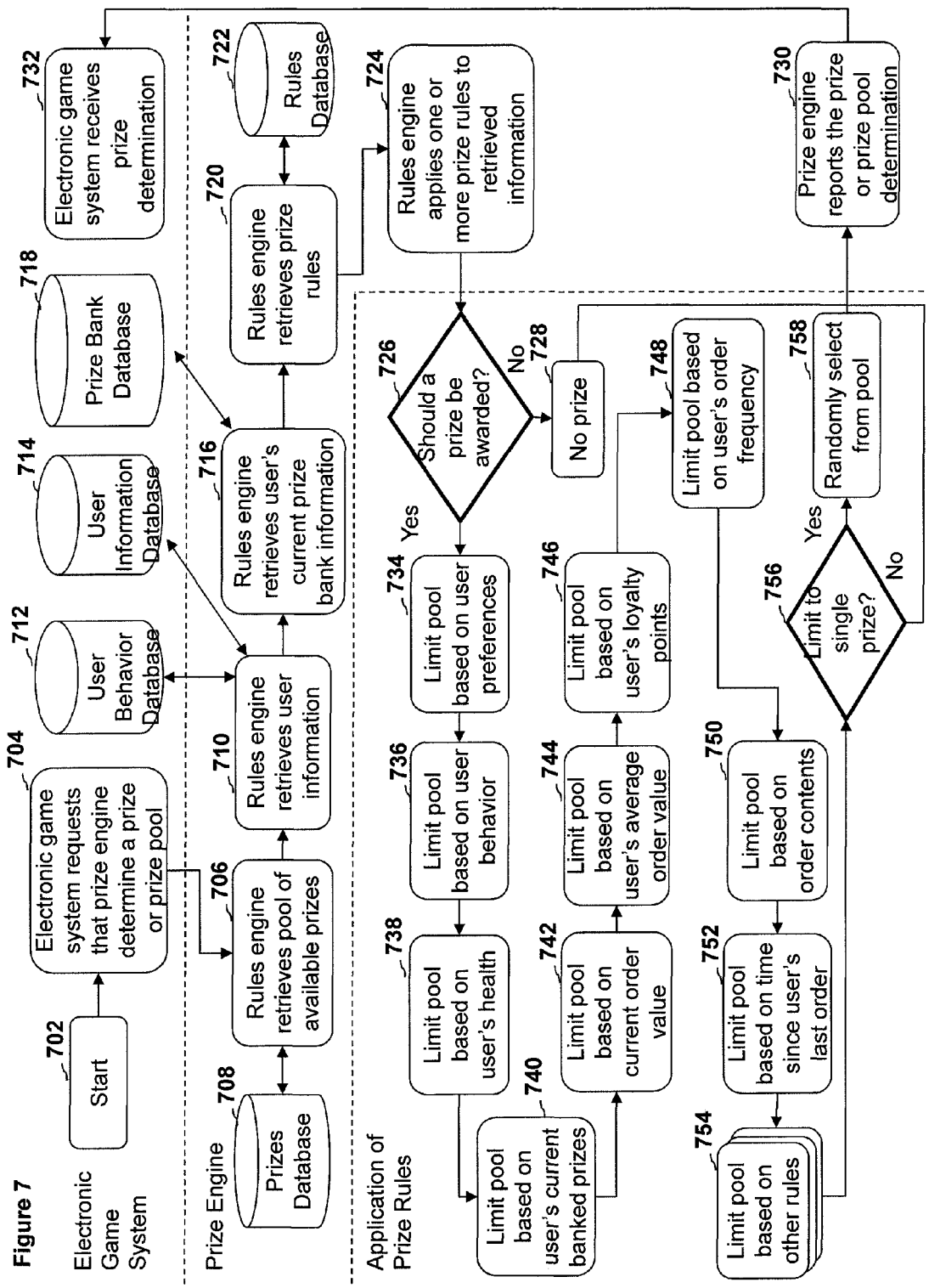
FIG. 7 depicts an embodiment of a process flow diagram illustrating an example of determining a prize or pool of prizes for a user of an electronic game system.

At block 446, a rules engine determines a prize or pool of prizes to potentially award to the user. For example, the rules engine 344 shown in FIG. 3A can be configured to retrieve rules information from a rules database shown at block 450 and to retrieve information on available prizes from a prizes database shown at block 448. The prizes database shown at block 448 may be, for example, the prizes database 340 shown in FIG. 3A. The rules database shown at block 450 may be, for example, the rules database 342 shown in FIG. 3A. In determining a prize or pool of prizes to potentially be awarded to the user, the rules engine can be configured to apply various rules to the user information retrieved at block 440, in addition to attributes of the current order, such as, the size of the order, the contents of the order, a value of the order, and/or the like. FIG. 7, as described below, illustrates additional details of an example process of a rules engine determining a prize or pool of prizes to potentially award to a user.

At block 452, a game generator creates a game. For example, the game generator 338 shown in FIG. 3A can be configured to access game information from a games database shown at block 454 and to incorporate the determined prize or pool of prizes into the game. The games database shown at block 454 can be, for example, the games database 336 shown in FIG. 3A. FIGS. 1B and 1C display one example of a game that could be generated at block 452.

At block 456, a menu generator creates a menu. For example, a menu generator can be configured to access menu information from a menu database shown at block 458 to develop a menu for presentation at the user access point system. For example, the menu generator can be the menu generator 330 shown in FIG. 3A, and the menu database shown at block 458 can be the menu database 328 shown in FIG. 3A. In some embodiments, the menu created at block 456 may comprise information indicating items available for ordering and/or quantities available and/or a price of each item, and/or the like. In some embodiments, the menu created at block 456 may additionally comprise graphical information defining at least in part how the menu should be displayed by, for example, a user access point system.

At block 460, the electronic game system sends the menu and game to the user access point system. For example, the electronic game system 302 can be configured to send the menu created at block 456 and the game created at block 452 through the network 304 to the user access point system 306. At block 462, the user access point system receives the menu and game sent by the electronic game system.

At block 464, an order receiver presents the menu to the user. For example, the order receiver 346 shown in FIG. 3A can be configured to present the menu using a graphical interface to the user. In some embodiments, presenting the menu to the user can comprise presenting menu options through a point of sale system to a customer and/or employee of the business. In other embodiments, presenting the menu can comprise presenting ordering options to a customer through a portable electronic device, such as a smartphone.

At block 466, the order receiver receives an order from the user. For example, a customer or employee of a business may input order information using a point of sale system at the business. In another example, a customer may input order information using a point of sale system at the business or a portable electronic device, such as a smartphone.

At block 468, a game interface offers the user an opportunity to play the game received from the electronic game system. For example, the game interface 348 shown in FIG. 3A can be configured to ask the user whether or not the user would like to play a game, such as is shown in FIG. 1A. At block 470, the user access point system determines whether the user would like to play the game. For example, the user may have selected a yes button or no button using the game interface. In some embodiments, the user access point system can be configured to default to an answer of yes or no based on, for example, a lapse of a certain amount of time without the user indicating a preference. In other embodiments, the electronic game system and/or user access point system can be configured to store a user preference that indicates whether the user would prefer to always or never play games offered to the user in association with entering an order.

If the user access point system determines the user does not want to play the game, the process flow moves to block 472. At block 472, a prize bank interface displays banked prizes. For example, the prize bank interface 350 shown in FIG. 3A can be configured to access the prize bank database shown at block 473 to determine and display the contents of the user's prize bank. The prize bank database shown at block 473 can be, for example, the prize bank database 322 shown in FIG. 3A. At block 474, the prize bank interface allows a user to add banked prizes to the current order. For example, the prize bank interface can show a display similar to the display shown in FIG. 1D and allow a user to select one or more of the prizes in the prize bank to have that prize added to the current order. In some embodiments, the process flow does not include showing the user the user's prize bank and/or allowing the user to add banked items to the order. This may occur, for example, when the user has no banked prizes, when the user has indicated a preference not to see the prize bank, etc.

At block 476, the user access point system sends the order to the electronic game system. For example, the order receiver 346 can be configured to send the order received from the user, with or without the one or more banked prizes, through the network 304 to the electronic game system 302. At block 478, an order processor submits the order received from the user access point system. For example, the order processor 332 shown in FIG. 3A can be configured to receive the order sent by the user access point system and to submit that order. In some embodiments, submitting the order comprises printing a summary or details of the order for processing by an employee. In other embodiments, submitting the order comprises sending details of the order to another system for processing or fulfillment of the order.

At block 480, a user activity processor optionally updates user information. For example, the user activity processor 324 shown in FIG. 302 can be configured to update the information relating to the user stored in the user information database at block 442 and/or the user behavior database at block 444 with any new information received related to the order entry and/or game playing process shown in FIG. 4B. As one example, if the user behavior database contains data relating to an average order value of the user, that information may need to be updated based on the value of the current order. In another example, if the user selected to not play the game, the user behavior database information may be updated to indicate that the user selected not to play this game and/or the user may potentially not enjoy the game that was presented at block 468.

Returning to block 470, if the user access point system determines that the user would like to play the game, the process flow proceeds to block 482. At block 482, the game interface enables the user to play the game. For example, the game interface 348 shown in FIG. 3A may be configured to display the game to the user on an interactive touch screen system to enable the user to play the game. The game interface may, for example, enable the user to play the game as shown in the illustrations in FIGS. 1B and 1C.

At block 484, the game interface indicates the prize the user has won, if any. For example, the game interface 348 can be configured to display to the user a single prize that was determined at block 446. In another embodiment, the game interface is configured to select a single prize from a pool of prizes determined at block 446. In some embodiments, the game interface is configured to randomly select a prize from the pool of prizes determined at block 446. In some embodiments, the rules engine determined at block 446 that no prize should be awarded. In that case, the game interface indicates to the user that no prize was won.

At block 486, the process flow depends on whether a prize was won at block 484. If a prize was not won at block 484, the process flow proceeds to block 472 and proceeds as described above. If a prize was won, the process flow proceeds to block 488. At block 488, the game interface asks the user if the user would like to bank the prize. For example, the game interface may be configured to display an illustration similar to FIG. 1C asking the user if the user would like to save the prize for a later visit.

At block 490, the process flow depends on whether the user indicated the user would like to bank the prize. If the user indicated the user would not like to bank the prize, but would rather receive the prize now with the current order, the process flow proceeds to block 492. At block 492, the order receiver adds the awarded prize to the current order. The process flow then continues to block 472 and continues as described above. If at block 490 the user indicated the user would like to bank the prize, the process flow proceeds to block 494. At block 494, the prize bank interface adds the prize to the user's prize bank. For example, the prize bank interface 350 can be configured to add the awarded prize to the user's prize bank stored in the prize bank database at block 473. The process then continues to block 472 and the process flow continues as described above.

Figure 5A:
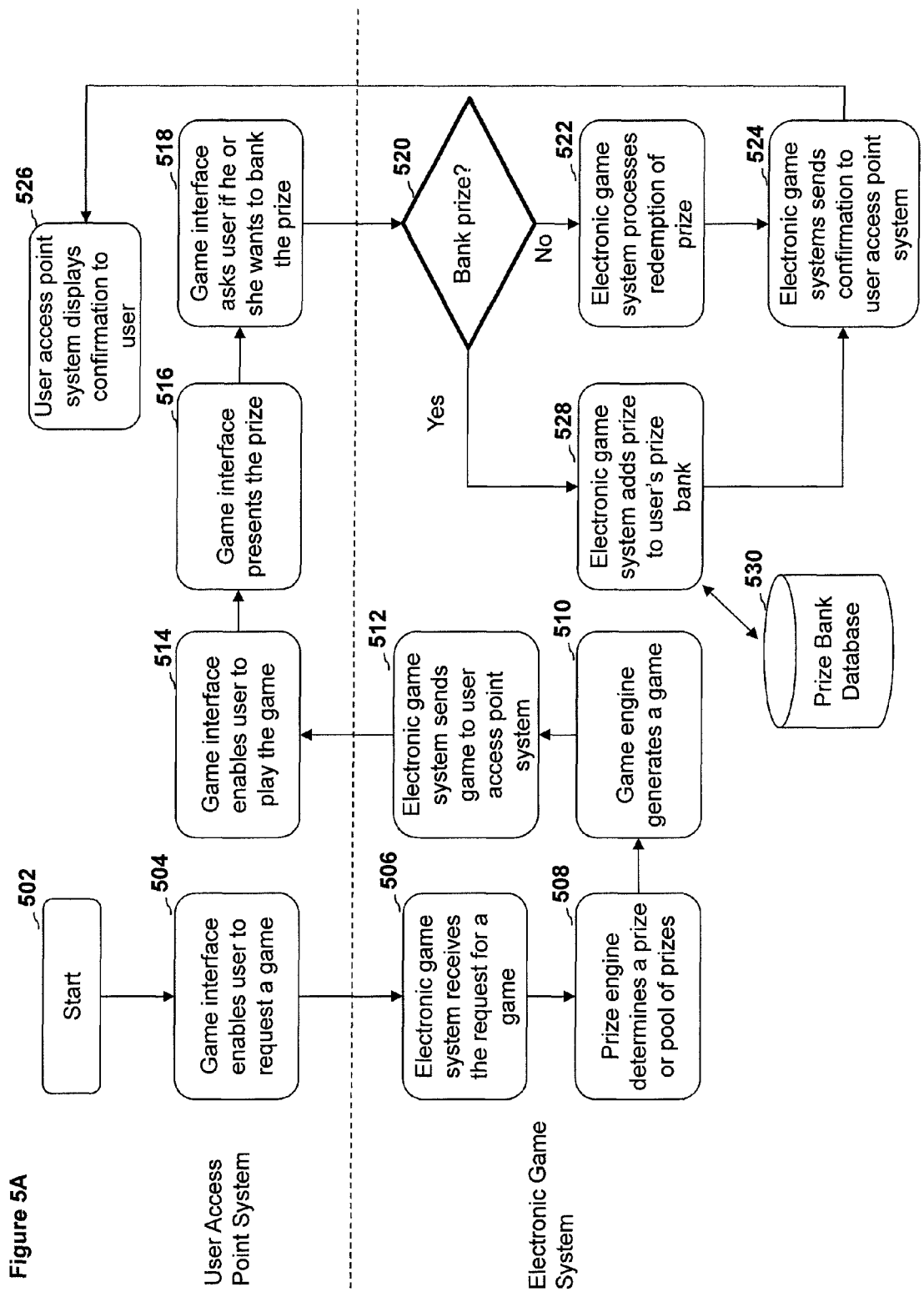
FIG. 5A depicts another embodiment of a process flow diagram illustrating an example of operating an electronic game system to determine and award a prize to a user.

FIG. 5A depicts an embodiment of a process flow diagram illustrating an example of operating an electronic game system to determine and award a prize to a user. The process flow shown in FIG. 5A can be performed by, for example, the systems illustrated in FIG. 3B. The process flow shown in FIG. 5A is similar to the process flow shown in FIG. 4A, except the process flow shown in FIG. 5A is not linked to or associated with an order received from the user. In contrast, the process shown in FIG. 5A can be used to enable a user to play a game to potentially win a prize at times other than during taking an order, such as any time the user desires to play a game or at times linked to events other than taking an order.

The process flow begins at block 502. At block 504, a game interface enables a user to request a game. For example, the game interface 348 shown in FIG. 3B can be configured to enable a user to select a button to indicate the user would like to play a game to potentially win a prize. In one embodiment, the user access point system 307 comprises a smartphone of the user, and a touch screen interface of the smartphone enables the user to request a game by, for example, opening an app or application to play the game.

At block 506, an electronic game system receives the request for a game. For example, the electronic game system 303 receives the request from the user access point system through the network 304. At block 508, a prize engine determines a prize or pool of prizes to award the user. For example, the prize engine 316 can be configured to operate as shown in FIG. 7 to determine a prize or pool of prizes to potentially award the user. In some embodiments, the prize engine determines to award no prize to the user.

At block 510, a game engine generates a game for the user. For example, the game engine 315 shown in FIG. 3B can be configured to generate a game that includes the determined prize or pool of prizes from block 508. At block 512, the electronic game system sends the game to the user access point system. For example, the electronic game system 303 can be configured to send the game through the network 304 to the user access point system 307.

At block 514, the game interface enables the user to play the game. For example, the game interface 348 can be configured to present the game to the user, allow the user to interact with the game, and allow the user to win a prize. At block 516, the game interface presents the prize to the user. For example, the game interface 348 can be configured to display a representation of the prize and/or to textually indicate the prize the user has won using an interface, such as is shown in FIG. 2C.

At block 518, the game interface asks the user if he or she wants to bank the prize. At block 520, the process flow depends on whether the user indicated he or she wanted to bank the prize. If the user indicated the user did not want to bank the prize, the process flow proceeds to block 522. At block 522, the electronic game system processes a redemption of the prize. For example, the electronic game system may be configured to process an order for the prize for delivery to the user. In some embodiments, the prize is of a type that can be almost immediately delivered to the user, and the electronic game system is configured to deliver the prize to the user. This may be the case, for example, when the prize is an electronic software item that can be sent electronically to the user or user access point system. In other embodiments, the prize comprises a physical item that may be hand delivered to the user, or potentially shipped to the user.

At block 524, the electronic game system sends a confirmation to the user access point system. For example, the electronic game system can be configured to send electronic information to the user access point system indicating that the prize has been redeemed or that the redemption process has been begun. At block 526, the user access point system displays the confirmation received from the electronic game system to the user. For example, the game interface 348 can be configured to display the confirmation to the user through an electronic display.

Returning to block 520, if the user indicated the user would like to bank the prize, the process flow moves to block 528. At block 528, the electronic game system adds the prize to the user's prize bank. For example, the electronic game system may be configured to add information to a prize bank database shown at block 530 indicating that the prize has been added to the user's prize bank. The prize bank database shown at block 530 may be, for example, the prize bank database 322 shown in FIG. 3B. The process flow then moves to block 524 and continues as described above.

Figure 5B:
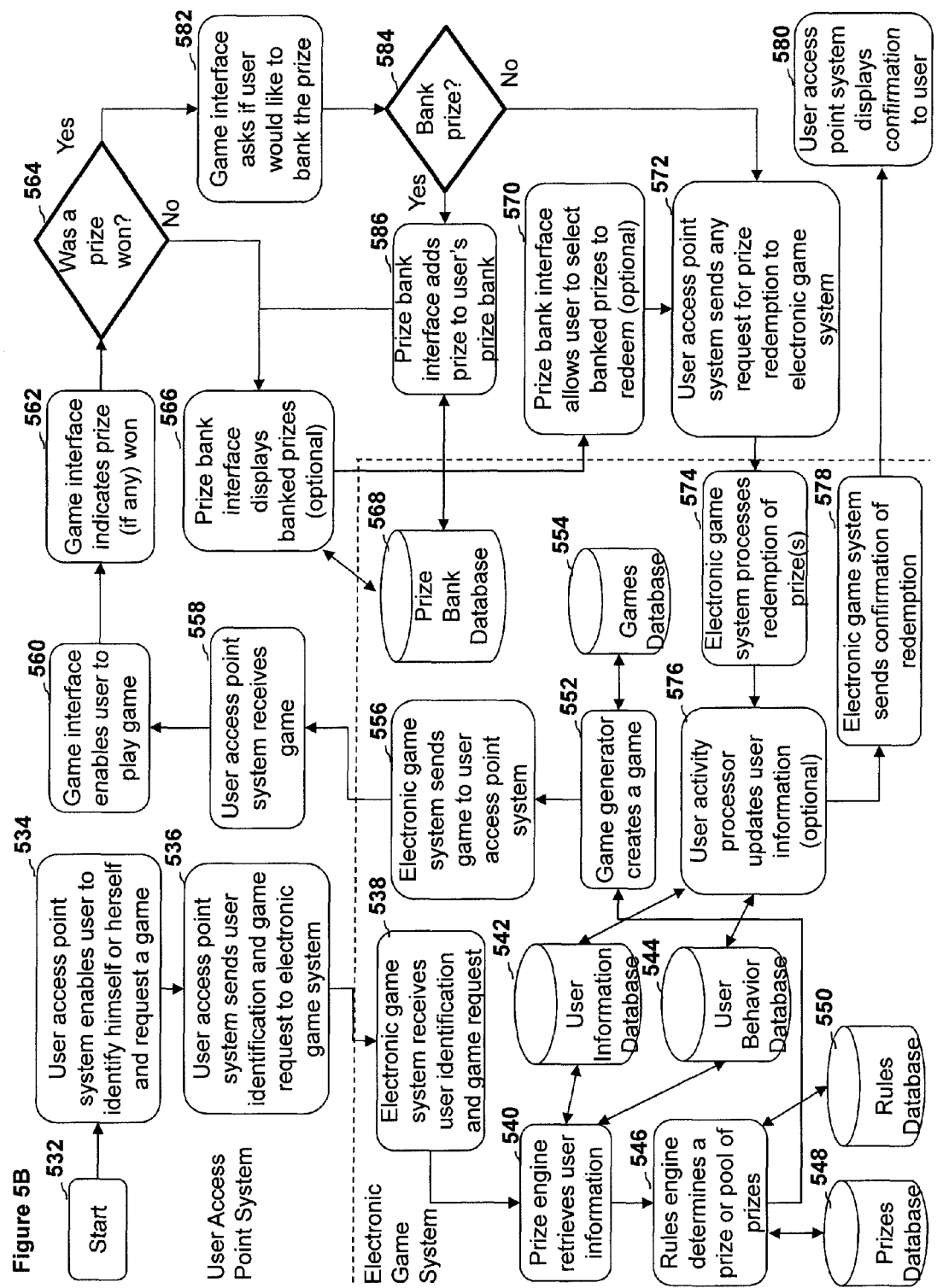
FIG. 5B depicts another embodiment of a process flow diagram illustrating an example of operating an electronic game system to determine and award a prize to a user.

FIG. 5B depicts another embodiment of a process flow diagram illustrating an example of operating an electronic game system to determine and award a prize to a user. The process shown in FIG. 5B may also be performed by, for example, the systems shown in FIG. 3B. The process flow begins at block 532. At block 534, a user access point system enables a user to identify himself or herself and to request a game. For example, the user access point system may be the user access point system 307 shown in FIG. 3B, and the user access point system 307 may enable the user to open an app or application that requests a game for the user. In some embodiments, the user identifies himself or herself by merely possessing the user access point system 307. For example, the user access point system 307 may comprise a MAC address, Bluetooth address, IP address, and/or the like. In other embodiments, the user access point system enables the user to identify himself or herself by allowing the user to enter identifying information, such as a phone number, social security number, name, loyalty program number, and/or other types of identifying information. In some embodiments, the user access point system is configured to enable the user to identify himself or herself and to request a game at substantially the same time as shown in block 534. In other embodiments, the user may identify himself or herself prior to the request of a game, or the user may not even identify himself or herself, since sufficient identifying information for the user may be inherent in the user access point system 307.

At block 536, the user access point system sends the user identification and game request to the electronic game system. For example, the user access point system 307 can be configured to transmit through the network 304 to the electronic game system 303 data indicating an identification of the user and the request to play a game. At block 538, the electronic game system receives the user identification and game request. At block 540, a prize engine retrieves user information. For example, the prize engine shown in FIG. 3B can be configured to retrieve user information from a user information database shown at block 542 and/or a user behavior database shown at block 544 based on the user identification received from the user access point system.

At block 546, a rules engine determines a prize or pool of prizes to award the user. For example, the rules engine 344 shown in FIG. 3B can be configured to analyze the user information retrieved by the prize engine at block 540, along with rules retrieved from the rules database shown at block 550 and/or available prizes retrieved from the prize database shown at block 548. The prizes database shown at block 548 may be, for example, the prizes database 340 shown in FIG. 3B. The rules database shown at block 550 may be, for example, the rules database 342 shown in FIG. 3B. An example process of a rules engine determining a prize or pool of prizes for a user may be seen in FIG. 7, as described below.

At block 552, a game generator creates a game. For example, the game generator 338 shown in FIG. 3B may be configured to access a games database shown at block 554 to retrieve game details. The games database shown at block 554 may be, for example, the games database 336 shown in FIG. 3B. The game generator may be configured to create a game that includes the prize or pool of prizes determined at block 546. In some embodiments, the game generator is configured to access user preference information, such as stored in the user information or user behavior databases, to determine a game preference of the user and to generate a game that the system determines the user may prefer. In other embodiments, the request of the game received at block 534 includes a preference for the type of game the user would like to play. In other embodiments, the game generator randomly chooses a type of game for the user to play. In other embodiments, the game generator chooses a type of game based on administrative settings by an administrator.

At block 556, the electronic game system sends the game to the user access point system. For example, the electronic game system 303 can be configured to transmit the game electronically through the network 304 to the user access point system 307. At block 558, the user access point system receives the game sent by the electronic game system. At block 560, a game interface enables the user to play the game. For example, the game interface 348 shown in FIG. 3B can be configured to display the game on an interactive touch screen display as illustrated in FIG. 2B to enable the user to play the game. At block 562, the game interface indicates the prize, if any, that the user has won. For example, the game interface 348 can be configured to display a screen similar to the screen shown in FIG. 2C indicating that a user has won a cupcake.

At block 564, the process flow varies depending on whether a prize was won at block 562. If a prize was not won at block 562, the process flow moves to block 566. At block 566, a prize bank interface displays banked prizes. For example, the prize bank interface 350 can be configured to display a user's prize bank, such as is shown in FIG. 1D. At block 570, the prize bank interface allows the user to select banked prizes to be redeemed. Blocks 566 and 570 are optional, for example, because there may be times when there are no prizes in the user's prize bank. The prize bank interface may be configured to access the prize bank database shown at block 568 for determining what prizes are in the user's prize bank.

At block 572, the user access point system sends any requests for prize redemption to the electronic game system. For example, if a banked prize was selected to be redeemed at block 570, the user access point system at block 572 sends a request to redeem that prize to the electronic game system. At block 574, the electronic game system processes redemption of any prizes requested at block 572. For example, the electronic game system may be configured to send the prize to the user, to electronically deliver the prize to the user, to ship the prize to the user, and/or to send instructions to a fulfillment or redemption system to fulfill or redeem the prize for the user.

At block 576, a user activity processor optionally updates user information in the user information and user behavior databases. For example, the user activity processor may update information based on user preferences that were determined during the process flow blocks prior to block 576. At block 578, the electronic game system sends a confirmation of any prize redemption to the user access point system. At block 580, the user access point system displays that confirmation to the user. For example, the user access point system 307 can be configured to electronically display to the user an indication that the prize has been redeemed or that the redemption process has been begun.

Returning to block 564, if a prize was won at block 562, the process flow continues to block 582. At block 582, the game interface asks the user if the user would like to bank the prize. At block 584, the process flow depends on whether the user would like to bank the prize or not. If the user would not like to bank the prize, the process flow continues to block 572 and continues as described above to redeem the awarded prize. If the user would like to bank the prize, the process flow continues to block 586. At block 586, a prize bank interface adds the prize to a user's prize bank. For example, the prize bank interface 350 shown in FIG. 3B can be configured to communicate with the prize bank database shown at block 568 to add the prize to the user's prize bank. In some embodiments, the user access point system can be configured to display a confirmation of the addition of the prize and/or to display a summary of items currently in the user's prize bank. The displaying of banked prizes can occur as described above at block 566. The process flow then continues as described above at block 570.

Figure 6:
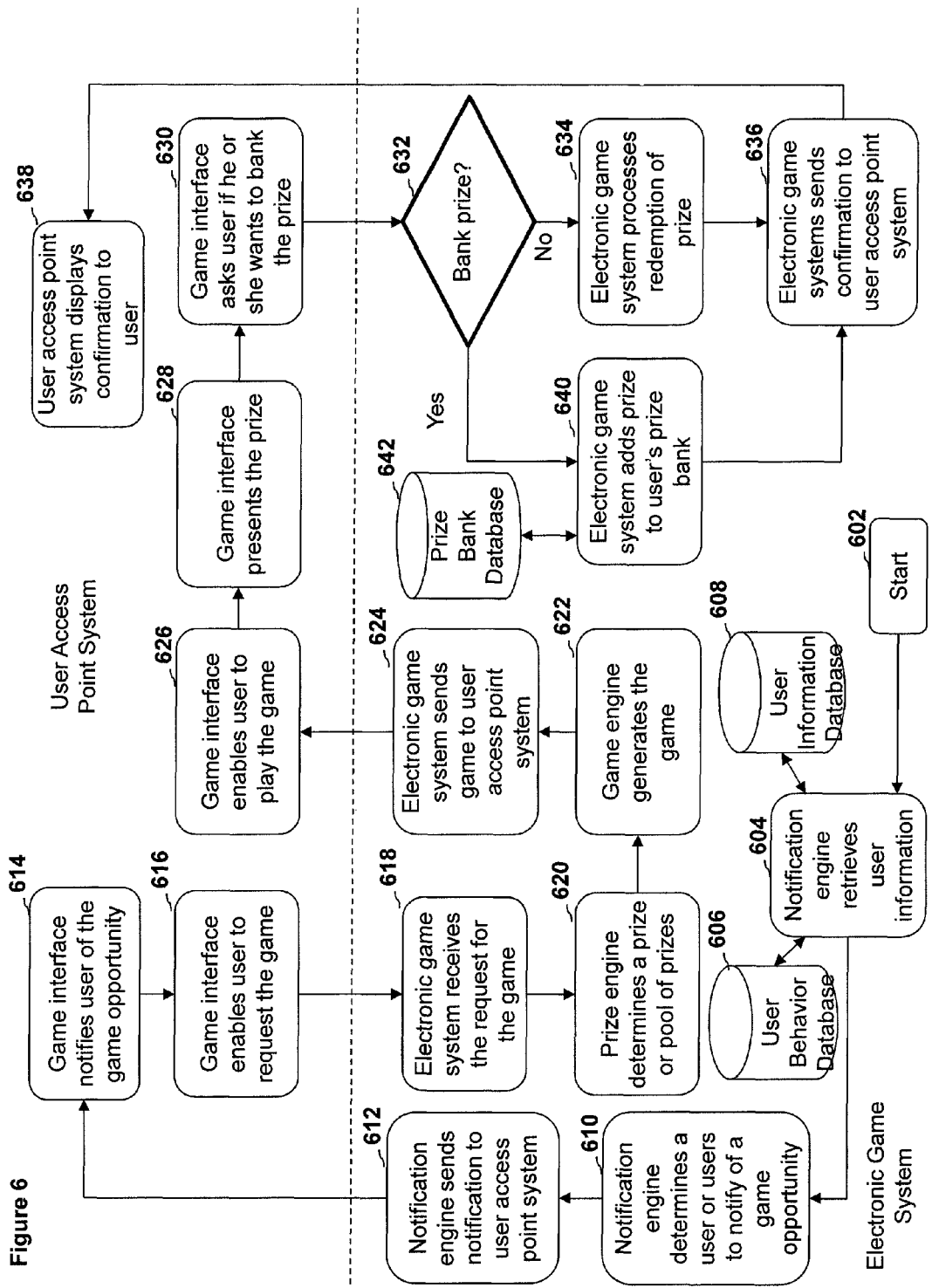
FIG. 6 depicts another embodiment of a process flow diagram illustrating an example of operating an electronic game system to determine and award a prize to a user.

FIG. 6 depicts another embodiment of a process flow diagram illustrating an example of operating an electronic game system to determine and award a prize to a user. The process flow shown in FIG. 6 is similar to the process flow shown in FIG. 5A and can be implemented by, for example, the systems shown in FIG. 3B. Unlike FIG. 5A, the process flow shown in FIG. 6 illustrates a process wherein the electronic game system initiates the playing of a game by the user, instead of the user initiating the process by requesting a game from the electronic game system.

The process flow begins at block 602. At block 604, a notification engine retrieves user information. For example, the notification engine 323 of the electronic game system 303 can be configured to retrieve information relating to one or more users from the user behavior database shown in block 606 and/or the user information database shown at block 608. The user behavior database shown at block 606 can be, for example, the user behavior database 318 shown in FIG. 3B. The user information database shown at block 608 can be, for example, the user information database 320 shown in FIG. 3B. The notification engine may be configured to retrieve information related to, for example, how long it has been since one or more users have played a game, what prizes one or more users have been awarded in the past, various user loyalty information, average order size of users, and/or various other types of information that may be used to determine one or more users to send a game opportunity to.

At block 610, the notification engine determines a user or users to notify of a game opportunity. For example, the notification engine 323 may be configured to determine which users have not played a game in a threshold amount of time and determine to notify each of those users of an opportunity to play a game. In another embodiment, the notification engine may be configured to analyze preference information of various users to determine which users to notify of a game opportunity. In other embodiments, the notification engine can be configured to use various other criteria to determine one or more users to notify of a game opportunity. For example, the notification engine can be configured to notify one or more users of a game opportunity when, for example, a business has excess inventory of a certain item, and the business desires to award some or all of that excess inventory as prizes to reduce the inventory. A notification engine may in some embodiments be configured to determine to notify one or more users of a game opportunity when, for example, items in inventory are about to expire, to enable one or more users to be awarded those items before they expire. At block 612, the notification engine sends a notification to one or more user access point systems. For example, the notification engine 323 can be configured to send a notification through the network 304 to one or more user access point systems 307.

At block 614, a game interface notifies a user of the game opportunity. For example, the game interface 348 may communicate with the notification generator 360 to notify the user of the user access point 307 of an opportunity to play a game. For example, the user access point system 307 may comprise a smartphone device and be configured to notify the user of the game opportunity using a vibration, a popup, a sound, a notification icon, and/or the like.

At block 616, the game interface enables the user to request the game. For example, the game interface may be configured to, when it notifies the user of the game opportunity, to ask the user whether the user would like to play the game. If the user indicates the user would like to play the game, this may comprise the request for the game at block 616. In some embodiments, the notification of a game opportunity comprises a notification of a specific game available to be played by the user. In other embodiments, the notification of a game opportunity merely indicates to the user that the user can play a game and that the user will be able to pick which game the user would like to play. In that case, the game interface at block 616 enables the user to pick which game the user would like to play.

At block 618, the electronic game system receives the request for the game. At block 620, a prize engine determines a prize or pool of prizes to award to the user. For example, the prize engine 316 may perform a process as shown in FIG. 7 to determine a prize or pool of prizes or no prize to award to the user.

At block 622, a game engine generates the game. For example, the game engine 315 can be configured to access a games database and user information, along with the prize or pool of prizes determined at block 620 to generate a game for the user to play. At block 624, the electronic game system sends the game to the user access point system. In some embodiments, the process at block 624 comprises sending electronic data comprising the game to the user access point system. In other embodiments, the process comprises merely sending details of the game to the user access point system, such as what prize is to be awarded by the game. That embodiment may be advantageous, such as when most details of the game already exist on the user access point system, and the user access point system merely needs to know whether to award a prize to the user and/or what prize to award to the user. At block 626, the game interface enables the user to play the game. For example, the game interface 348 may present the game to the user using an interactive electronic touch screen. At block 628, the game interface presents the prize to the user.

At block 630, the game interface asks the user if he or she would like to bank the prize. At block 632, the process flow depends on whether the user indicated he or she would like to bank the prize. If the user indicated he or she would not like to bank the prize, the process flow moves to block 634. At block 634, the electronic game system processes redemption of the prize. For example, the electronic game system can be configured to send or ship the prize to the user and/or to otherwise redeem the prize, such as by sending redemption information to a fulfillment or redemption system. At block 636, the electronic game system sends a confirmation to the user access point system of the redemption or beginning of the redemption process. At block 638, the user access point system displays the confirmation to the user.

Returning to block 632, if the user indicated the user would like to bank the prize, the process flow moves to block 640. At block 640, the electronic game system adds the prize top the user's prize bank. For example, the electronic game system can be configured to add the prize to the prize bank database shown at block 642. The prize bank database shown at block 642 can be, for example, the prize bank database 322 shown in FIG. 3B. The process flow then continues to block 636 and continues as described above.

FIG. 7 depicts an embodiment of a process flow diagram illustrating an example of determining a prize or pool of prizes for a user of an electronic game system. The process flow illustrated in FIG. 7 may be implemented by, for example, the systems shown in FIGS. 3A through 3D. The process flow begins at block 702. At block 704, an electronic game system requests that a prize engine determine a prize or prize pool. For example, the electronic game system 302 shown in FIG. 3A may request that the prize engine 316 determine a prize or pool of prizes for a specific user.

At block 706, a rules engine retrieves a pool of available prizes. For example, the rules engine 344 can be configured to communicate with the prizes database shown at block 708 to retrieve a pool of all available prizes, along with information relating to those prizes. The information relating to those prizes may comprise, for example, names of prizes, quantities available, values of prizes, and/or the like. The prizes database shown at block 708 may be, for example, the prizes database 340 shown in FIG. 3A.

At block 710, the rules engine retrieves user information. For example, the rules engine 344 can be configured to retrieve information relating to a specific user from the user behavior database shown at block 712 and/or the user information database shown at block 714. The user behavior database shown at block 712 may be, for example, the user behavior database 318 shown in FIG. 3A. The user information database shown at block 714 may be, for example, the user information database 320 shown in FIG. 3A. The rules engine may be configured to retrieve user information such as, past user behavior, user preferences, age, average order value, medical conditions of the user, prize preferences, game preferences, and/or various other user specific information. At block 716, the rules engine retrieves the user's current prize bank information. For example, the rules engine can be configured to communicate with the prize bank database shown at FIG. 718 to retrieve information related to any prizes currently banked in the user's prize bank. The prize bank database shown at block 718 may be, for example, the prize bank database 322 shown in FIG. 3A.

At block 720, the rules engine retrieves prize rules from a rules database shown at block 722. The rules database shown at block 722 may be, for example, the rules database 342 shown in FIG. 3A. The rules retrieved by the rules engine may comprise various rules used to determine a single prize, pool of prizes, or no prize to award to a specific user in a specific instance or situation. At block 724, the rules engine applies the one or more prize rules retrieved at block 720 to the information retrieved at blocks 706 through 716. In some embodiments, the rules engine may also apply the rules to information relating to an order the user is currently entering or has entered. However, in some embodiments, the rules engine does not take into account a current order, nor does the electronic game system requesting that the prize engine determine a prize or prize pool have to be connected to the receipt of an order from a user.

Blocks 726 through 758 illustrate the application of one or more prize rules as performed at block 724. Although blocks 726 through 758 illustrate various specific potential prize rules, blocks 726 through 758 are intended merely as illustrations, and some embodiments may use all of these rules, none of these rules, some of these rules, more rules than are shown in this embodiment, etc.

At block 726, the process flow varies depending on whether a prize should be awarded. For example, a prize rule may determine that the user should not be awarded a prize, because, for example, the user was recently awarded a prize. If the rules engine determines a prize should not be awarded, the process flow moves to block 728. At block 728, no prize is awarded. The process flow then moves to block 730 and the prize engine reports the prize or prize pool determination to the electronic game system. In this case, the prize engine would report that no prize should be awarded. However, in other cases, when a prize or prize pool has been determined, the prize engine reports that prize or prize pool to the electronic game system. At block 732, the electronic game system receives the prize determination.

Returning to block 726, if the rules engine determines a prize should be awarded, the process flow moves to block 734. At block 734, the rules engine may be configured to limit the pool of prizes based on user preferences. For example, user information may indicate that the user does not prefer milkshakes as prizes but does prefer french fries as prizes.

At block 736, the rules engine may limit the pool of potential prizes based on user behavior. For example, user behavior information retrieved at block 710 may indicate that the user is currently on a diet or is more health conscious than other users. In that case, the rules engine may be configured to limit the pool by removing less healthy food items from the pool of potential prizes. At block 738, the rules engine may be configured to limit the pool of potential prizes based on a user's health. For example, the user information may indicate that the user has a health issue, such as diabetes. In that case, the rules engine may be configured to remove food items from the pool of potential prizes that would not be appropriate to offer to a diabetic person.

At block 740, the rules engine may limit the pool of potential prizes based on the user's currently banked prizes. For example, the user's current prize bank information may indicate that the user already has two milkshakes in the prize bank. Therefore the rules engine may be configured to remove milkshakes from the list of potential prizes so as not to add additional milkshakes to the user's prize bank. In other embodiments, the rules engine may be configured to do the opposite, and to not remove milkshakes from the available pool, since it may be less likely that the user would redeem the additional milkshake, costing the business less money, because the prize may expire unredeemed.

At block 742, the rules engine may limit the pool of potential prizes based on a current order value. For example, the rules engine may be configured to compare a current order value to values of prizes in the pool of available prizes. The rules engine may then be configured to, for example, eliminate high value prizes from a low value order or to eliminate low value prizes from a high value order.

At block 744, the rules engine may limit the pool based on a user's average order value. For example, a user's average order value may be much higher than the current order value, which may allow a business to award a prize with a higher value relative to the current order than would otherwise be awarded.

At block 746, the rules engine may limit the pool of available prizes based on a user's loyalty points or loyalty program status. For example, some prizes may be configured to be only available to users having a threshold number of loyalty points and/or a threshold status in the business' loyalty program. In that case, the rules engine may be configured to remove prizes that would require a higher number of loyalty points or a higher loyalty status than the user currently has.

At block 748, the rules engine may limit the pool based on a user's order frequency. For example, some prizes may be configured to be limited only to users that place orders with a frequency above a predetermined threshold level. In another example, the rules engine may be configured to, for example, eliminate higher value prizes from the pool of potential prizes for users that place a relatively high number of orders, for example to eliminate or reduce an expectation in the user that the user should get a high value prize every time the user orders.

At block 750, the rules engine may limit the pool of potential prizes based on a contents of a current order. For example, the rules engine may be configured to eliminate milkshakes as potential prizes if the user already has a milkshake in the current order. In another example, the rules engine may be configured to increase a likelihood that a milkshake would be offered as a prize when a user currently has a milkshake in the order, such as to encourage the user to bank the prize instead of redeeming the prize with the current order. at block 752, the rules engine may limit the pool based on a length of time since the user's last order. For example, the rules engine may be configured to remove relatively high value prizes from the pool when a user has not placed an order in a relatively long period of time.

At block 754, the rules engine may apply one or more other rules to limit the pool of potential prizes and/or to determine a specific prize. For example, in some embodiments, the system may be configured to analyze a business's current inventory and determine to award a prize for which there is currently excess inventory. For example, an electronic game system configured to be implemented with a fast food restaurant may determine that the restaurant currently has excess apple pies an inventory and/or the apple pies in inventory are about to expire. The system may determine to award an apple pie as a prize in order to reduce the excess inventory and or to utilize the product prior to expiration. In other embodiments, the system may be configured to determine a prize to award based on products that are new and/or any promotions occurring. For example, a restaurant may come out with a new menu item and determine to award that new menu item as a prize in order to help promote the new item.

At block 756, the process flow varies depending on whether the rules engine is configured to limit the determination to a single prize or to a pool of prizes. If the rules engine is configured to limit the prize to a single prize, and prior rules have not already reduced the pool to a single prize, the process flow moves to block 758. At block 758, the rules engine is configured to randomly select from the remaining pool a single prize to be awarded to the user. The process flow then proceeds to block 730 and proceeds as described above. Returning to block 756, if the rules engine is not configured to limit the determination to a single prize, the process flow proceeds directly to block 730 and proceeds as described above.

Figure 8:
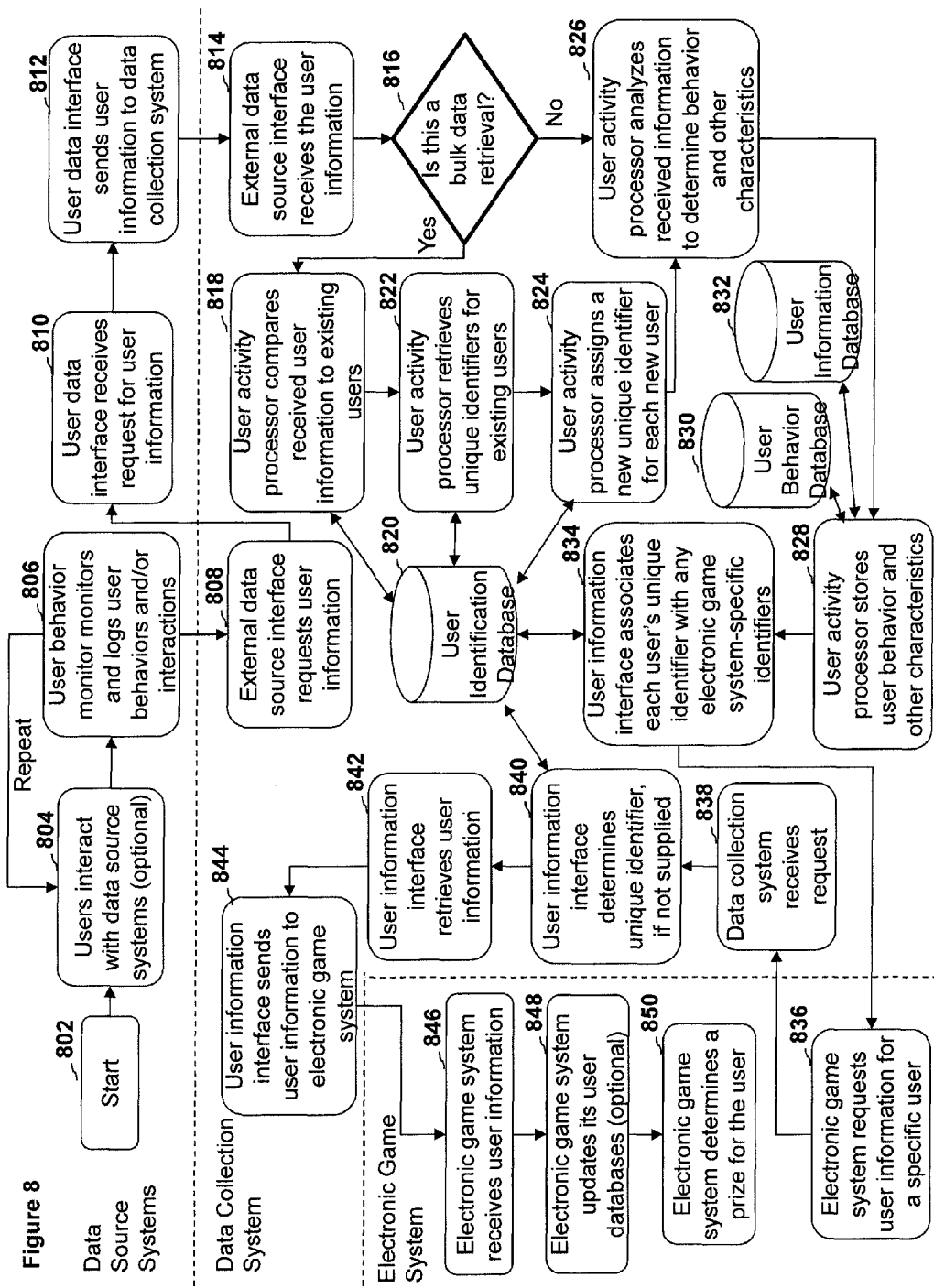
FIG. 8 depicts an embodiment of a process flow diagram illustrating an example of collecting user data for use with an electronic game system.

FIG. 8 depicts an embodiment of a process flow diagram illustrated in an example of collecting user data for use with one or more electronic game systems. The process flow illustrated in FIG. 8 may be performed by, for example, the systems illustrated in FIG. 3C. This process flow may be advantageous for, for example, a data collection system, such as the data collection system 370, configured to collect various user information and to provide that user information to one or more electronic game systems 302 for determination of games and/or prizes for individual users.

The process flow begins at block 802. At block 804, users optionally interact with data source systems. For example, users of social network systems may interact with those systems by posting information, indicating relationships with other users, etc. In another example, users interact with other business systems to, for example, order products, express interests and preferences, and/or various other types of information. At block 806, a user behavior monitor monitors and logs user behaviors and/or interactions. For example, the user behavior monitor 352 of the data source system 308 shown in FIG. 3C can be configured to monitor and log the user interactions from block 804. In some embodiments, the user behavior monitor 352 is configured to log user behavior enter information without requiring the user to interact with the data source system. For example, a user behavior monitor may be part of a credit monitoring system that monitors interactions users may have with other systems, such as credit card providers. The process of users interacting with data source systems and user behavior monitors monitoring and logging these interactions and/or other user behaviors can be repeated to continually log new and/or updated information.

At block 808, an external data source interface of a data collection system requests user information from a data source system. For example, the external data source interface 326 of the data collection system 370 may electronically request through the network 304 from a data source system 308 information on one or more users. At block 810, a user data interface of the data source system receives the request for user information. At block 812, the user data interface sends the user information to the data collection system. For example, the user data interface 354 of the data source system 308 can be configured to transmit the requested user information through the network 304 to the external data source interface 326 of the data collection system 370.

At block 814, the external data source interface receives the user information sent by the data source system. At block 816, the process flow varies depending on whether the data retrieved from the data source system is a bulk data retrieval. For example, the external data source interface may have requested at block 808 information related to a single user or information related to multiple users. If the data retrieved is a bulk data retrieval related to more than one user, the process flow moves to block 818.

At block 818, a user activity processor compares the received user information to existing users in the data collection system. For example, the user activity processor 324 may be configured to extract identifying information from the data received from the data source systems and to compare that identifying information to identifying information stored in the user identification database shown at block 820. The user identification database shown at block 820 may be, for example, the user identification database 382 of the data collection system 370. The user activity processor is configured to analyze this information to, for example, determine which, if any, of the users received from the data source system are new to the data collection system.

At block 822, the user activity processor retrieves unique identifiers for existing users. In some embodiments, the user identification database shown at block 820 is configured to store a unique identifier for each user in the data collection system 370. Therefore, at block 822, the user activity processor retrieves this unique identifier for every user that was identified as an existing user at block 818. At block 824, the user activity processor assigns a new unique identifier for each user that was identified as a new user at block 818. The user activity processor can be configured to store this new unique identifier in the user identification database shown in block 820.

After the user activity processor has assigned a new unique identifier for each new user, or if the data retrieval was not a bulk data retrieval at block 816, the process flow moves to block 826. At block 826, the user activity processor analyzes the received information to determine behavior and other characteristics. For example, the user activity processor may be configured to mine the data retrieved from the data source systems to identify behaviors of one or more users, preferences of one or more users, health histories and/or conditions of one or more users, economic information relating to one or more users, and/or various other types of behavior and other characteristics relating to the users.

At block 828, the user activity processor stores the determined user behavior and other characteristics. The user activity processor can be configured to store this information in, for example, the user behavior database shown at block 830 and/or the user information database shown at block 832. The user behavior database shown at block 830 may be, for example, the user behavior database 378 shown in FIG. 3C. The user information database shown at block 832 may be, for example, the user information database 380 shown in FIG. 3C.

At block 834, a user information interface associates each user's unique identifier with any electronic game system specific identifiers. For example, the user information interface 374 of the data collection system 370 may be configured to access information in the user identification database shown at block 820 and to determine whether any of the users for which information was retrieved from the data source systems are users that currently exist in one or more electronic game systems, such as the electronic game systems 302 shown in FIG. 3C. In some embodiments, different electronic game systems may utilize different identifiers for the same person or user. Therefore, at block 834, the user information interface is configured to analyze this information to associate the electronic game systems specific identifiers with a user's unique identifier to enable the data collection system to store only one set of data relating to each unique user, while still allowing each electronic game system to access that information using its own identifier for its users.

At block 836, an electronic game system requests user information for a specific user. For example, an electronic game system 302 may send a request to the data collection system 370 for information relating to a user using that electronic game system's user identifier. At block 838, the data collection system receives the request from the electronic game system. At block 840, the user information interface determines the unique identifier of the user, if the unique identifier was not supplied by the electronic game system. For example, if the electronic game system utilized its own identifier, the user information interface 374 may be configured to access the user identification database shown at block 820 to determine the unique identifier of the user based on the electronic game system's identifier.

At block 842, the user information interface retrieves user information. For example, the user information interface retrieves information related to the requested user from the data collection system's user information database 380 and/or user behavior database 378. At block 844, the user information interface sends the retrieved user information to the electronic game system.

At block 846, the electronic game system receives the user information. At block 848, the electronic game system optionally updates its own user databases. For example, the electronic game system may keep its own local copy of user information which may comprise some or all of the information stored in the data collection system 370 and/or other information specific to that electronic game system 302 but not stored in the data collection system 370. The electronic game system may update its user databases of information stored in, for example, the user behavior database 318 and/or the user information database 320 of the electronic game system 302.

At block 850, the electronic game system can be configured to determine a prize for the user, such as through the processes shown in various other process flow diagrams as described above.

Computing System

Figure 9:
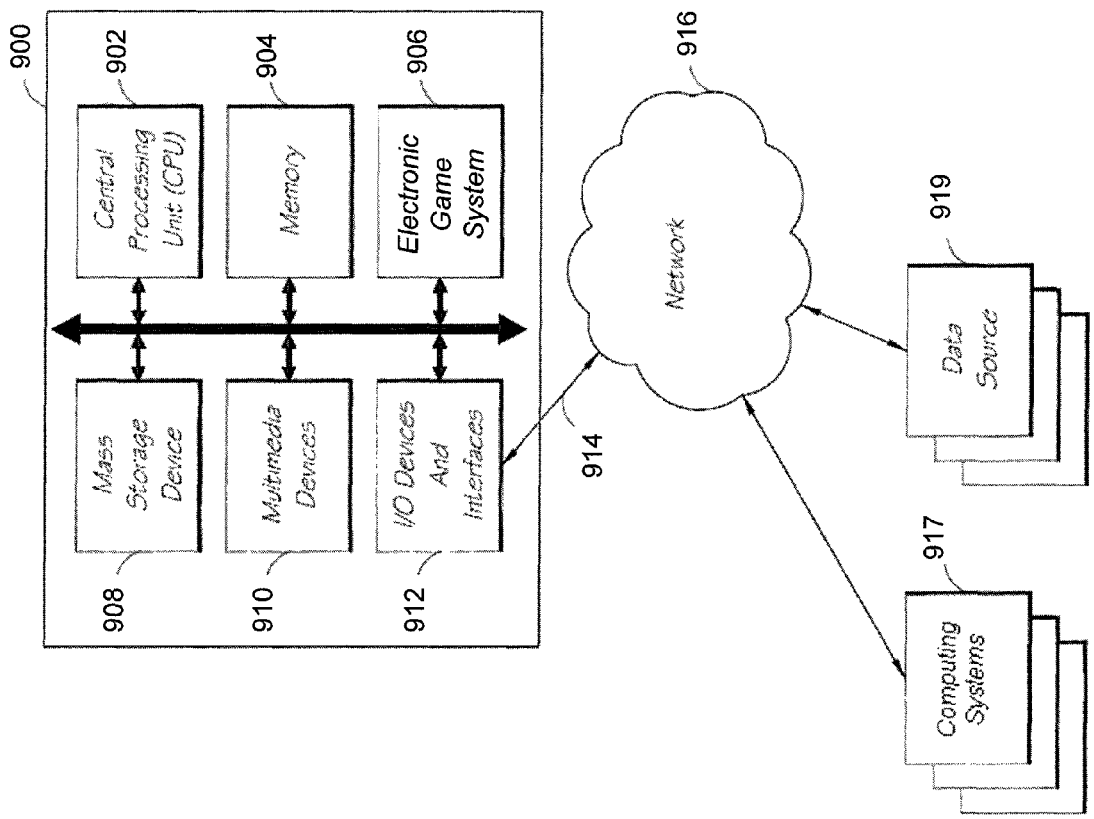
FIG. 9 is a block diagram depicting an embodiment of a computer hardware system configured to run software for implementing one or more embodiments of the systems described herein.

FIG. 9 is a block diagram depicting an embodiment of a computer hardware system configured to run software for implementing one or more embodiments of the electronic game systems described herein.

In some embodiments, the computer clients and/or servers described above take the form of a computing system 900 illustrated in FIG. 9, which is a block diagram of one embodiment of a computing system that is in communication with one or more computing systems 917 and/or one or more data sources 919 via one or more networks 916. The computing system 900 may be used to implement one or more of the systems and methods described herein. In addition, in one embodiment, the computing system 900 may be configured to manage access or administer a software application. While FIG. 9 illustrates one embodiment of a computing system 900, it is recognized that the functionality provided for in the components and modules of computing system 900 may be combined into fewer components and modules or further separated into additional components and modules.

Electronic Game System Module

In one embodiment, the computing system 900 comprises an electronic game system module 906 that carries out the functions described herein with reference to determining and awarding prizes to users, including any one of the techniques described above. In some embodiments, the computing system 900 additionally comprises a data collection engine, user activity processor, external data source interface, ordering engine, menu generator, order processor, identification receiver, game engine, game generator, prize engine, rules engine, data source system, user behavior monitor, user data interface, user access point system, order receiver, game interface, prize bank interface, notification generator, user behavior interface, code receiver, CRM interface, and/or user information interface that carries out the functions described herein with reference to determining and awarding prizes to users. The electronic game system module 906 and/or other modules may be executed on the computing system 900 by a central processing unit 902 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 900 also comprises a mainframe computer suitable for controlling and/or communicating with large databases, performing high volume transaction processing, and generating reports from large databases. The computing system 900 also comprises a central processing unit ("CPU") 902, which may comprise a conventional microprocessor. The computing system 900 further comprises a memory 904, such as random access memory ("RAM") for temporary storage of information and/or a read only memory ("ROM") for permanent storage of information, and a mass storage device 908, such as a hard drive, diskette, or optical media storage device. Typically, the modules of the computing system 900 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 900 comprises one or more commonly available input/output (I/O) devices and interfaces 912, such as a keyboard, mouse, touchpad, and printer. In one embodiment, the I/O devices and interfaces 912 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 912 comprise a microphone and/or motion sensor that allow a user to generate input to the computing system 900 using sounds, voice, motion, gestures, or the like. In the embodiment of FIG. 9, the I/O devices and interfaces 912 also provide a communications interface to various external devices. The computing system 900 may also comprise one or more multimedia devices 910, such as speakers, video cards, graphics accelerators, and microphones, for example.

Computing System Device/Operating System

The computing system 900 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 900 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 900 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 9, the computing system 900 is coupled to a network 916, such as a LAN, WAN, or the Internet, for example, via a wired, wireless, or combination of wired and wireless, communication link 914. The network 916 communicates with various computing devices and/or other electronic devices via wired or wireless communication links. In the embodiment of FIG. 9, the network 916 is communicating with one or more computing systems 917 and/or one or more data sources 919.

Access to the electronic game system module 906 of the computer system 900 by computing systems 917 and/or by data sources 919 may be through a web-enabled user access point such as the computing systems' 917 or data source's 919 personal computer, cellular phone, smartphone, laptop, tablet computer, e-reader device, audio player, or other device capable of connecting to the network 916. Such a device may have a browser module that is implemented as a module that uses text, graphics, audio, video, and other media to present data and to allow interaction with data via the network 916.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 912 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 900 may comprise a physical or logical connection established between a remote microprocessor and a mainframe host computer for the express purpose of uploading, downloading, or viewing interactive data and databases on-line in real time. The remote microprocessor may be operated by an entity operating the computer system 900, including the client server systems or the main server system, an/or may be operated by one or more of the data sources 919 and/or one or more of the computing systems 917. In some embodiments, terminal emulation software may be used on the microprocessor for participating in the micro-mainframe link.

In some embodiments, computing systems 917 who are internal to an entity operating the computer system 900 may access the electronic game system module 906 internally as an application or process run by the CPU 902.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 9, the network 916 may communicate with other data sources or other computing devices. The computing system 900 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Figure 10A:
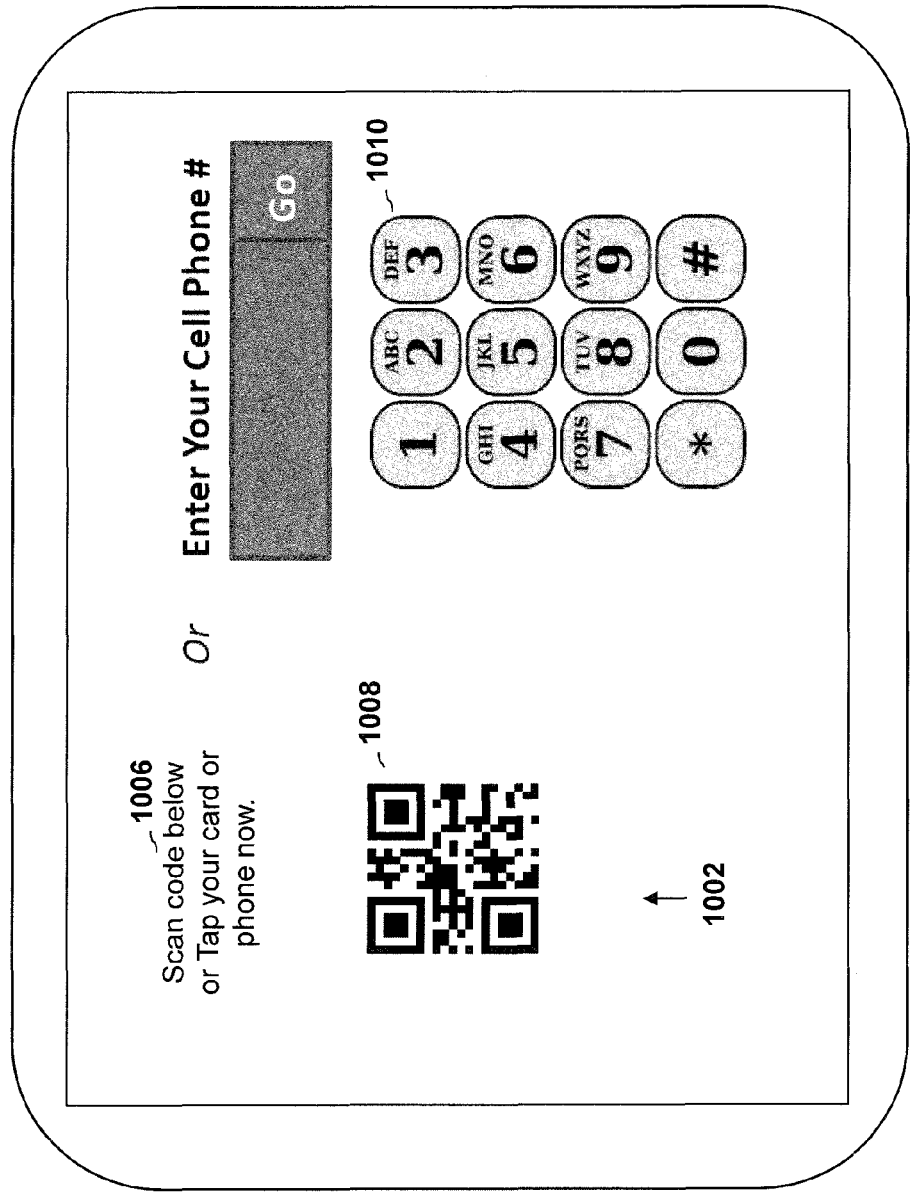
FIG. 10A is an embodiment of a schematic diagram of a user access point system utilizing an electronic game system.
Figure 10B:
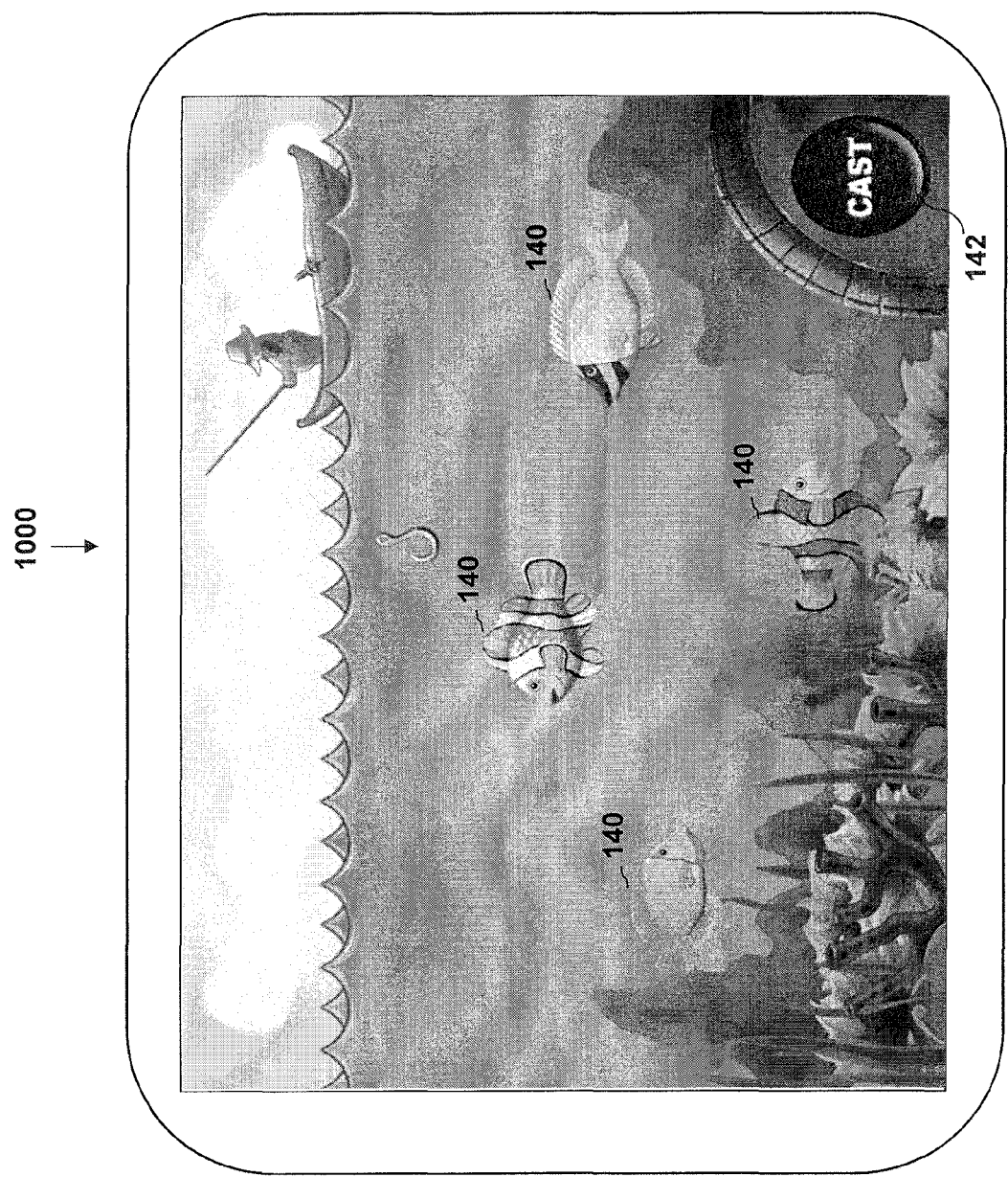
FIG. 10B is another embodiment of a schematic diagram of the user access point system of FIG. 10A utilizing an electronic game system.
Figure 10C:
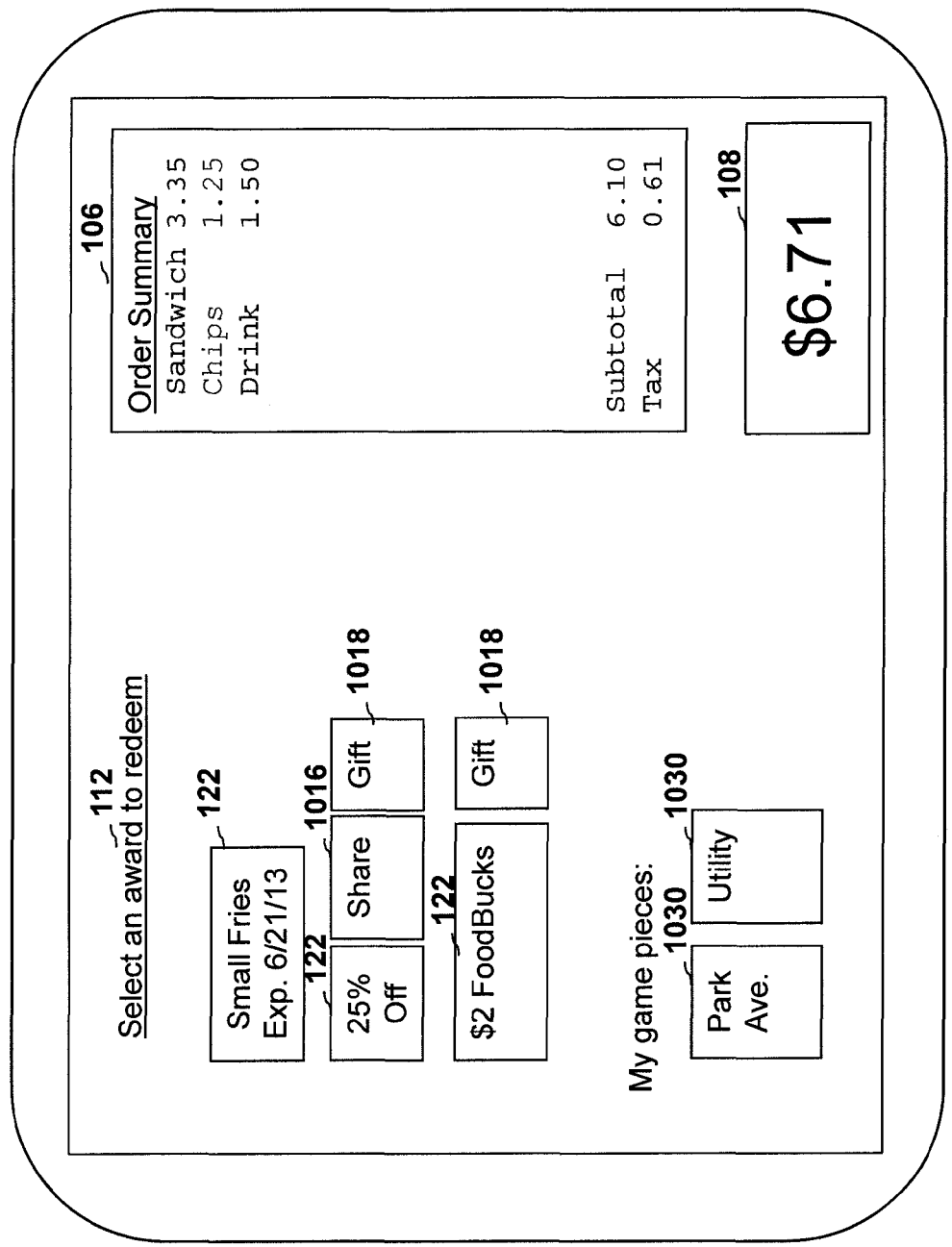
FIG. 10C is another embodiment of a schematic diagram of the user access point system of FIG. 10A utilizing an electronic game system.
Figure 10D:
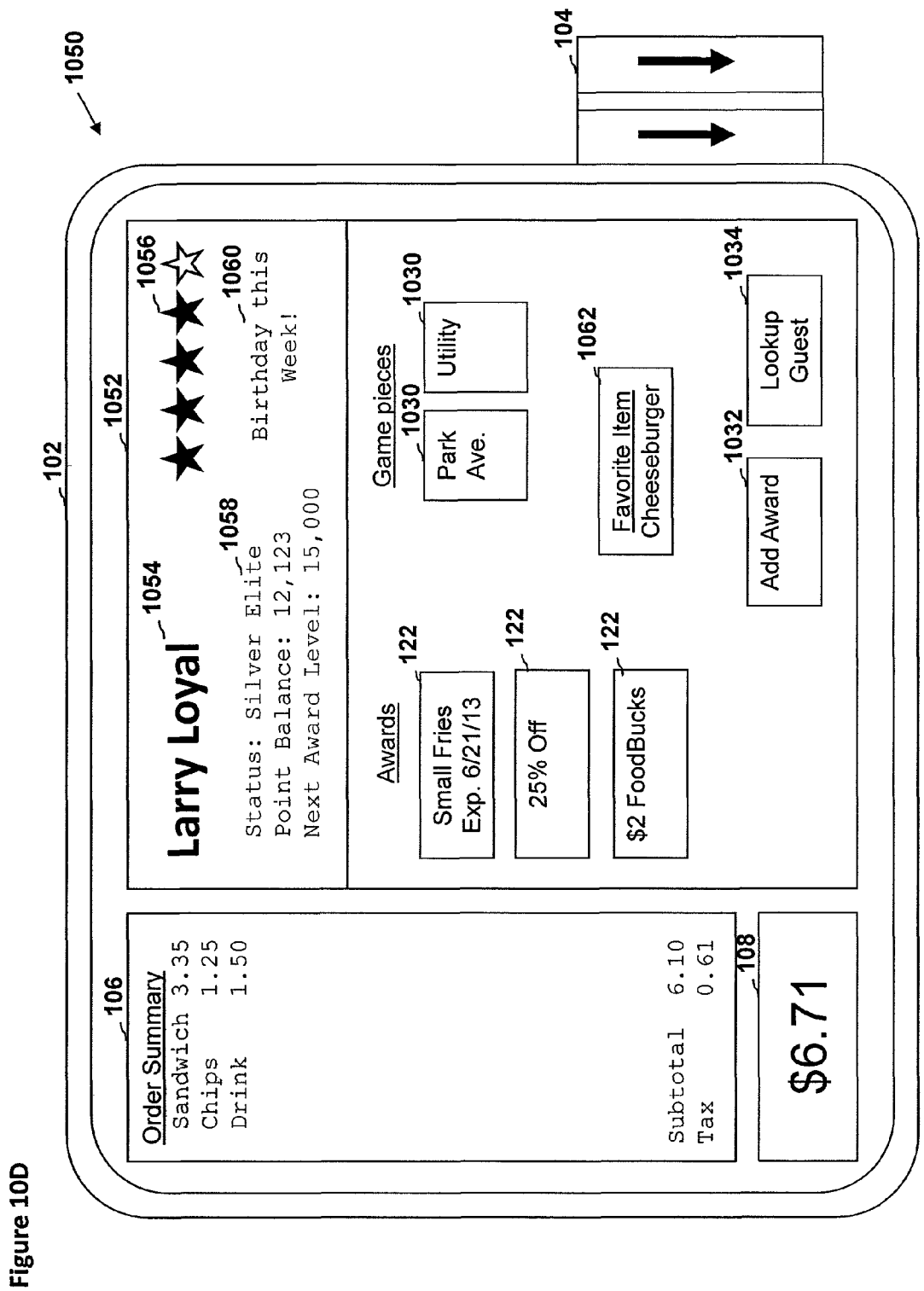
FIG. 10D is an embodiment of a schematic diagram of a user access point system utilizing an electronic game system.
Figure 12:
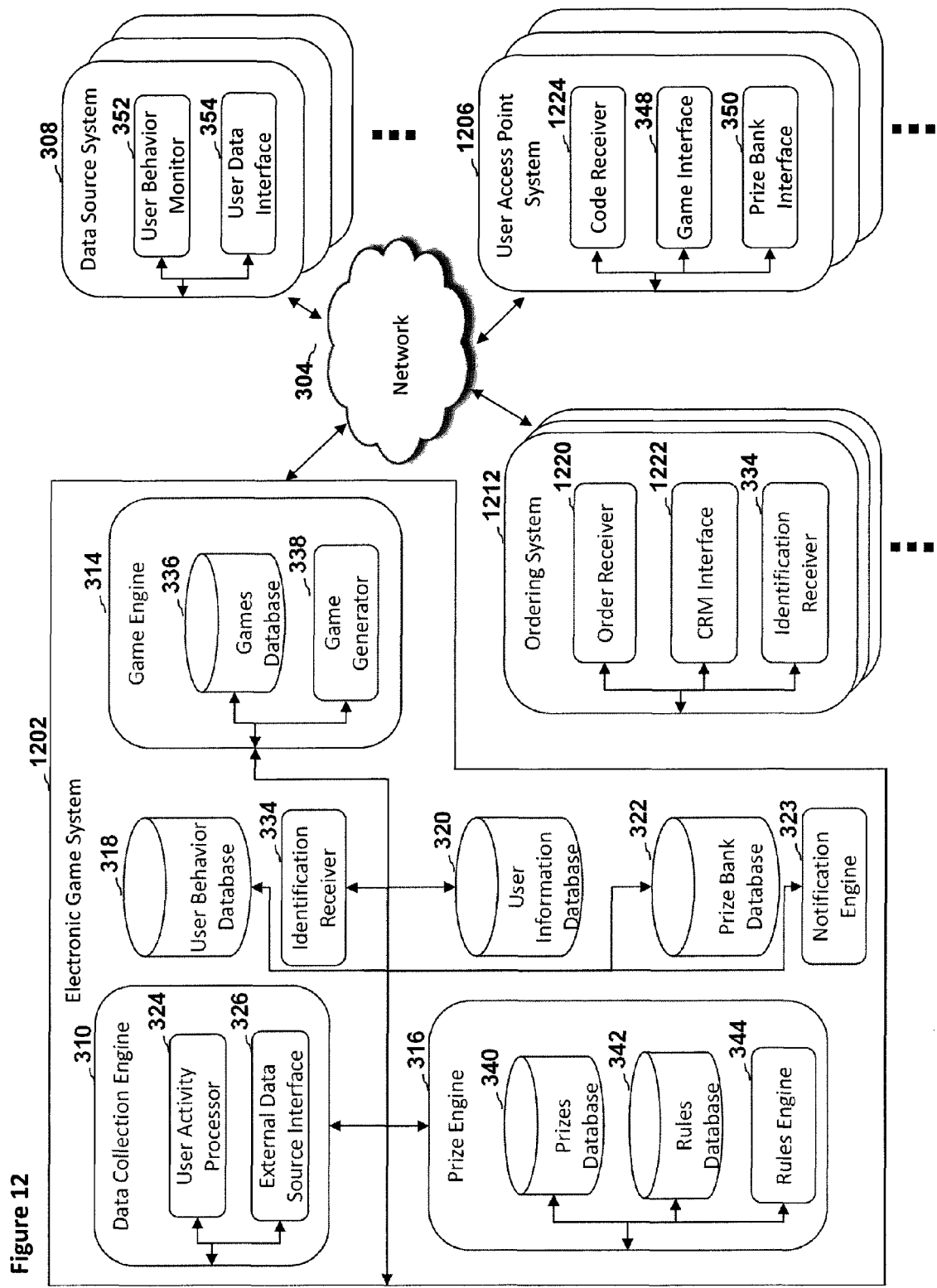
FIG. 12 is a block diagram depicting an embodiment of an electronic game system in communication with one or more other systems.

FIGS. 10A through 10C illustrate other embodiments of a user access point system 1000 utilizing an electronic game system. In this embodiment, the user access point system 1000 may comprise, for example, a touch screen tablet computer system facing a user at an ordering location of, for example, a fast food restaurant. In some embodiments, the user access point system 1000 is configured to be operated by a customer of a business, while a separate user access point system, such as the user access point system 1050 illustrated in FIG. 10D is configured to be operated by an employee of the restaurant. In some embodiments, both user access point systems may be configured to communicate with an electronic game system. In some embodiments, the two user access point systems are configured to only communicate with each other through the electronic game system. In other embodiments, the two user access point systems are configured to communicate directly with each other, either in addition to or in lieu of communicating through, for example, a cloud service, such as an electronic game system as shown in FIG. 12.

FIG. 10A illustrates an embodiment of the user access point system 1000 requesting identifying information from a user. In this embodiment, the user access point system 1000 is offering a few different options for a user to identify himself or herself. Substantially automated identification methods 1002 are illustrated on the left half of the user access point system 1000. A user is requested to identify himself or herself by either scanning the QR code 1008 or by tapping a phone or card or other device having, for example, a near field communication system, against the user access point system 1000. By tapping a smartphone or other card containing identifying information of the user against the user access point system 1000, a near field communication system may be configured to obtain an identifier or other identifying information from the smartphone, card, etc. to identify the user. If a user scans the QR code 1008 with, for example, the user's smartphone, the user's smartphone can be configured to, for example, contact a service at an html address encoded by the QR code 1008 to inform an electronic game system that the user of that smartphone is located at this terminal.

On the right half of the user access point system 1000, a user is given an option to manually identify himself or herself by using a keypad 1010 to enter his or her cell phone number. In other embodiments, a user access point system can be configured to allow a user to identify himself or herself in various other ways, such as providing a name, e-mail address, other identifying information, or in various other ways as described in greater detail above.

FIG. 10B illustrates an embodiment of the user access point system 1000 enabling a user to play an interactive electronic game. For example, the user access point system 1000 may be configured to offer to a user an opportunity to play an interactive electronic game after the user has identified himself or herself using the interface shown in FIG. 10A. The user access point system 1000 shown in FIG. 10B illustrates a fishing game similar to the game illustrated and described above with reference to FIGS. 1F and 1G.

FIG. 10C illustrates another embodiment of a schematic diagram illustrating the user access point system 1000 of FIG. 10A. In this embodiment, the user access point system 1000 is illustrating an order summary 106 and an order total 108, along with various prize bank information and options. The left side of the electronic display of the user access point system 1000 illustrates prizes or awards that the user of the system currently has in his or her prize bank and additionally enables the user to perform certain actions with respect to those prizes or awards. In this embodiment, the system is illustrating that the current user has a free small french fries, 25% off an order, and $2.00 in FoodBucks stored in his or her prize bank. This embodiment also illustrates that this user has two game pieces 1030 banked as part of a multipart game, as further described above. As illustrated by the small fries award 122, the prize bank can be configured to illustrate expiration dates of one or more prizes. For example, the small fries prize 122 shows an expiration date of Jun. 21, 2013. This embodiment also illustrates that users may be given options to do things with their awards or prizes other than merely redeeming them. For example, the user access point system 1000 illustrates a share button 1016 next to the 25% off award 122. The share button 1016 may enable a user to, for example, share a portion of the prize with another user or another person. For example, a user may click on or otherwise select the share button 1016, and the system may be configured to enable the user to give part of the 25% to another person. For example, the user may decide to give 10% of the 25% to another user, leaving 15% in this user's prize bank.

The user access point system 1000 illustrated in FIG. 10C also illustrates two gift buttons 1018. The gift buttons 1018 may be configured to enable a user to gift a banked prize to another user. For example, a user may click on or otherwise select the gift button 1018 next to the FoodBucks award 122 to give the $2.00 in FoodBucks to another user, such as a friend of the current user. The embodiment illustrated in FIG. 10C additionally illustrates that some prizes may have different redemption or action options. In this embodiment, the small fries award has no options other than redeeming that prize, which may be accomplished by clicking on or otherwise selecting the small fries indicator 122. The 25% off award 122 has two additional options, including sharing the prize or gifting the prize. The $2.00 in FoodBucks award 122 has only one extra option, gifting that award. One advantage of utilizing gifting and/or sharing options is that such options may be one of several methods used to acquire new customers or members of a loyalty program linked to an electronic game system. For example, the system can be configured to enable a loyalty program member to share a prize with another person and/or to gift a prize to that person, but may be configured to require that the receiving person sign up for the loyalty program to receive the shared or gifted prize.

The game pieces 1030 illustrated in FIG. 10C may be, as described above, parts of a multipart game. While in this embodiment the two multipart pieces this user has are merely displayed next to each other on the user interface, in some embodiments, the user access point system 1000 may be configured to, for example, position the game pieces around an electronic game board to illustrate which pieces are remaining for the user to acquire.

FIG. 10D illustrates another embodiment of a schematic diagram illustrating a user access point system 1050 that may be used by, for example, an employee of a restaurant while a customer is using the user access point system 1000 illustrated in FIGS. 10A through 10C. The user access point system 1050 illustrated in FIG. 10D is similar to the user access point system illustrated in FIG. 1A, except rather than having an electronic game interface 110, this user access point system comprises a customer relationship management ("CRM") interface 1052. The CRM interface 1052 may be utilized by an employee to, for example, learn about the user who is currently placing an order and/or to assist that user in placing his or her order and/or to assist that user in redeeming prices.

The CRM interface 1052 comprises a name area 1054, a loyalty indicator 1056, a loyalty program status area 1058, an event indicator 1060, a listing of awards 122, a listing of game pieces 1030, an add award button 1032, a look up guest button 1034, and an order preference indicator 1062. The name area 1054 can be configured to display the name of the current user or customer, such as to enable the employee to greet the customer by name. The loyalty indicator 1056 can be configured to display to the employee, for example, the importance of the current user or customer to this business or restaurant. In this example, four out of five stars of the loyalty indicator 1056 are highlighted, indicating the current customer or user is a relatively important customer to the current business. The loyalty indicator 1056 may be configured to display information based on a variety of sources, such as the user's frequency of visits, average order size, length of time as a customer, number of points in a loyalty program, and/or various other types of information. The order preference indicator 1062 can be configured to, for example, indicate a favorite item or items of a user, past items a user has ordered, and/or the like. Such an indicator may be desirable to, for example, enable an employee to ask a customer if they would like to repeat a past order, place their regular order, and/or the like.

The loyalty program status area 1058 can be configured to display various information relating to the current user's status in the business' loyalty program. In this embodiment, the loyalty program status area 1058 indicates the current user is at the Silver Elite level of this business' loyalty program, and that the user has 12,123 loyalty points. The loyalty program status area 1058 can further be configured to show the number of points required to make it to the next loyalty program level. In this embodiment, the status area indicates that the next award level is at 15,000 points. This may be advantageous, such as to enable the employee to tell the customer where the customer stands in the company's loyalty program. In some embodiments, an electronic game system can be configured to enable users of a loyalty program associated with the electronic game system to unlock new levels, achieve higher levels, etc. of interactive electronic games based on a number of loyalty points, a number of times that game has been played, an amount of time playing that game, an total dollar amount spent, and/or the like. Such a system may be advantageous, for example, to enable a business's most valuable customers to, for example, play levels or unlock features of games that no one else is able to do, to enable a certain level of exclusivity.

The event indicator 1060 can be configured to display information related to various events the customer and/or employee may be interested in, such as an upcoming sale, an upcoming expiration of loyalty points, etc. In this embodiment, the event indicator 1060 is indicating that the customer's birthday is this week, enabling the employee to wish the customer a happy birthday.

The award indicators 122 and game piece indicators 1030 are similar to as shown in the user access point system 1000 of FIG. 10C, as seen by the customer or user of that system. The information may be configured to be generally repeated on the employee facing user access point system 1050 to, for example, enable an employee to add an award or a game piece to an order, or to ask the customer or user whether that customer would like to add one or more of the awards to the current order or to utilize one or more of the game pieces during this order. The add award button 1032 can be configured to enable the employee to add one or more awards to the current order and/or to the current user's account. This may be advantageous, for example, when a customer is dissatisfied with a business's service and, for example, a manager would like to give a free item to the user. The look up guest button 1034 can be configured to, in some embodiments, allow the user of the user access point system 1050 to find out more information relating to the current customer. The look up guest button 1034 can also be configured to enable a user of the user access point system 1050 to look up information on another customer that is not currently placing an order.

Although the CRM interface 1052 has been illustrated and described with reference to a restaurant environment, such an interface may be useful in various types of businesses, such as department stores, clothing stores, convenience stores, gas stations, car repair businesses, etc. A CRM interface may additionally display various other types of information. For example, the CRM interface may be configured to display a customer's gift card balance, and/or any other type of information that a business may want to show to an employee while a customer is at the business.

FIGS. 11A through 11H illustrate various embodiments of schematic diagrams illustrating a user access point system 1100 utilizing an electronic game system. The user access point system 1100 can be, for example, a portable electronic device owned by or operated by a customer of one or more businesses, such as restaurants. The user access point system 1100 can be configured to interface with an electronic game system, such as various embodiments of electronic game systems illustrated in FIGS. 3A-3D and 12 and described with reference to those FIGS., to enable a user to play interactive electronic games to be awarded prizes or awards, either when the user is at a business location or when the user is at any location where the user would like to play a game.

Figure 11C:
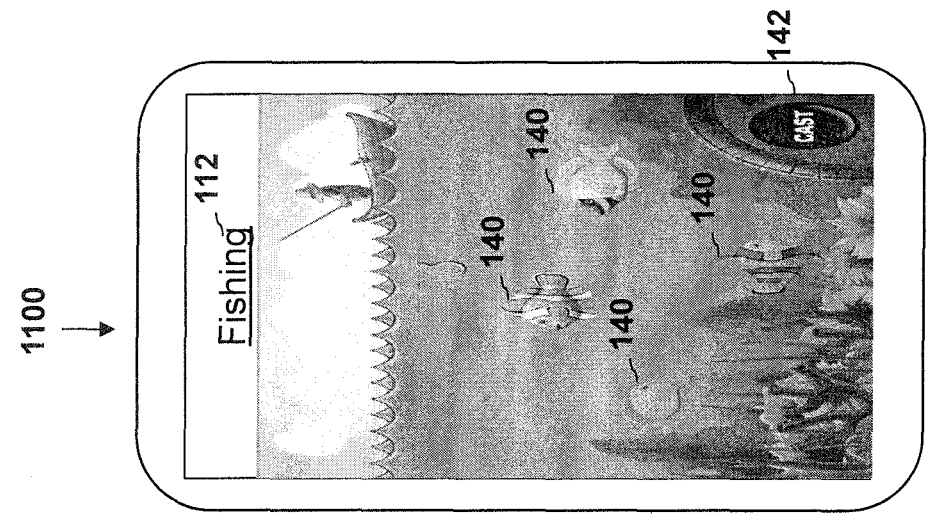
FIG. 11C is another embodiment of a schematic diagram of the user access point system of FIG. 11A utilizing an electronic game system.
Figure 11B:
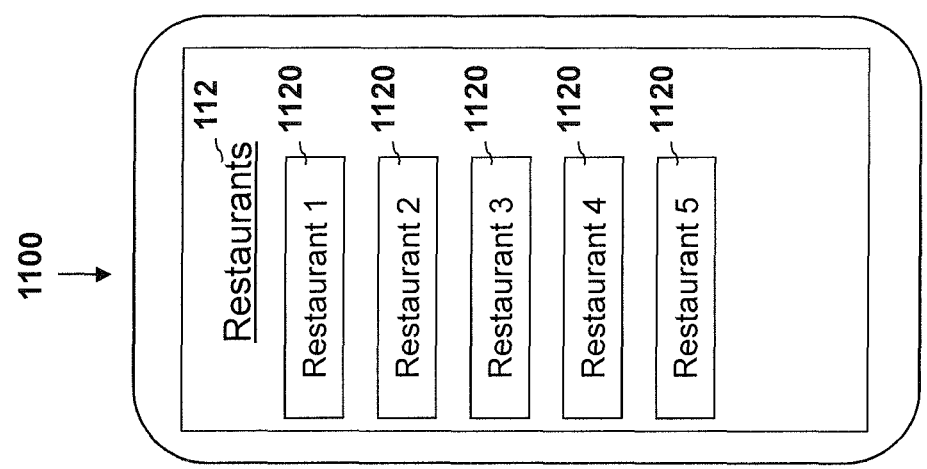
FIG. 11B is another embodiment of a schematic diagram of the user access point system of FIG. 11A utilizing an electronic game system.
Figure 11A:
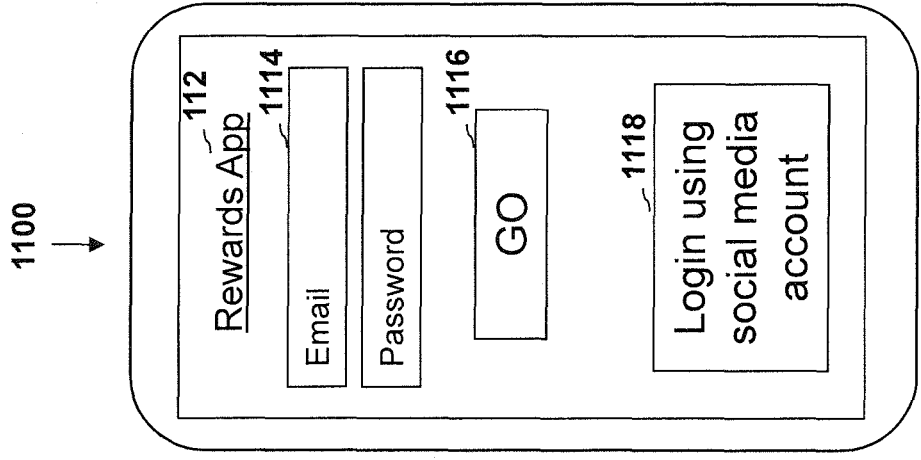
FIG. 11A is an embodiment of a schematic diagram of a user access point system utilizing an electronic game system.

FIG. 11A illustrates an embodiment of a schematic diagram illustrating the user access point system 1100 utilizing an electronic game system. The embodiment shown in FIG. 11A illustrates the user access point system 1100 requesting identifying information from a user. In this embodiment, the user access point system 1100 displays a heading 112, information input boxes 1114, a go button 1116, and an alternate login button 1118. The heading 112 indicates that the user has entered a rewards application, such as an application that may enable the user to play one or more interactive electronic games with one or more businesses or restaurants to enable the user to win awards or prizes for each of the businesses or restaurants. The information input boxes 1114 are configured to accept information from the user to login to the application, such as the user's e-mail address and password. After the user has entered his or her e-mail address and password, the user can click the go button 1116 to log into the application. As an alternative, the user may click the alternative login button 1118 to use an alternative login method, such as logging in using a user's social media account name and password. In some embodiments, a rewards application can be configured to save identifying or login information and bypass the screen shown in FIG. 11A. In some embodiments, the user access point system 1100 can be configured to communicate with an electronic game system to log the user into his or her account.

FIG. 11B illustrates a screen shown by the user access point system 1100 after the user has logged into a rewards app. In this embodiment, the user access point system 1100 illustrates a list of restaurants 1120 for the user to choose from. For example, the system may be configured to offer numerous restaurants that a user can pick from to play an interactive electronic game with that restaurant. Although this embodiment illustrates the use of various restaurants, the same concepts may be applicable to various other types of businesses. If a user selects one of the restaurants 1120, and the electronic game system determines that the user can play a game with that restaurant, the user access point system 1100 may present a game, as shown in FIG. 11C. In some embodiments, the list of businesses shown in FIG. 11B may comprise businesses that are located nearby or within a threshold range from a user's current location. In some embodiments, the list of businesses shown in FIG. 11B may comprise saved places and/or favorite places, such as restaurants a user frequents and/or restaurants the user has selected to be his or her favorite restaurants.

As further described above, an electronic game system may be configured to not always offer a game to a user and/or to not always offer a prize to a user when a user plays a game. For example, an electronic game system may be configured to only allow a user to play a game and/or to win a prize for a particular restaurant every predetermined amount of time, such as eight hours or 24 hours. In the embodiment shown in FIG. 11C, the electronic game system has determined to allow the user to play a game for whichever restaurant the user clicked on using the interface of FIG. 11B. In this embodiment, the user access point system 1100 is enabling the user to play the fishing game, as described above with reference to FIGS. 1F and 1H.

Figure 11F:
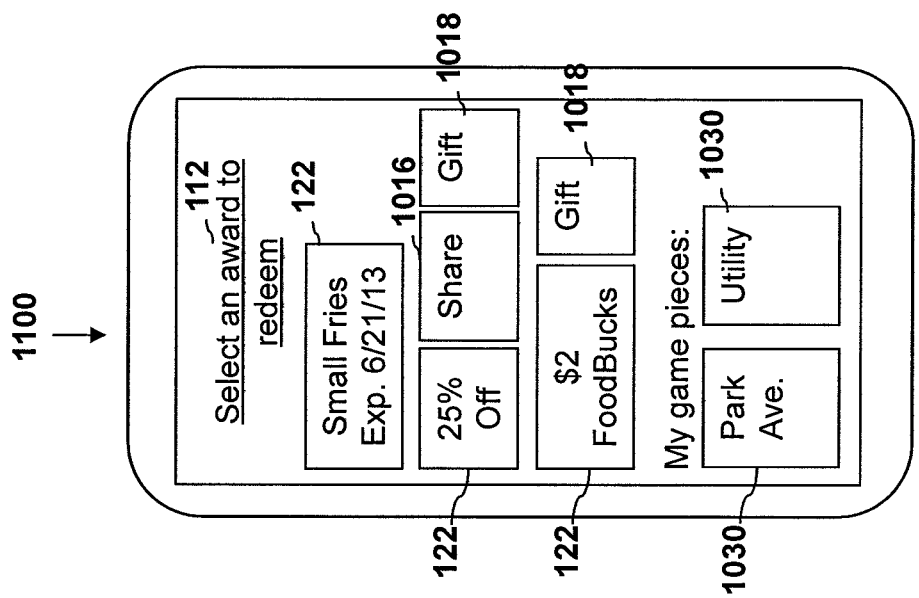
FIG. 11F is another embodiment of a schematic diagram of the user access point system of FIG. 11A utilizing an electronic game system.
Figure 11E:
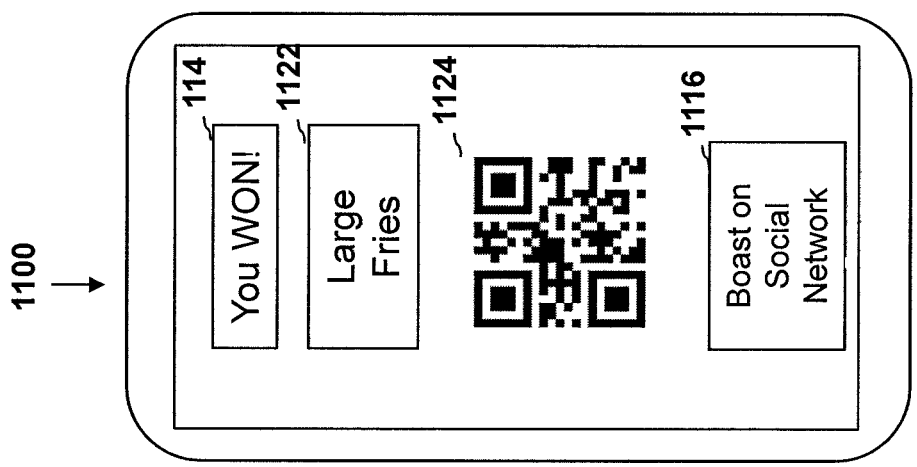
FIG. 11E is another embodiment of a schematic diagram of the user access point system of FIG. 11A utilizing an electronic game system.
Figure 11D:
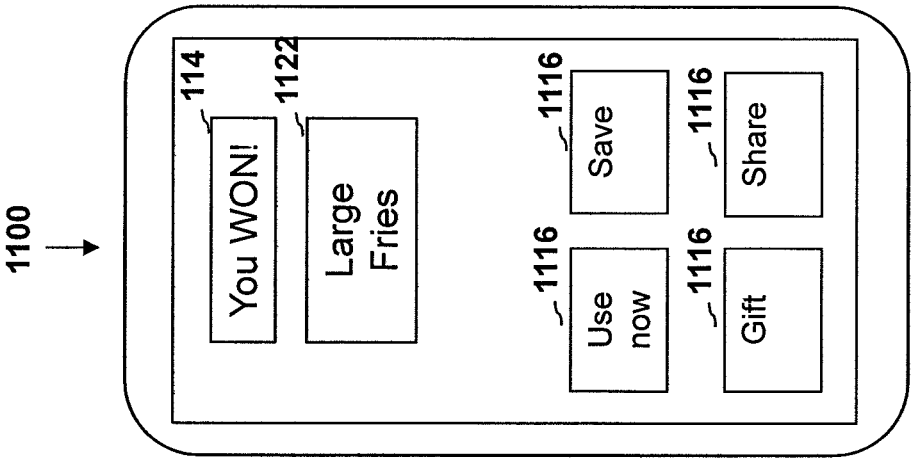
FIG. 11D is another embodiment of a schematic diagram of the user access point system of FIG. 11A utilizing an electronic game system.

FIG. 11D illustrates a user interface of the user access point system 1100 that may be displayed after a user has played a game, such as is shown in FIG. 11C. The user interface shown in FIG. 11D illustrates that the user has won an award of a large french fries 1122. The user access point system 1100 in this embodiment is configured to illustrate several options for the user to redeem or otherwise act on the awardance of the prize. For example, the user may select the use now button 1116 to redeem the prize now. The user may select the save button 1116 to bank the prize. The user may select the gift button 1116 to gift the prize to another user. The user may select the share button 1116 to share a portion of the prize with another user. The user access point system 1100 can be configured to electronically communicate with an electronic games system to implement whatever action the user chooses to take.

FIG. 11E illustrates an example embodiment of the user access point system 1100 after a user has selected the use now button 1116 shown in FIG. 11D. In this embodiment, the user access point system 1100 is configured to display a QR code 1124 to enable the user to redeem the large fries prize 1122. For example, an electronic game system can be configured to enable the user to show the QR code 1124 to a QR code reader at a business location to enable the user to redeem the prize. For example, the user may have played the game and won this prize while the user was at home. Then, when the user visits the associated restaurant and places an order, the user may scan the QR code using the restaurant's local point-of-sale system to automatically add the prize to the order. Although the embodiment shown in FIG. 11E illustrates a QR code 1124 to enable identification of a specific prize, in other embodiments, various other identifiers may be used. For example, a textual identifier may be used, a barcode may be used, etc. In some embodiments, a boast on social network button or tell your friends button 1116 may be included to enable a user to automatically post to, for example, a social networking website that the user has played a game and/or won a prize with the associated restaurant.

FIG. 11F illustrates an embodiment of the user access point system 1100 illustrating a user's prize bank and enabling the user to take certain actions with respect to that prize bank. The user interface illustrated in FIG. 11F can be configured to operate similarly to the user interface illustrated in FIG. 10C and described above.

Figure 11H:
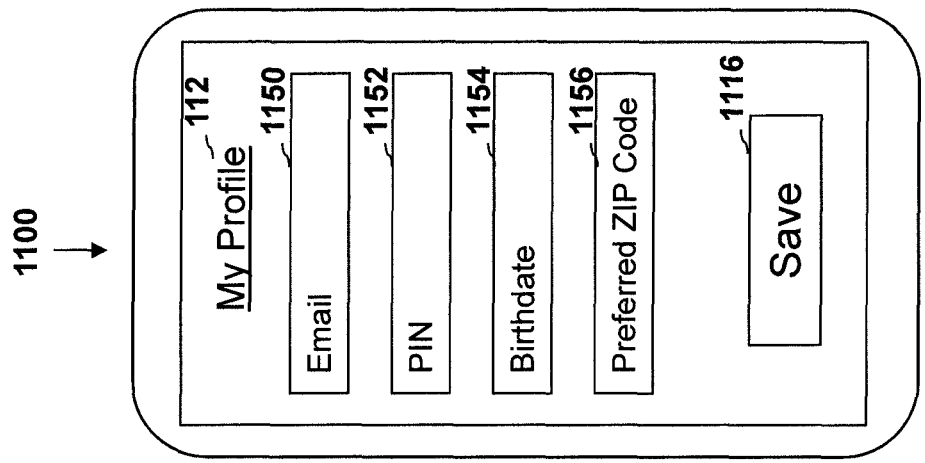
FIG. 11H is another embodiment of a schematic diagram of the user access point system of FIG. 11A utilizing an electronic game system.
Figure 11G:
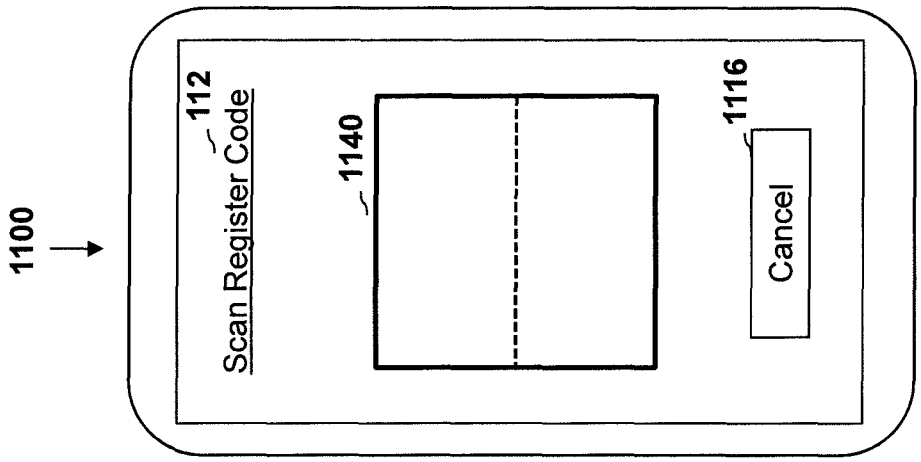
FIG. 11G is another embodiment of a schematic diagram of the user access point system of FIG. 11A utilizing an electronic game system.

FIG. 11G illustrates another embodiment of the user access point system 1100 utilizing an electronic game system. In this embodiment, the user access point system 1100 is configured to request the user of the system to scan a code, such as a QR code attached to or related to a point-of-sale system or register at a business or restaurant. The user access point system 1100 illustrated in FIG. 11G comprises a heading 112 asking the user to scan the register code. A cancel button 1116 is configured to enable the user to cancel the scanning. A scanning window 1140 is configured to enable the user to line up a QR code on the register with a digital camera of the user access point system 1100 to enable the user access point system 1100 to scan and interpret the code.

Enabling a portable user access point system to scan a code at a point-of-sale system or register at a business or restaurant may be advantageous to enable the user access point system 1100 to identify to an electronic game system where the user access point system 1100 is. For example, a user may win a prize while the user is home and playing a game on his or her user access point system 1100, or even a different user access point system associated with his or her electronic game system account. However, a restaurant may comprise a chain of restaurants, and the owner may want users to be able to redeem the prizes at any one of his or her restaurants. Therefore, the electronic game system may need to know which register and/or restaurant the user is at to enable the redemption of the award. For example, if the user has selected to redeem a free large french fries, the user may select using the interface shown in FIG. 11D to use the prize now. The interface shown in FIG. 11G may then be displayed to the user and enable the user to scan a code of a particular point-of-sale system at a restaurant. The user access point system 1100 can then be configured to interpret the QR code and send information contained in the QR code to an electronic game system. The electronic game system can be configured to interpret this information received from the user access point system 1100 to determine which point-of-sale system the user is located at and to enable that particular point-of-sale system to process the redemption of the award. In embodiments of electronic game systems utilizing such a QR code system, the system may be configured to have each point-of-sale or register system have its own unique QR code or other type of identifier. In other embodiments, each individual business location has its own unique QR code or other identifier, rather than each register or point of sale having its own identifier.

FIG. 11H illustrates the user access point system 1100 enabling a user to enter and/or edit profile information for that user's account. For example, the user access point system 1100 may be configured to enable the user to enter his or her e-mail address 1150, pin number 1152, birthdate 1154, preferred zip code 1156, and/or various other types of information. Once the user has entered and/or updated information, the user can select the save button 1116 to save the information with an electronic game system. The electronic game system may save this information to, for example, the user information database or databases of the system, such as shown in FIG. 3A. One advantage of getting a preferred zip code from a user may be to enable the electronic game system and/or the user access point system 1100 to display an appropriate set of restaurants and/or other businesses to the user for selection using the user interface illustrated in FIG. 11B.

FIG. 12 is a block diagram depicting an embodiment of an electronic game system in communication with one or more other systems. The electronic game system 1202 illustrated in FIG. 12 is similar to the electronic game system 302 illustrated in FIG. 3A, except the ordering engine 312 has been removed from the electronic game system and replaced by one or more ordering systems 1212 as illustrated in FIG. 12. The embodiments illustrated in FIG. 12 illustrates an electronic game system 1202 that is configured to generate interactive electronic games and to determine user specific prizes for those interactive electronic games, but to do this for a multitude of ordering systems 1212 located at one or more different business locations and to communicate with a multitude of user access point systems 1206. In some embodiments, a fulfillment system for taking and processing orders and for managing awards or prizes comprises the electronic game system 1202 combined with one or more of the other systems illustrated in FIG. 12.

In some embodiments, the electronic game system 1202 is configured to communicate substantially in real time and with a multitude of ordering systems 1212 and/or user access point systems 1206. For example, an electronic game system 1202 may be configured to manage the determination of prizes and/or generation of games for 10, 100, 1,000, 10,000, or more user access point systems 1206 substantially simultaneously. The electronic game system 1202 may additionally be configured to communicate with 10,100, 1,000, 10,000, or more ordering systems 1212 to enable substantially simultaneous management of user prizes and/or redemption of user prizes or awards. In some embodiments, the electronic game system illustrated in FIG. 12, in addition to electronic game systems described elsewhere in this disclosure, may be configured to operate substantially in real time in order to provide real-time responses to requests for games, requests for the determination of a prize, request for redemptions of prizes, etc.

The data source systems 308 are configured to operate similarly to the data source systems 308 illustrated in FIG. 3A. The user access point systems 1206 are configured to be operated by a user of the electronic game system to request games for specific businesses or restaurants and to play those games to be potentially awarded one or more prizes or awards. The user access point systems 1206 may comprise, for example, a user's smart phone, tablet computer, or various other types of portable electronic devices. In other embodiments, the user access point systems 1206 may comprise an interactive electronic device located at a business where one or more ordering systems 1212 are located. For example, an ordering system 1212 may comprise a point-of-sale ordering system at a fast food restaurant, while a user access point system 1206 may comprise a touch screen tablet computer positioned near the point-of-sale system, but facing the customer for use by the customer.

The user access point system 1206 comprises a code receiver 1224, a game interface 348, and a prize bank interface 350. The game interface 348 and prize bank interface 350 can be configured to operate similarly to as described above with reference to FIG. 3A. The code receiver 1224 can be configured to, for example, receive a code related to a specific business location or ordering system 1212 at a business in order to enable the user access point system 1206 to identify to the electronic game system 1202 a current location of that user access point system 1206. For example, an ordering system 1212 may comprise a QR code or other identifier, such as a bar code, that is configured to be viewable by the code receiver 1224 of the user access point system 1206. In use, a user of a user access point system 1206 may bring his or her user access point system to a business location and scan the QR code of the ordering system 1212 using the code receiver 1224 of the user access point system 1206. The user access point system 1206 may be configured to then interpret the scanned code and send data through the network 304 to the electronic game system 1202 to enable the electronic game system 1202 to detect that the user access point system 1206 is at that specific ordering system 1212. This may be advantageous, for example, because a user may utilize his or her user access point system 1206 to play an interactive electronic game and win a price when the user is, for example, at home, at a location other than the business where the prize may be redeemed, while the user is waiting in line to place an order at the business, or at various other locations.

If a user indicates to the electronic game system 1202, using the user access point system 1206, that the user would like to redeem a prize, the electronic game system may require an indication of where the prize should be redeemed. For example, the user may have won a prize from a specific chain of fast food restaurants, but not from one specific location of that chain. Therefore, when the user shows up at a specific location of the fast food restaurant chain, the user can use the code receiver 1224 to scan the QR code of a specific ordering system 1212 at that location to indicate to the electronic game system 1202 that the prize should be redeemed at that specific business location and/or that specific ordering system 1212 of that specific business location.

In some embodiments, in order for an electronic game system 1202 to enable a user to redeem a prize, the electronic game system 1202 requires at least two pieces of information. First, the electronic game system 1202 requires an identification of the user. Second, the electronic game system 1202 may require a location of the user. For example, an electronic game system 1202 may require a user's identity to associate a user requesting a prize with that user's account so that the electronic game system 1202 knows what prize or prizes are available for that user to redeem. Secondly, with respect to the location of the user, the electronic game system may need to know what business location and/or what specific ordering system 1212 at that business location the user is located at in order to enable redemption of the prize. In some embodiments, redemption of a prize occurs electronically and/or through the mail, and therefore the electronic game system 1202 does not require knowing the location of a user at the time the user wants to redeem the prize.

The electronic game system 1202 shown in FIG. 12 is configured to operate similarly to the electronic game system 302 illustrated in FIG. 3A, with the exception described above that the electronic game system 1202 is configured to communicate with various ordering systems and user access point systems. The electronic game system 1202 additionally comprises an identification receiver 334 that is configured to receive identifying information from ordering systems 1212 and user access point systems 1206. For example, the user access point system 1206 may be configured to transmit identifying information to the identification receiver 334 in order to identify a specific user access point system 1206 and/or the user of that specific user access point system 1206 to the electronic game system 1202. An ordering system 1212 may additionally be configured to transmit an identification of that specific ordering system 1212 and/or an identification of a customer requesting redemption of a prize through the network 304 to the electronic game system 1202.

The ordering systems 1212 comprise an order receiver 1220, a customer relationship management ("CRM") interface 1222, and an identification receiver 334. The identification receiver 334 can be configured to receive an identification of users of the ordering system 1212, such as an employee of a fast food restaurant. The identification receiver 334 can additionally be configured to receive an identification of a specific user access point system 1206 and/or a specific user or customer of a user access point system 1206. In some embodiments, the identification receiver 334 of the ordering system 1212 can be configured to receive identifications of prizes or awards a user is attempting to redeem. For example, a user access point system 1206 may be configured to display a code for the redemption of a prize, such as a QR code or bar code, as shown in FIG. 11E, and the identification receiver 334 may be configured to scan that code to then either process redemption of that prize or transmit information to the electronic game system 1202 to confirm the availability of that prize and/or to process redemption of that prize.

The order receiver 1220 can be configured to receive an order from a user or customer of a business. For example, the order receiver 1220 may be configured to enable a customer to directly enter his or her order and/or to enable an employee of the business to enter an order given to that employee by the customer. The CRM interface 1222 can be configured to display information to, for example, an employee of the business, the information relating to the user or customer that is currently placing an order. For example, the CRM interface 1222 may be configured to display information as illustrated above in FIG. 10D.

The electronic game system 1202 may be configured to communicate with one or more ordering systems 1212 located at a single business location and/or to communicate with various ordering systems 1212 located at various business locations, regardless of whether those various business locations are related to the same business entity. For example, an electronic game system 1202 may be configured to operate as a cloud service and to manage interactive electronic games and/or awarding of prizes to users of various unrelated businesses.

Figure 13:
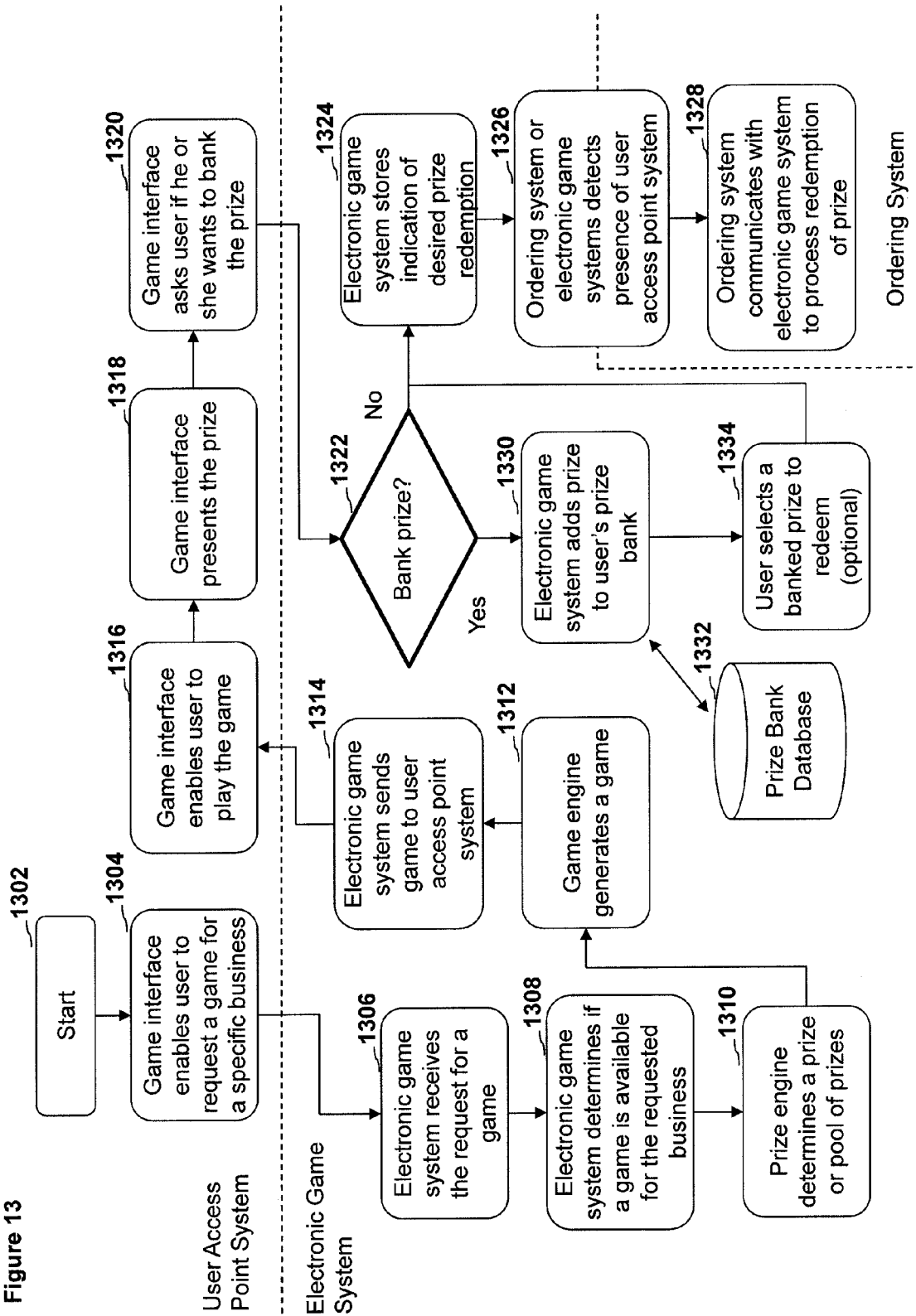
FIG. 13 depicts an embodiment of a process flow diagram illustrating an example of operating an electronic game system to determine and award a prize to a user.

FIG. 13 depicts an embodiment of a process flow diagram illustrating an example of operating an electronic game system communicating with a user access point system and an ordering system to determine and award a prize to a user. The process shown in FIG. 13 may be implemented by, for example, the systems illustrated in FIG. 12, as described above. The process flow begins at block 1302. At block 1304, a game interface enables a user to request a game for a specific business. For example, as illustrated and described above with reference to FIG. 11B, a game interface of a user access point system may be configured to display a list of restaurants and/or other businesses to a user and to allow the user to click on or otherwise select one of those businesses to request to play an interactive electronic game to possibly be awarded a prize for that business.

At block 1306, the electronic game system receives the request for a game for a specific business. For example, the electronic game system 1202 shown in FIG. 12 receives the request through the network 304 from a user access point system 1206. At block 1308, the electronic game system determines if a game is available for the requested business. For example, some businesses may have predetermined parameters defining when, how often, or under what circumstances a user may be offered a game for that business. For example, one restaurant may only allow its users to play a game for a chance to win a prize every eight hours or every 24 hours. Another restaurant may allow users to play games whenever they desire. In some embodiments, even if a business or restaurant limits the number of times or the frequency with which a user can play a game, the system may still be configured to limit the number of prizes awarded. For example, a restaurant that allows a user to play games whenever he or she desires may nonetheless only enable awarding of a prize every eight hours or 24 hours, etc.

At block 1310, a prize engine determines a prize or pool of prizes to award to the user. For example, the prize engine 316 shown in FIG. 12 may implement the process shown and described above with respect to FIG. 7 to determine a prize for the user. At block 1312, a game engine generates a game. For example, the game engine 314 shown in FIG. 12 may be configured to generate a game for the user that includes the prize or pool of prizes determined at block 1310. At block 1314, the electronic game system sends the generated game to the user access point system. In some embodiments, the game already resides on the user access point system, and the electronic game system merely sends prize information to the user access point system, potentially also sending other related information to configure the game on the user access point system.

At block 1316, the game interface of the user access point system enables the user to play the game. For example, as illustrated in FIG. 11C above, the user access point system 1100 may display an interactive electronic game to the user and enable the user to play that game. At block 1318, the game interface presents the prize to the user. For example, as shown in FIG. 11D, the user interface may be configured to indicate the prize the user has won and ask the user what the user would like to do with that prize.

At block 1320, the game interface asks the user if he or she wants to bank the prize. For example, as illustrated in FIG. 11D, the user access point system 1100 may present a use now button 1116 and a save button 1116. Selecting the save button 1116 would indicate that the user would like to bank the prize. Selecting the use now button 1116 would indicate that the user would like to redeem the prize now rather than banking the prize.

At block 1322, the process flow varies depending on whether the user indicated he or she wanted to bank the prize. If the user indicated the user wanted to redeem the prize now, rather than banking the prize, the process flow moves to block 1324. At block 1324, the electronic game system stores an indication of the desired prize redemption. For example, the electronic game system 1202 may store information indicating that the current user would like to redeem the prize and/or an electronic token representing the prize and indicating that the user would like to redeem the prize. If the user is not currently at the location where the prize can be redeemed, this information may be configured to be stored for later use by an ordering system at the location of redemption.

In some embodiments, an electronic game system can be configured to store unique identifiers identifying each prize or award that has been awarded to a user but has not yet been redeemed. In some embodiments, the electronic game system is configured to identify both awarded and redeemed prizes using either the same or different unique identifiers. Utilizing unique identifiers may be advantageous to enable tracking of prizes that have been awarded and/or redeemed using the electronic game system. In some embodiments, individual prizes may utilize or be associated with an identifier that is not a unique identifier. For example, there may be one identifier that identifies all large milkshake prizes. When any user is awarded a large milkshake prize, the same identifier for the milkshake prize is used. However, in some embodiments, the identifier for a prize may be combined with an identifier of a user or user account to create a unique identifier that is able to identify or link that specific prize or type of prize to that specific user or user account. A system utilizing non-unique identifiers for prizes may be advantageous as it may require less processing and/or storage overhead than processing a different unique identifier for each individual prize for each user.

At block 1326, an ordering system or the electronic game system detects the presence of a user access point system at the location of redemption. For example, an ordering system 1212 located at a restaurant may scan a code displayed on a user access point system and/or the ordering system 1212 may receive identifying information from the user access point system or user of the user access point system. In another embodiment, the electronic game system 1202 detects the presence of the user access point system at a business location or ordering system 1212 by, for example, the user access point system 1206 scanning a code located at the business or ordering system 1212 and sending information relating to that code to the electronic game system 1202 as further described above with reference to FIG. 12.

At block 1328, the ordering system communicates with the electronic game system to process redemption of the prize. For example, an ordering system 1212 may send identifying information of the user access point system 1206 and/or the prize the user is attempting to redeem to the electronic game system 1202. The electronic game system 1202 may then confirm to the ordering system 1212 that the prize is available for redemption, such as by performing an electronic verification or handshake operation. The electronic game system 1202 may be configured to then delete that prize from the user's account in the electronic game system 1202 either immediately or after the ordering system 1212 has confirmed to the electronic game system 1202 that the prize has been redeemed. One advantage of various ordering systems 1212 communicating with the electronic game system 1202 to manage distribution of prizes is that it can discourage multiple redemptions of the same prize. For example, a user may play an interactive electronic game using his or her user access point system, and the user access point system may then be configured to display a code that can be given to an employee of a business to redeem the prize. For example, as shown in FIG. 11E, a user access point system may display a QR code or other identifier that can be scanned or otherwise input by an ordering system 1212 to redeem that prize. However, if the various ordering systems 1212 are not in communication with the central electronic game system 1202, a user may be able to take that same QR code to various ordering systems 1212 and redeem the prize multiple times. Therefore, the central electronic game system 1202 can add security into a system of interactive electronic games and prizes being awarded by various businesses. Another advantage of utilizing a central electronic game system or cloud-based electronic game system is that it may require less effort and/or cost by a business to implement an electronic game system than if the business needed to implement some or all of the electronic game system at each of its locations and/or at each point-of-sale system.

Figure 14:
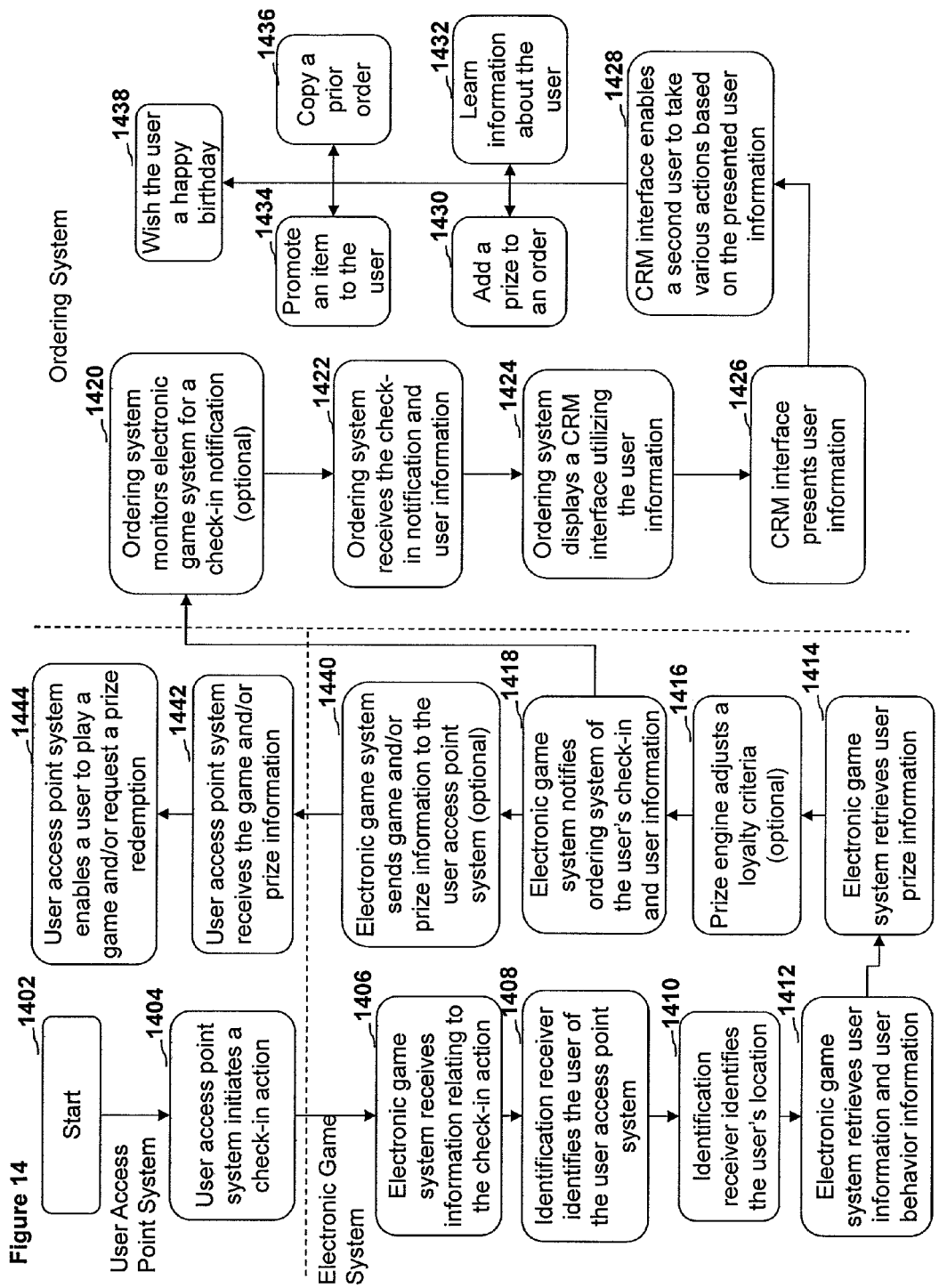
FIG. 14 depicts an embodiment of a process flow diagram illustrating an example of a user access point system check-in process.

FIG. 14 depicts an embodiment of a process flow diagram illustrating an example of a user access point system check-in process. The process illustrated in FIG. 14 may, for example, be performed by the systems illustrated in FIG. 12 as described above. The process flow illustrated in FIG. 14 provides one example of how an electronic game system may operate to enable users to check-in to the system and to perform actions based on the check-in. The process flow starts at block 1402. At block 1404, a user access point system initiates a check-in action. A check-in action may be initiated in various ways. For example, if the user access point system comprises a tablet computer system located at a business location, the check-in action may comprise a user entering identifying information into the user access point system, the user scanning a code shown on the user access point system, the user bumping his or her smartphone against the user access point system that is utilizing near field communication, and/or the like. If, for example, the user access point system is a portable electronic device possessed by a user, a check-in action may comprise various other actions. For example, the user may use his or her portable electronic device to scan a code associated with a business or particular register or location at a business. As another example, a user may open an app and/or request a game for a particular business, which may be considered a check-in action.

In some embodiments, a check-in action is automatic or passive. In other embodiments, a check-in action is active. For example, a check-in action may comprise a user arriving at a particular location as detected by a GPS detection module in his or her portable electronic device. In another example, a check-in action may comprise a wireless system detecting the presence of a user's portable electronic device at a particular location. In another example, an electronic game system may utilize various other technologies to check-in a user, such as facial recognition, license plate recognition, near field communication, and/or the like. These are examples of a passive or automatic check-in action. Examples of an active check-in action may be, for example, a user entering identifying information into a user access point system, scanning a code, and or the like.

At block 1406, the electronic game system receives information relating to the check-in action. For example, the user access point system with which the user checked in may send data through a network to the electronic game system relating to the check-in action. In some embodiments, this data may comprise information that identifies the user and/or user access point system. In some embodiments, the data may comprise information that both identifies the user and identifies a prize the user would like to redeem. In some embodiments, this data may comprise information at least partially describing the method used to check-in. In some embodiments, this data may comprise a request by the user to redeem one or more prizes.

At block 1408, an identification receiver identifies the user of the user access point system. For example, the identification receiver 334 shown in FIG. 2 may be configured to utilize the information received at block 1406 to identify the user in a user information database and/or user behavior database. This information may be useful, for example, to enable the electronic game system to access the user's prize bank information and other information related to the user.

At block 1410, the identification receiver identifies the user's location. In some embodiments, the information received from the user access point system comprises information identifying both the user and the user's location. For example, the information received from the user access point system may comprise a GPS module or other location-type information that enables the identification receiver to determine where the user is located. In other embodiments, the information received from the user access point system may specifically identify the user's location. For example, the check-in action may have comprised scanning a code associated with a particular register or point of sale system at a particular business. Information relating to this code may have then been sent by the user access point system to the electronic game system to identify that specific register or point of sale system.

At block 1412, the electronic game system retrieves user information and user behavior information. For example, the electronic game system shown in FIG. 12 may retrieve information on the identified user from that system's user behavior database and/or user information database. At block 1414, the electronic game system retrieves user prize information. For example, the electronic game system may be configured to retrieve information related to prizes or awards currently in the user's prize bank from a prize bank database. The system may also be configured to retrieve information related to past prizes the user has been awarded and/or redeemed.

At block 1416, a prize engine optionally adjusts a loyalty criteria. For example, a number of loyalty points associated with the user may be increased, because the system may be configured to award check-in's. As another example, a level of a loyalty program that the user is in may be increased based on, for example, a number of check-ins the user has had related to that business. The process shown at block 1416 may be advantageous to, for example, encourage users to check-in at a business, regardless of whether or not the user has or will play an electronic game at that business.

In some embodiments, a system may be configured to enable users to get loyalty points based on orders the user places. In some embodiments, the system can be configured to automatically add a certain number of loyalty points based on, for example, an order value, the contents of the order, and/or the like. In some embodiments, a system can be configured to enable a user to get credit for a past purchase, such as if the user did not identify himself or herself as a member of the loyalty program when the user placed the order. This may be similar to, for example, when a user of an airline flight program can get credit for a past flight when the user did not provide his or her airline flight program loyalty number at the time of booking the flight. In some embodiments, a receipt for an order may comprise an identifier, such as a QR code or alphanumeric code. This identifier may be, for example, scanned by a user access point system and/or an ordering system, and information related to that identifier sent to an electronic game system through a network to enable the electronic game system to add any points associated with that order to the user's account. In another embodiment, such as in a prize system that utilizes multipart prizes, as described further above, a physical prize, such as a prize piece that peels off of a drink glass, may comprise a code scannable or enterable by a user access point system or ordering system to automatically add that prize piece or prize component to the user's account without requiring the user to keep the physical game piece.

At block 1418, the electronic game system notifies an ordering system of the user's check-in and the user information. For example, the electronic game system may be configured to send this information to one of the ordering systems 1212 shown in FIG. 12. In some embodiments, the ordering system that the electronic game system is configured to send this information to is the register or point of sale system that the user used to check-in, such as by scanning a code associated with that register or point of sale system. At block 1420, the ordering system optionally monitors the electronic game system for a check-in notification. For example, the ordering system may be configured to continually monitor the electronic game system for a changed state or other indicator of a check-in. In other embodiments, the ordering system is not configured to actively monitor the electronic game system, but is still configured to be able to receive check-in notifications from the electronic game system.

At block 1422, the ordering system receives the check-in notification and related user information. At block 1424, the ordering system displays a CRM interface utilizing the user information. For example, the ordering system may be configured to display or pop-up the CRM interface illustrated in FIG. 10D when the ordering system receives a check-in notification. At block 1426, the CRM interface presents the user information to, for example, the employee. This may be advantageous, because the ordering system can be configured to automatically display customer related information to an employee of a business when an employee checks in there. In an embodiment where the user actively checked in at the register when the user was preparing to order, the CRM interface could pop up on an employee facing screen, for example, shortly after the user checks in at the register. In some embodiments, a CRM interface can pop up over a portion of a point of sale terminal screen while still displaying other items in other areas of the screen. In other embodiments, a CRM interface may be configured to pop up and utilize the entire or a majority of a point-of-sale terminal screen. The employee could then utilize the CRM information while taking the order from the customer. In an embodiment where a user checks in prior to arriving at the register, such as when the user manually checks-in using his personal electronic device and/or the check-in occurs based on a proximity detection method, the CRM interface may pop up on an employee facing device prior to the user arriving at the register or point of sale device. This may be advantageous, to enable an employee to learn about a customer and/or see various information about the customer prior to the customer arriving at the ordering terminal. This may, for example, enable employees to greet customers by name as they arrive at the ordering area.

At block 1428, the CRM interface enables a second user, such as an employee of a business, to take various actions based on the presented user information. For example, the employee may add a prize to an order, as shown at block 1430. The employee may promote an item to the user, as shown at block 1434, such as an item that is indicated by the CRM interface to be an appropriate item to promote to that user. As shown at block 1432, the employee may be able to learn information about the user, such as to enable starting a conversation with the user. As another example, as shown at block 1438, information the employee learns may comprise that the user's birthday is today or is this week and enable the employee to wish that user a happy birthday. The CRM interface may also, as shown at block 1436, enable an employee to copy a prior order. For example, the CRM interface may be configured to display past orders and/or favorite items of the user to the employee to enable them to ask the user if the user would like to repeat a past order and/or order his or her favorite item.

Returning to block 1418, at substantially the same time the electronic game system notifies the ordering system of the user's check-in and user information, the process proceeds to block 1440, and the electronic game system optionally sends a game and/or prize information to the user access point system. For example, such a block may be advantageous to enable the user to play an interactive electronic game for a chance to win a prize and/or to view his or her prize bank information while an employee is viewing the CRM information presented at block 1426 to the employee. At block 1442, the user access point system receives the game and/or prize information. At block 1444, the user access point system enables the user to play the game and/or to request redemption of a prize, such as a prize stored in the user's prize bank.

In some embodiments, an electronic game system as described herein can be configured to enable multiple users to play the same or different games in order to win a single prize. For example, a system may be configured to enable each person that is part of a single order to play his or her own game, while one of those games is configured to present a prize for redemption by one or more of the users. In some embodiments, an electronic game system can be configured to offer a user or users the ability to play multiple games and to award a prize with each of the games, but to reduce a value of the awarded prizes to a value, for example, that in aggregate is generally equivalent to the value of a single prize, were a single prize awarded.

In some embodiments, an electronic game system can be configured to only offer games to be played by users when certain requirements are met. For example, a restaurant may prefer to not offer games for play during rush hours, such as a lunch period. As another example, an electronic game system may be configured to only offer games during slow times or a happy hour time to, for example, encourage users to visit the business during these traditionally slower times.

An electronic game system as described herein may be advantageous for a business to use as a marketing tool to market to existing and/or potential new customers. One advantage of utilizing an electronic game system as a marketing tool is that it may be relatively inexpensive as compared to traditional marketing means, such as direct mail marketing. An electronic game system may be configured to have electronic games that change on a regular basis to keep customers interested. The system may be configured to enable a new electronic game to be generated and implemented with relatively minimal expense. Additionally, an electronic game system utilizing a data collection engine as described herein, may enable a business to target its marketing toward appropriate users, based on the information collected relating to those users.

In some embodiments, an electronic game system can be configured to sometimes award prizes or awards as gifts without requiring a user to play a game or to place an order. For example, such a system may be configured to operate with a loyalty program of a business and may be configured to gift a prize or prizes to users as, for example, promotion for a new item the business has, a new movie being promoted, and/or the like.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. An interactive electronic game system for determining prizes to award to users and managing redemption of the prizes, the interactive electronic game system comprising:
 a user information database configured to store data relating to users of the interactive electronic game system, the data comprising past prize redemption information and past non-prize order information;
 a prize engine configured to determine a prize to award to a user of the interactive electronic game system, wherein determining the prize to award to the user comprises applying prize determination rules to at least the past prize redemption information or the past non-prize order information stored in the user information database;
 a game engine configured to generate at least one configuration parameter for an interactive electronic game and to electronically communicate with an electronic user access point system to communicate the at least one configuration parameter to the user access point system, wherein the interactive electronic game is configured to be playable by a user of the electronic user access point system, and the interactive electronic game is configured to indicate to the user using the electronic user access point system the determined prize;
 wherein the prize engine is further configured to electronically communicate with an ordering system, the ordering system configured to process user prize redemption requests and user non-prize orders, wherein the prize engine is configured to transmit a message to the ordering system to enable the ordering system to process a redemption of the determined prize for the user;

wherein the prize engine is further configured to electronically communicate with the user access point system, the user access point system being located at a same business location as the ordering system, wherein a request by either the ordering system or the user access point system to redeem the determined prize must be confirmed by the prize engine prior to enabling the ordering engine to process a redemption of the determined prize; and one or more computers configured to operate the prize engine and game engine, wherein the one or more computers comprises a computer processor and an electronic storage medium.

2. The interactive electronic game system of claim 1, wherein the at least one configuration parameter comprises information relating to the determined prize.

3. The interactive electronic game system of claim 1, wherein the request by either the ordering system or the user access point system to redeem the determined prize comprises information enabling an identification of the ordering system.

4. The interactive electronic game system of claim 3, wherein the information enabling the identification of the ordering system comprises information received by the user access point system by scanning a code associated with or displayed by the ordering system.

5. The interactive electronic game system of claim 1, wherein the message transmitted to the ordering system to enable the ordering system to process a redemption of the determined prize is generated in response to a request from the ordering system to enable redemption of the determined prize.

6. The interactive electronic game system of claim 5, wherein the request from the ordering system to enable redemption of the determined prize comprises information enabling an identification of the user access point system.

7. The interactive electronic game system of claim 6, wherein the information enabling the identification of the user access point system comprises information received by the ordering system by scanning a code associated with or displayed by the user access point system.

8. The interactive electronic game system of claim 1, wherein the interactive electronic game is configured to illustrate a fisherman attempting to catch a fish, wherein the interactive electronic game is further configured to indicate to the user the determined prize only after the interactive electronic game has illustrated a fish being caught by the fisherman.

9. A computer-implemented method for determining prizes to award to users and managing redemption of the prizes, the computer-implemented method comprising:

accessing, by a computer system, in an electronic database, data relating to a user of the computer system, the data comprising past prize redemption information and past non-prize order information;

determining, by the computer system, a prize to award to the user, wherein determining the prize comprises applying prize determination rules to at least the past prize redemption information or the past non-prize order information stored in the electronic database;

generating, by the computer system, at least one configuration parameter for an interactive electronic game;

transmitting, by the computer system, the at least one configuration parameter over a computer network to a customer display system, enabling the customer display system to present the interactive electronic game to the user, wherein the interactive electronic game is configured to be playable by the user and to indicate to the user the determined prize;

communicating, by the computer system, electronically with an ordering system, the ordering system configured to process user prize redemption requests and user non-prize orders, to indicate to the ordering system that the determined prize may be redeemed for the user; and receiving electronically, by the computer system, a request to redeem the determined prize, wherein the request to redeem the prize is received electronically from a user access point system separate from the ordering system, wherein the user access point system is located at a same business location as the ordering system when the request to redeem the prize is electronically received;

wherein the computer system comprises a computer processor and an electronic storage medium.

10. The computer-implemented method of claim 9, wherein the at least one configuration parameter comprises information relating to the determined prize.

11. The computer-implemented method of claim 9, wherein the customer display system comprises a portable electronic device.

12. The computer-implemented method of claim 9, wherein the customer display system comprises a customer-facing electronic display located at a same business location as the ordering system.

13. The computer-implemented method of claim 9, wherein the request to redeem the determined prize comprises information enabling an identification of the ordering system, and wherein the information enabling the identification of the ordering system comprises information received by the electronic user access point system separate from the ordering system by scanning a code associated with the ordering system.

14. A computer-readable, non-transitory storage medium having a computer program stored thereon for causing a suitably programmed computer system to process by one or more processors computer-program code by performing a method for determining prizes to award to users and managing redemption of the prizes when the computer program is executed on the suitably programmed computer system, the method comprising:

accessing, by the computer system, in an electronic database, data relating to a user of the computer system, the data comprising past prize redemption information and past non-prize order information;

determining, by the computer system, a prize to award to the user, wherein determining the prize comprises applying prize determination rules to at least the past prize redemption information or the past non-prize order information stored in the electronic database;

generating, by the computer system, at least one configuration parameter for an interactive electronic game;

transmitting, by the computer system, the at least one configuration parameter over a computer network to a customer display system, enabling the customer display system to present the interactive electronic game to the user, wherein the interactive electronic game is configured to be playable by the user and to indicate to the user the determined prize;

communicating, by the computer system, electronically with an ordering system, the ordering system configured to process user prize redemption requests and user non-prize orders, to indicate to the ordering system that the determined prize may be redeemed for the user; and receiving electronically, by the computer system, a request to redeem the determined prize, wherein the request to redeem the prize is received electronically from a user access point system separate from the ordering system, wherein the user access point system is located at a same business location as the ordering system when the request to redeem the prize is electronically received;

wherein the computer system comprises a computer processor and an electronic storage medium.

15. The computer-readable, non-transitory storage medium of claim 14, wherein the at least one configuration parameter comprises information relating to the determined prize.

16. The computer-readable, non-transitory storage medium of claim 14, wherein the customer display system comprises a portable electronic device.

17. The computer-readable, non-transitory storage medium of claim 14, wherein the customer display system comprises a customer-facing electronic display located at a same business location as the ordering system.

18. The computer-readable, non-transitory storage medium of claim 14, wherein the request to redeem the determined prize comprises information enabling an identification of the ordering system, and wherein the information enabling the identification of the ordering system comprises information received by the electronic user access point system separate from the ordering system by scanning a code associated with the ordering system.

* * * * *

UNITED STATES PATENT AND TRADEMARK OFFICE
CERTIFICATE OF CORRECTION

PATENT NO. : 8,719,086 B1
APPLICATION NO. : 13/933039
DATED : May 6, 2014
INVENTOR(S) : Mitesh Gala et al.

Page 1 of 1

It is certified that error appears in the above-identified patent and that said Letters Patent is hereby corrected as shown below:

In the Specification

In column 38 at line 4, Change "and or" to --and/or--.

In column 43 at line 10, Change "an/or" to --and/or--.

In column 54 at lines 56-57, Change "and or" to --and/or--.

Signed and Sealed this
Sixth Day of January, 2015

Michelle K. Lee
*Deputy Director of the United States Patent and Trademark Office*